(12) United States Patent
Ikeda et al.

(10) Patent No.: US 7,770,557 B2
(45) Date of Patent: Aug. 10, 2010

(54) THROTTLE BODY, METHOD OF ADJUSTING OPENING OF OPENER, AND METHOD OF MANUFACTURING THROTTLE BODY

(75) Inventors: Tsutomu Ikeda, Obu (JP); Hideki Asano, Obu (JP); Mamoru Tateishi, Obu (JP); Toshiyuki Masui, Obu (JP); Koichi Suzuki, Obu (JP); Takashi Tsuge, Obu (JP); Tuneaki Aoki, Obu (JP); Mikiharu Yoshizaka, Obu (JP); Masashi Ozeki, Obu (JP)

(73) Assignee: Aisan Kogyo Kabushiki Kaisha, Obu-Shi, Aichi (JP)

( * ) Notice: Subject to any disclaimer, the term of this patent is extended or adjusted under 35 U.S.C. 154(b) by 566 days.

(21) Appl. No.: 11/597,330

(22) PCT Filed: May 31, 2005

(86) PCT No.: PCT/JP2005/009972
§ 371 (c)(1),
(2), (4) Date: Nov. 24, 2006

(87) PCT Pub. No.: WO2005/116424
PCT Pub. Date: Dec. 8, 2005

(65) Prior Publication Data
US 2008/0029060 A1  Feb. 7, 2008

(30) Foreign Application Priority Data
May 31, 2004 (JP) .............................. 2004-161643

(51) Int. Cl.
*F02D 9/08* (2006.01)
*F16K 1/22* (2006.01)
(52) U.S. Cl. ........................ 123/337; 251/305
(58) Field of Classification Search ............... 123/337, 123/376, 391; 251/305; 29/888.01
See application file for complete search history.

(56) References Cited

U.S. PATENT DOCUMENTS

| 6,505,643 | B2 * | 1/2003 | Scholten et al. ............ 137/554 |
| 6,763,582 | B2 * | 7/2004 | Kaiser et al. ................. 29/854 |
| 7,168,682 | B2 * | 1/2007 | Nanba et al. ................ 251/305 |
| 2002/0171059 | A1 | 11/2002 | Sakurai et al. |

(Continued)

FOREIGN PATENT DOCUMENTS

DE  10246113  4/2004

(Continued)

OTHER PUBLICATIONS

Wolf, "Kunststoffschweiben Mit Hochleistungsdiodenlaser", Productronic, Feb. 2002.

*Primary Examiner*—Stephen K Cronin
*Assistant Examiner*—Sizo B Vilakazi
(74) *Attorney, Agent, or Firm*—Dennison, Schultz & MacDonald

(57) ABSTRACT

A throttle body (2) includes a resin main body (3) defining a bore (7) through which intake air flows, a valve body (60) having a shaft part (20) rotatably supported by the resin body (3) and a valve part (4) for opening and closing the bore (7) of the main body (3), and a resin cover body (40) attached to the main body (3). The cover body (4) is attached to the main body (3) by welding.

17 Claims, 47 Drawing Sheets

U.S. PATENT DOCUMENTS

| | | |
|---|---|---|
| 2003/0024119 A1 | 2/2003 | Kaiser et al. |
| 2004/0187844 A1* | 9/2004 | Torii et al. .................. 123/337 |
| 2005/0155780 A1 | 7/2005 | Hannewald |
| 2006/0000443 A1* | 1/2006 | Kado et al. ................. 123/399 |
| 2006/0048747 A1* | 3/2006 | Hannewald et al. ......... 123/337 |
| 2008/0092848 A1* | 4/2008 | Asanuma et al. ............ 123/337 |

FOREIGN PATENT DOCUMENTS

| | | |
|---|---|---|
| JP | 62108669 | 7/1987 |
| JP | 7-166897 | 6/1995 |
| JP | 8014032 | 1/1996 |
| JP | 10325471 | 12/1998 |
| JP | 11013496 | 1/1999 |
| JP | 2001-074156 | 3/2001 |
| JP | 2001-289068 | 10/2001 |
| JP | 2002-021588 | 1/2002 |
| JP | 2002021588 A * | 1/2002 |
| JP | 2002138860 | 5/2002 |
| JP | 2004-092617 | 3/2004 |

* cited by examiner

THROTTLE BODY, METHOD OF ADJUSTING OPENING OF OPENER, AND METHOD OF MANUFACTURING THROTTLE BODY

This application is a filing under 35 USC 371 of PCT/JP2005/009972 filed May 31, 2005.

TECHNICAL FIELD

The present invention relates to a throttle body for controlling an intake air amount of an internal combustion engine, a method of adjusting an opening of an opener, and a method of manufacturing a throttle body.

BACKGROUND ART

A conventional throttle body is provided with a main body defining a bore through which intake air flows, a valve body having a shaft part rotatably supported on the main body and a valve part for opening/closing the bore of the main body, a throttle position sensor for detecting the rotation angle or so-called throttle opening of the valve part, and an attaching member which is a cover body covering the throttle position sensor (See Patent Document 1).

Patent Document: JP 2001-289068 A

DISCLOSURE OF THE INVENTION

Problem to be Solved by the Invention

In the above-mentioned ordinary conventional throttle body, the cover body is attached to the main body by using a fixing element, such as a fixing screw. Thus, it is necessary to provide not only a fixing element but also mount seats, etc. for attaching the fixing element to the main body and the cover body, and therefore, a problem of increase in cost is inevitable.

It is an object of the present invention to provide a throttle body, a method of adjusting the opening of an opener, and a method of manufacturing a throttle body, which enables cost reduction.

Means for Solving the Problem

The above-mentioned problem can be solved by a throttle body, a method of adjusting the opening of an opener, and a method of manufacturing a throttle body as defined in the appended claims.

That is, according to a first aspect of the invention, there is provided a throttle body, including:

a resin main body defining a bore through which intake air flows;

a valve body having a shaft part rotatably supported by the main body and a valve part for opening and closing the bore of the main body; and an attaching member attached to the main body, wherein the attaching member is attached to the main body by welding.

According to the first aspect of the invention, constructed as described above, the bore of the main body is opened and closed by the valve part rotating together with the shaft part of the valve body, so that the amount of intake air flowing through the bore, that is, the intake air amount is controlled.

The attaching member is attached to the resin main body by welding. Therefore, it is possible to eliminate the conventionally required fixing element, mount seat, etc., so that the cost can be reduced. In this specification, "attaching member" may correspond to a cover member, such as a cover body or a plug, which covers a predetermined portion by being attached to the main body. The material of the attaching member is not limited to resin, and it may also be metal if the resin of the main body allows the attaching member to be attached. Further, any member that can be attached to the main body may be regarded as the "attaching member" in this specification.

By welding the attaching member to the entire periphery of the main body, it is possible to eliminate a seal member for effecting sealing between the main body and the attaching member, so that the cost can be reduced. By spot-welding the attaching member to the main body, it is possible to improve the productivity and to reduce the cost.

Further, according to a second aspect of the invention, in the throttle body according to the first aspect of the invention, inner contact portions contacting with each other with an inner separating groove provided therebetween are disposed on an inner side of a welded portion between the main body and the attaching member.

According to the second aspect of the invention, constructed as described above, it is possible to accommodate within the inner separating groove any resin residue generated at the welded portion between the main body and the attaching member. Further, since the inner contact portion of the main body and the inner contact portion of the mounting member are in contact with each other, it is possible to prevent or mitigate excessive welding, intrusion of the resin residue into the inner side of the inner contact portion, etc.

Further, according to a third aspect of the invention, in the throttle body according to the first or second aspect of the invention, outer contact portions contacting with each other with an outer separating groove provided therebetween are disposed on an outer side of the welded portion between the main body and the attaching member.

According to the third aspect of the invention, constructed as described above, it is possible to accommodate within the outer separating groove any resin residue generated at the welded portion between the main body and the mounting member. Further, since the outer contact portion of the main body and the outer contact portion of the mounting member are in contact with each other, it is possible to prevent or mitigate excessive welding, extension of the resin residue to the outer side of the outer contact portion, etc.

Further, according to a fourth aspect of the invention, in the throttle body according to the first aspect of the invention, the main body or the attaching member is made of transparent resin, and the attaching member is attached to the main body by laser welding.

According to the fourth aspect of the invention, constructed as described above, the attaching member is attached to the main body by laser welding. Thus, it is possible to eliminate the conventionally required fixing element, mount seat, etc., so that the cost can be reduced.

Further, according to a fifth aspect of the invention, in the throttle body according to any one of the first through fourth aspects of the inventions, the main body is provided with a motor housing portion for housing a drive motor that rotatively drives the valve body, and an opening is provided at a bottom wall portion of the motor housing portion for exposing an end portion on a side opposite to an output side of a motor housing of the drive motor to an exterior.

According to the fifth aspect of the invention, constructed as described above, the end portion on the side opposite to the output side of the motor housing of the drive motor is open to the exterior through the opening provided in the bottom wall portion of the motor housing portion of the main body, so that it is possible to improve the heat radiation property.

Further, according to a sixth aspect of the invention, in the throttle body according to the fifth aspect of the invention, the end portion on the side opposite to the output side of the motor housing of the drive motor is sealed by a sealing material and is resiliently supported with respect to the bottom wall portion of the motor housing portion.

According to the sixth aspect of the invention, constructed as described above, the end portion on the side opposite to the output side of the motor housing of the drive motor is sealed by the sealing material and is resiliently supported with respect to the bottom wall portion of the motor housing portion of the main body. Thus, the sealing property with the main body is secured, and it is possible to prevent or reduce transmission of vibrations from the motor housing to the main body.

Further, according to a seventh aspect of the present invention, in the throttle body according to the fifth or sixth aspect of the invention, the end portion on the side opposite to the output side of the motor housing of the drive motor is formed into a bottomed configuration.

According to the seventh aspect of the invention, constructed as described above, the end portion on the side opposite to the output side of the motor housing of the drive motor is formed into a bottomed configuration. Thus, despite the fact that the end portion on the side opposite to the output side of the motor housing of the drive motor is open through an opening of the bottom wall portion of the motor housing portion of the main body, it is possible to prevent intrusion of water and dust into the motor housing.

Further, according to an eighth aspect of the invention, in the throttle body according to any one of the first through seventh aspects of the inventions, an output-side end portion of a motor shaft of the drive motor is rotatably supported on the attaching member.

According to the eighth aspect of the invention, constructed as described above, the output-side end portion of the motor shaft of the drive motor is rotatably supported on the attaching member. Therefore, it is possible to reduce the load on the motor shaft of the drive motor. Thus, it is possible, for example, to set the shaft diameter of the motor shaft of the drive motor to be small, so that the size of the drive motor can be reduced and the cost can be reduced.

Further, according to a ninth aspect of the invention, there is provided a throttle body, including:
a resin main body defining a bore through which intake air flows;
a valve body having a shaft part rotatably supported by the main body and a valve part for opening and closing the bore of the main body; and
an attaching member attached to the main body,
wherein the main body or the attaching member is made of transparent resin and the attaching member is attached to the main body by laser welding.

According to the ninth aspect of the invention, constructed as described above, the bore of the main body is opened and closed by the valve part rotating together with the shaft part of the valve body, so that it is possible to control the amount of intake air flowing through the bore, that is, the intake air amount.

The resin attaching member is attached to the resin main body by laser welding. Thus, it is possible to eliminate the conventionally required fixing element, mount seat, etc., so that the cost can be reduced.

By laser-welding the attaching member to the entire periphery of the main body, it is possible to eliminate a sealing material for effecting sealing between the main body and the attaching member, so that the cost can be reduced. Further, by attaching the attaching member to the main body by spot laser welding, it is possible to improve the productivity and to reduce the cost.

Further, according to a tenth aspect of the invention, there is provided a throttle body, including:
a main body defining a bore through which intake air flows;
a valve body having a shaft part rotatably supported by the main body and a valve part for opening and closing the bore of the main body;
a drive motor for rotatively driving the valve body,
wherein the main body is provided with a motor housing portion for housing the drive motor, and
an opening provided at a bottom wall portion of the motor housing portion for exposing an end portion on a side opposite to an output side of a motor housing of the drive motor to an exterior.

According to the tenth aspect of the invention, constructed as described above, the end portion on the side opposite to the output side of the motor housing of the drive motor is open to the exterior through the opening provided in the bottom wall portion of the motor housing portion of the main body, so that it is possible to improve the heat radiation property.

Further, according to an eleventh aspect of the invention, there is provided a throttle body including:
a main body defining a bore through which intake air flows;
a valve body having a shaft part rotatably supported by the main body and a valve part opening and closing the bore of the main body;
a drive motor for rotating the valve body; and
an attaching member covering an output-side end portion of a motor shaft of the drive motor,
wherein the output-side end portion of the motor shaft of the drive motor is rotatably supported on the attaching member.

According to the eleventh aspect of the invention, constructed as described above, the bore of the main body is opened and closed by the valve part rotating together with the shaft part of the valve body through driving of the drive motor, so that it is possible to control the amount of intake air flowing through the bore, that is, the intake air amount.

The output-side end portion of the motor shaft of the drive motor is rotatably supported on the attaching member, so that it is possible to reduce the load on the motor shaft of the drive motor. Thus, it is possible, for example, to set the shaft diameter of the motor shaft of the drive motor to be small, so that the size of the drive motor can be reduced and the cost can be reduced.

Further, according to a twelfth aspect of the invention, there is provided an opener opening adjusting method for the throttle body according to any one of the first through twelfth inventions including a control device to which an output signal from the throttle position sensor is input, and an opener opening adjusting means for adjusting an opener opening of the valve body, wherein a throttle opening of the valve body is set as the opener opening,
the opener opening adjusting method including:
measuring an intake air amount when the valve body is in a mechanical fully closed position;
determining by the control device a fully closed position sensor output value in a fully closed position using a measurement value of the intake air amount as a reference, and storing an opener opening sensor output value obtained by adding a sensor output value corresponding to the opener opening to the sensor output value; and adjusting the opener opening of the valve body by the opener opening adjusting means such that the sensor output value of the throttle position sensor becomes equal to the opener opening sensor output value of the control device.

According to the twelfth aspect of the invention, constructed as described above, it is possible to adjust the opener opening by the opener opening adjusting means for adjusting the opener opening of the valve body. Thus, it is possible to dispense with the conventionally required fully closed position adjusting means for adjusting the fully closed position of the valve body, so that the cost can be reduced.

Further, according to a thirteenth aspect of the invention, there is provided an opener opening adjusting method for the throttle body according to any one of the first through twelfth aspects of the inventions including a control device to which an output signal from a throttle position sensor is input; and an opener opening adjusting means for adjusting an opener opening of the valve body, wherein a throttle opening of the valve body is set as the opener opening, the opener opening adjusting method including:

measuring and storing by the control device the throttle opening at a fully closed position when the valve body is opened by a predetermined amount from a mechanical fully closed position;

using the sensor output value of the throttle position sensor at the throttle opening as a reference value and storing an opener opening sensor output value obtained by adding a sensor output value corresponding to the opener opening to the reference value; and adjusting the opener opening of the valve body by the opener opening adjusting means such that the sensor output value of the throttle position sensor becomes equal to the opener opening sensor output value of the control device.

According to the thirteenth aspect of the invention, constructed as described above, it is possible to adjust the opener opening only by the opener opening adjusting means for adjusting the opener opening of the valve body. Thus, it is possible to dispense with the conventionally required fully closed position adjusting means for adjusting the fully closed position of the valve body, so that the cost can be reduced.

Further, according to a fourteenth aspect of the invention, there is provided an opener opening adjusting method for a throttle body including a main body defining a bore through which intake air flows, a valve body having a shaft part rotatably supported by the main body and a valve part for opening and closing the bore of the main body, a throttle position sensor for detecting a throttle opening of the valve body, a control device to which an output signal of the throttle position sensor is input, and an opener opening adjusting means for adjusting an opener opening of the valve body, wherein the throttle opening of the valve body is set as the opener opening, the opener opening adjusting method including:

measuring an intake air amount when the valve body is in a mechanical fully closed position;

using a measurement value of the intake air amount as a reference and determining a fully closed position sensor output value in a fully closed position by the control device, and storing an opener opening sensor output value obtained by adding a sensor output value corresponding to the opener opening to the sensor output value; and adjusting the opener opening of the valve body by the opener opening adjusting means such that the sensor output value of the throttle position sensor becomes equal to the opener opening sensor output value of the control device.

According to the fourteenth aspect of the invention, constructed as described above, the bore of the main body is opened and closed by the valve part rotating together with the shaft part of the valve body, so that it is possible to control the amount of intake air flowing through the bore, that is, the intake air amount. Further, the throttle opening of the valve body is detected by the throttle position sensor.

It is possible to adjust the opener opening by only the opener opening adjusting means for adjusting the opener opening of the valve body. Thus, it is possible to dispense with the conventionally required fully closed position adjusting means for adjusting the fully closed position of the valve body, so that the cost can be reduced.

Further, according to a fifteenth aspect of the invention, there is provided an opener opening adjusting method for a throttle body including a main body defining a bore through which intake air flows, a valve body having a shaft part rotatably supported by the main body and a valve part for opening and closing the bore of the main body, a throttle position sensor for detecting a throttle opening of the valve body, a control device to which an output signal of the throttle position sensor is input, and an opener opening adjusting means for adjusting an opener opening of the valve body, wherein the throttle opening of the valve body is set as the opener opening, the opener opening adjusting method including:

measuring and storing by the control device the throttle opening in a fully closed position where the valve body is opened by a predetermined amount from a mechanical fully closed position;

using the sensor output value of the throttle position sensor at the throttle opening as a reference value and storing an opener opening sensor output value obtained by adding a sensor output value corresponding to the opener opening to the reference value; and adjusting the opener opening of the valve body by the opener opening adjusting means such that the sensor output value of the throttle position sensor becomes equal to the opener opening sensor output value of the control device.

According to the fifteenth aspect of the invention, constructed as described above, the bore of the main body is opened and closed by the valve part rotating together with the shaft part of the valve body, whereby it is possible to control the amount of intake air flowing through the bore, that is, the intake air amount. Further, the throttle opening of the valve body is detected by the throttle position sensor.

It is possible to adjust the opener opening only by the opener opening adjusting means for adjusting the opener opening of the valve body. Thus, it is possible to dispense with the conventionally required fully closed position adjusting means for adjusting the fully closed position of the valve body, so that the cost can be reduced.

Further, according to a sixteenth aspect of the invention, there is provided a method of manufacturing the throttle body according to any one of the first through eleventh aspects of the inventions, including molding the main body having the shaft part and the valve part with the valve body inserted, wherein, after molding the main body, annealing is effected with the valve body fully closed.

According to the sixteenth aspect of the invention, constructed as described above, after molding the main body, annealing is performed with the valve body fully open, so that it is possible to remove residual stress at the time of molding the main body with the radial heat shrinkage of the bore of the main body being suppressed. As a result, it is possible to improve the sealing property when the valve body is in the fully closed state.

Further, according to a seventeenth aspect of the invention, there is provided a method of manufacturing the throttle body according to any one of the first through eleventh aspects of the inventions, including molding the main body having the shaft part and the valve part with the valve body inserted, wherein the main body is molded with the valve part of the valve body in a fully closed position being compressed in a thickness direction to be resiliently deformed so as to undergo enlargement in an outer diameter.

According to the seventeenth aspect of the invention, constructed as described above, the main body is molded, with the valve part of the valve body in the fully closed position compressed in the thickness direction to be resiliently deformed so as to enlarge the outer diameter thereof, and then the compression of the valve part in the thickness direction is released, so that the valve part is resiliently restored to the original state to thereby reduce the outer diameter thereof. Thus, even if molding shrinkage has been caused in the main body after the molding process, it is possible to secure a predetermined clearance between the valve part and the bore inner wall surface. Thus, it is possible to reduce an air leakage amount in the fully closed state while securing the operability of the valve body.

Further, according to an eighteenth aspect of the invention, there is provided a method of manufacturing the throttle body according to any one of the first through eleventh aspects of the inventions, including molding the main body having the shaft part and the valve part with the valve body inserted, wherein the main body is molded in a body molding die for molding the main body by injecting a resin material into a cavity from a plurality of pin gates arranged at predetermined intervals along a circumference of a bore wall portion defining the bore.

According to the eighteenth aspect of the invention, constructed as described above, the main body is molded in the body molding die for molding the main body by injecting the resin material into the cavity from the plurality of pin gates arranged at predetermined intervals in the circumference of the bore wall portion defining the bore. Thus, after the molding process of the main body, it is possible to make uniform a molding pressure, molding temperature, etc. of the resin at the bore wall portion of the main body, so that it is possible to improve circularity of the bore wall portion. If a fibrous material, such as glass fibers, is mixed in the resin material, it is possible to make the orientation of the fibrous material to be uniform, so that the molding shrinkage amount of the bore wall portion is uniform at each portion in the circumference, an therefore, it is possible to improve the circularity of the bore wall portion.

Further, according to a nineteenth aspect of the invention, there is provided a method of manufacturing a throttle body including a resin main body forming a bore through which intake air flows, and a valve body having a shaft part rotatably supported by the main body and a resin valve part for opening and closing the bore of the main body, the method including molding the main body having the shaft part and the valve part with the valve body inserted, wherein, after molding the main body, annealing is effected with the valve body fully closed.

According to the nineteenth aspect of the invention, constructed as described above, after molding the main body, annealing is performed with the valve body fully open, so that it is possible to remove the residual stress at the time of molding of the main body with the radial heat shrinkage of the bore of the main body suppressed. As a result, it is possible to improve the sealing property when the valve body is in the fully closed state.

Further, according to a twentieth aspect of the invention, there is provided a method of manufacturing a throttle body including a resin main body forming a bore through which intake air flows, and a valve body having a shaft part rotatably supported by the main body and a resin valve part for opening and closing the bore of the main body, the method including molding the main body having the shaft part and the valve part with the valve body inserted, wherein the main body is molded with the valve part of the valve body in a fully closed position being compressed in a thickness direction to be resiliently deformed so as to undergo an enlargement in an outer diameter.

According to the twentieth aspect of the invention, constructed as described above, after the main body has been molded, the compression of the valve part in the thickness direction is released, so that the valve part is resiliently restored to the original state to thereby reduce the outer diameter thereof. Thus, if molding shrinkage has been caused in the main body after the molding process, it is possible to secure a predetermined clearance between the valve part and the bore inner wall surface. Thus, it is possible to reduce the air leakage amount in the fully closed state while securing the operability of the valve body.

Further, according to a twenty-first aspect of the invention, in the method of manufacturing a throttle body according to the twentieth aspect of the invention, annealing is effected with the valve body fully closed after molding the main body.

According to the twenty-first aspect of the invention, constructed as described above, it is possible to remove the residual stress at the time of molding of the main body by the valve part of the valve body in a fully closed state, with the radial heat shrinkage of the bore of the main body suppressed. As a result, it is possible to improve the sealing property when the valve body is in the fully closed state.

Further, according to a twenty-second aspect of the invention, there is provided a method of manufacturing a throttle body including a resin main body defining a bore through which intake air flows, and a valve body having a shaft part rotatably supported by the main body and a resin valve part for opening and closing the bore of the main body, the method including molding the main body having the shaft part and the valve part with the valve body inserted, wherein the main body is molded in a body molding die for molding the main body by injecting a resin material into a cavity from a plurality of pin gates arranged at predetermined intervals along a circumference of a bore wall portion defining the bore.

According to the twenty-second aspect of the invention, constructed as described above, the main body is molded in the body molding die for molding the main body by injecting the resin material into the cavity from the plurality of pin gates arranged at predetermined intervals in the circumference of the bore wall portion defining the bore. Thus, after molding the main body, it is possible to make uniform the molding pressure, molding temperature, etc. of the resin at the bore wall portion of the main body, so that it is possible to improve the circularity of the bore wall portion. If a fibrous material, such as glass fibers, is mixed in the resin material, it is possible to make the orientation of the fibrous material uniform, so that the molding shrinkage amount of the bore

BEST MODE FOR CARRYING OUT THE INVENTION

Next, the best mode for carrying out the present invention will be described with reference to embodiments.

Embodiment 1

Figure 1:
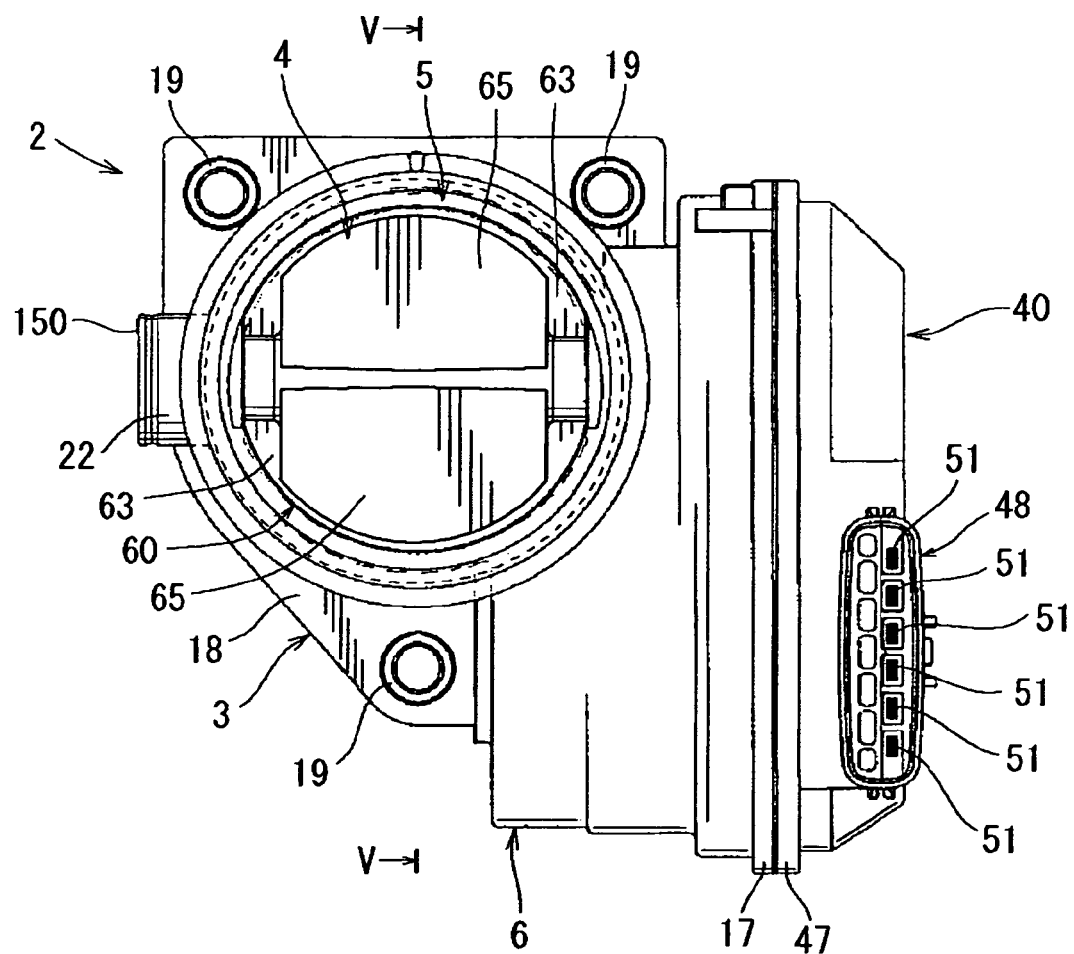
[FIG. 1] A front view of a throttle body according to Embodiment 1.
Figure 2:
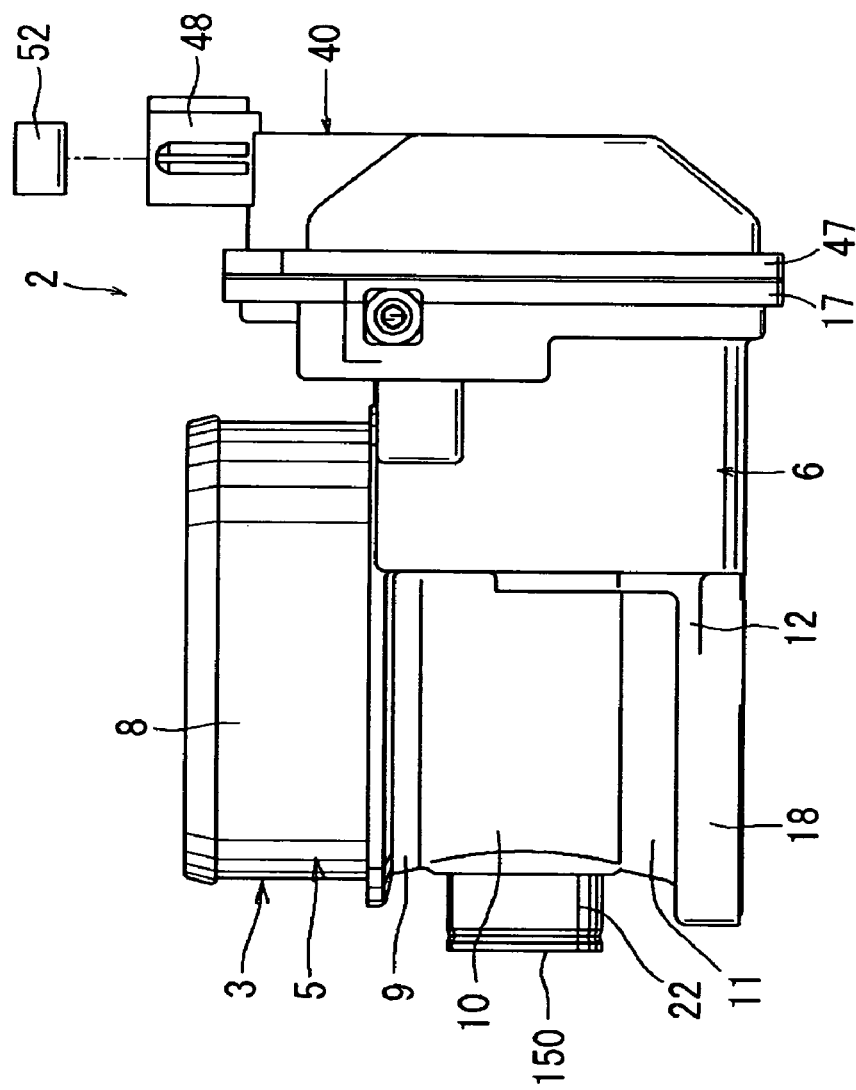
[FIG. 2] A bottom view of the throttle body.
Figure 3:
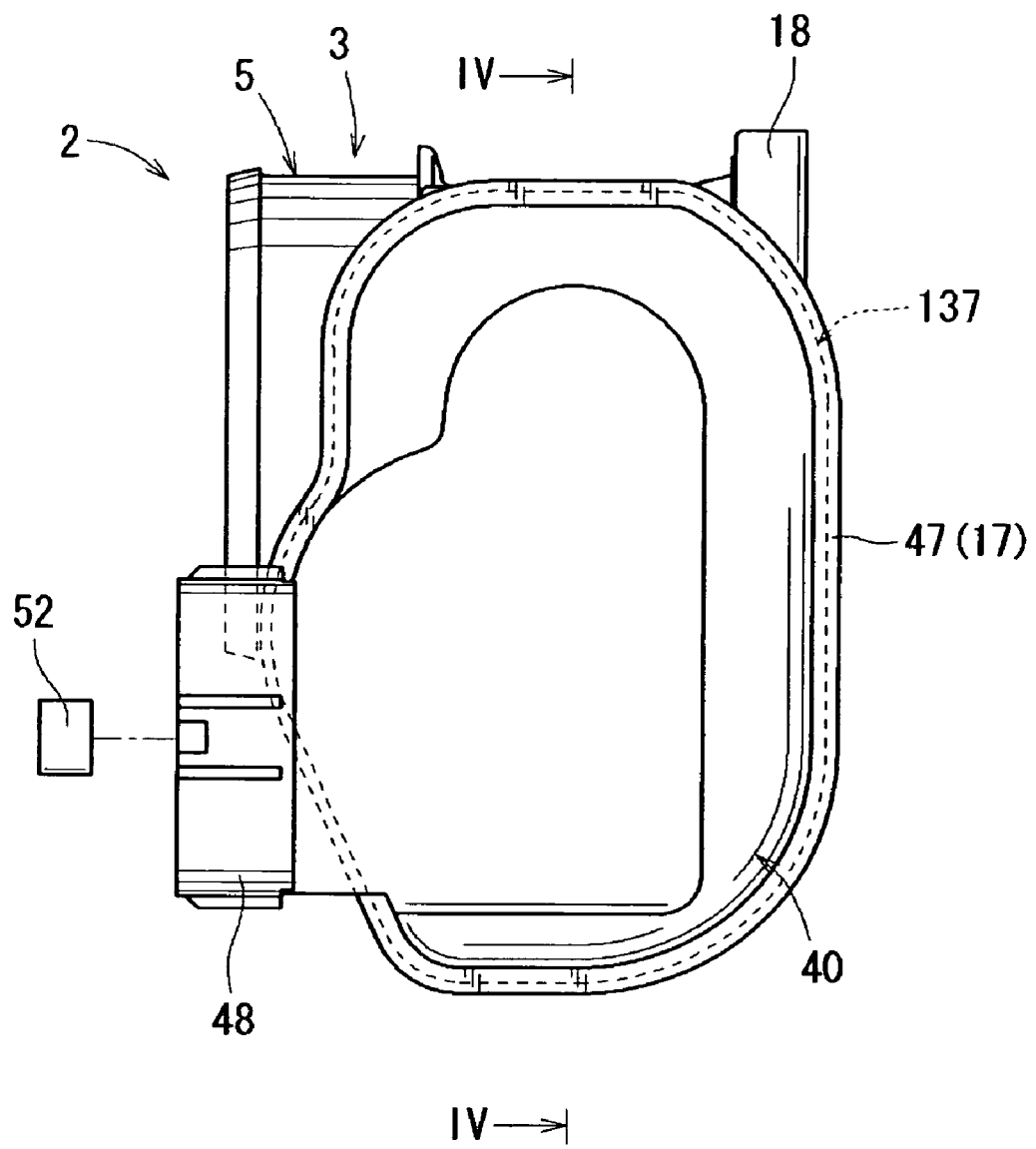
[FIG. 3] A right-hand side view of the throttle body.

Embodiment 1 will be described. This embodiment described below is applied to a so-called electronic control type throttle body, in which the opening/closing of a valve body is controlled by a drive motor. FIG. 1 is a front view of the throttle body, FIG. 2 is a bottom view of the throttle body, FIG. 3 is a right-hand side view of the throttle body, FIG. 4 is a sectional view taken along the arrow line IV-IV in FIG. 3, FIG. 5 is a sectional view taken along the arrow line V-V in FIG. 1, and FIG. 6 is a side view of the cover body mounting side.

Figure 4:
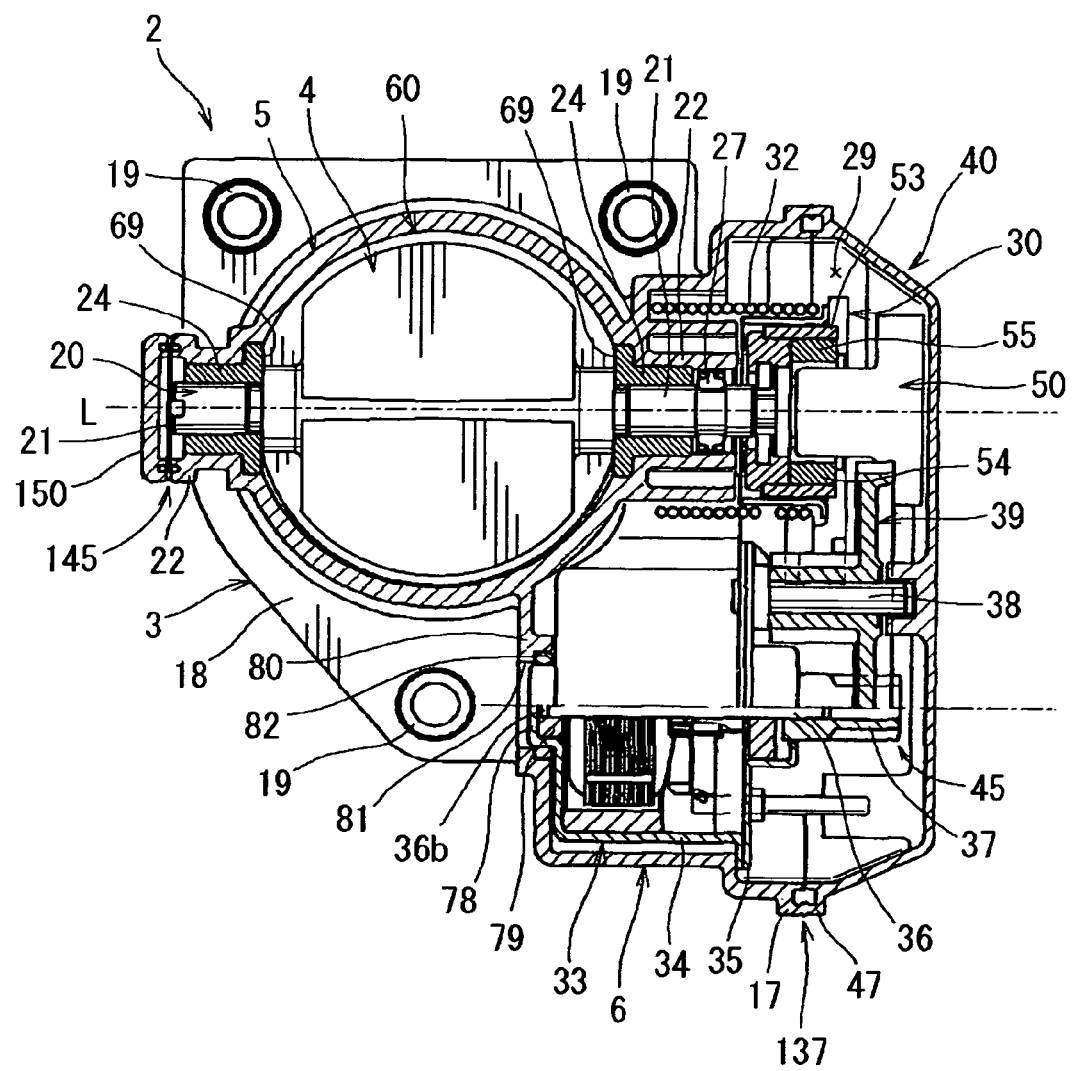
[FIG. 4] A sectional view taken along the arrow line IV-IV in FIG. 3.
Figure 5:
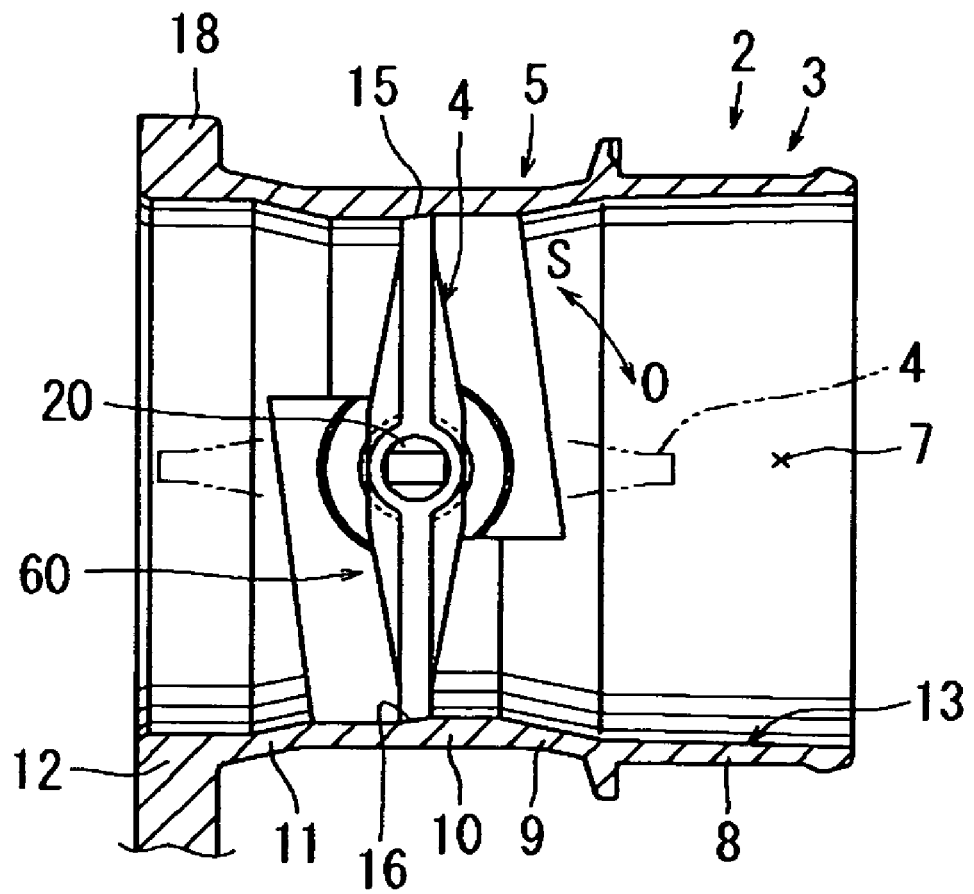
[FIG. 5] A sectional view taken along the arrow line V-V in FIG. 1.
Figure 6:
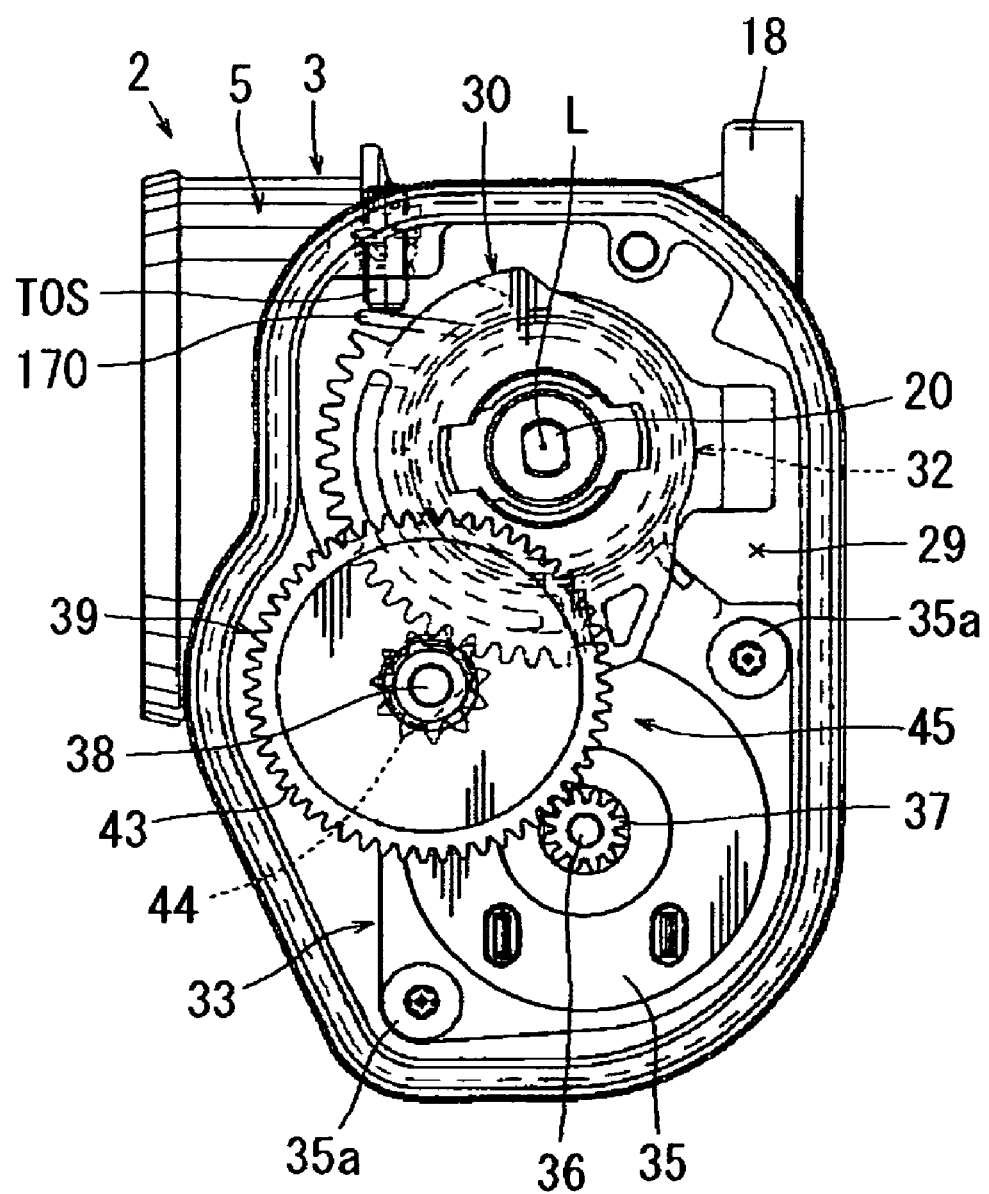
[FIG. 6] A side view showing the cover body mounting side.

As shown in FIG. 5, a throttle body 2 is provided with a resin main body 3 and a resin valve member 4 (see FIGS. 1 and 4). The main body 3 and the valve member 4 are both formed by injection molding processes.

With the main body 3, a bore wall portion 5 and a motor housing portion 6 are integrally molded (see FIGS. 1 and 4).

The bore wall portion 5 is formed substantially as a hollow cylinder having a bore 7 extending in the horizontal direction as seen in FIG. 5. The bore wall portion 5 has a straight cylindrical inlet-side tubular connecting portion 8 extending continuously from the right to the left in FIG. 5, a conical tubular portion 9 formed as a conical tube whose diameter is gradually decreased, a primary tubular portion 10 formed as a straight cylinder, an inverted conical tubular portion 11 formed as an inverted conical tube whose diameter gradually increases, and an outlet-side tubular connecting portion 12 formed as a straight cylinder. The inner wall surface of the bore 7 of the bore wall portion 5 composed of the tubular portions 8, 9, 10, 11, and 12 will be generally referred to as "bore wall surface" (labeled with numeral 13).

On the inner peripheral surface of the primary tubular portion 10, an annular-strip-like sealing surface 16 is formed and is surface-to-surface contact with a sealing surface 15 at the outer peripheral end surface of the valve member 4 (hereinafter described) (see FIGS. 8 and 9). The sealing surfaces 15 of the valve member 4 will be referred to as "valve-side sealing surfaces", and the sealing surface 16 of the main body 3 will be referred to as "body-side sealing surface".

As shown in FIG. 2, a flange portion 18 for fastening protrudes substantially in a triangular-plate-like fashion and is connected with the outer peripheral surface of the opening end portion on the side of the outlet-side tubular connecting portion 12 (lower side in FIG. 2) of the bore wall portion 5 (see FIG. 1). Metal bushes 19 are provided at the corners of the flange portion 18 for fastening (see FIG. 1). Fastening bolts (not shown) for fastening an intake manifold, which is arranged on the downstream side of the main body 3, to the flange portion 18 for fastening can be passed through the bushes 19.

An air cleaner (not shown) arranged on the upstream side of the main body 3 is fitted into the inlet-side tubular connecting portion 8 of the bore wall portion 5 for communication therewith. The intake manifold (not shown), which is arranged on the downstream side of the main body 3, is fastened to the flange portion 18 for fastening by fastening bolts/nuts for communication with the outlet-side tubular connecting portion 12 of the bore wall portion 5. In this way, communication is established between the bore wall portion 5 of the main body 3, the air cleaner, and the intake manifold, so that intake air from the air cleaner flows to the intake manifold through the bore 7 in the bore wall portion 5.

As shown in FIG. 4, a metal throttle shaft 20 is disposed in the bore wall portion 5 and extends radially across the bore 7 (in horizontal direction in FIG. 4). Right and left support shaft portions 21 formed at both ends of the throttle shaft 20 are rotatably supported by a pair of right and left bearing sleeves 24 inserted into a pair of right and left bearing boss portions 22 formed integrally with the bore wall portion 5. The bearing sleeves 24 are formed of a pair of metal bushes arranged symmetrically on the right and left sides. The outer peripheral portions of the bearing sleeves 24 are respectively surrounded by the bearing boss portions 22 and are placed in position with respect to the axial direction.

In FIG. 4, the left-hand end portion of the throttle shaft 20 is accommodated in the left-hand bearing boss portion 22. A plug 150 is mounted to the left-hand bearing portion 22 for sealing the opening end surface thereof.

The right-hand end portion of the throttle shaft 20 extends through the right-hand bearing boss portion 22 and protrudes to the right. A rubber sealing material 27 is fitted into the right-hand bearing boss portion 22 from the opening side thereof (right-hand side in FIG. 4). The inner peripheral portion of the sealing material 27 is slidably fitted into a circumferential annular groove (not labeled with reference numeral) formed in the outer peripheral surface of the throttle shaft 20. Due to the sealing material 27, air leakage from a gear housing space 29 (described below) into the bore 7, and air leakage from the bore 7 into the gear housing space 29 are prevented.

As shown in FIG. 5, the substantially disc-like valve member 4 is formed integrally with the throttle shaft 20 by an insert molding process. The valve member 4 rotates together with the throttle shaft 20 to open/close the bore 7 in the bore wall portion 5 in order to control the amount of intake air flowing through the bore 7. The solid line 4 indicates the closed state of the valve member 4. Rotating clockwise in FIG. 5 from the closed state (i.e., in direction of arrow O in FIG. 5), sets the valve member 4 to the open state (indicated by dash-double-dot lines 4 in FIG. 5). Rotating counterclockwise in FIG. 5 (i.e., in direction of arrow S in FIG. 5) from the open state sets the valve member 4 to the closed state (see solid line 4 in FIG. 5).

As shown in FIG. 4, a throttle gear 30 formed, for example, of a resin sector gear, is integrally provided at the right-hand end portion of the throttle shaft 20, which protrudes from the right-hand bearing boss portion 22 (see FIG. 6).

Further, between the throttle gear 30 and the side surface of the main body 3 facing the end surface of the throttle gear 30, a back spring 32 is provided to be positioned on the rotational axis L of the throttle shaft 20. The back spring 32 holds the throttle gear 30 constantly and resiliently in a position (hereinafter referred to as opener opening position) opened by a predetermined angle from the fully open position.

As shown in FIG. 6, the back spring 32 has an intermediate contact portion 170 that can be brought, by the resilient force of the back spring, into contact with an opener opening adjusting screw TOS provided in the main body 3. Thus, when a drive motor 33 (described below) is not energized (non-energization state), the intermediate contact portion 170 resiliently contacts with the opener opening adjusting screw TOS by the resilient force of the back spring 32. The throttle gear 30 is therefore held in a position where the valve member 4 (see FIG. 5) is slightly open (which corresponds to the opener opening). When the drive motor 33 is driven in the closing direction, the throttle gear 30 rotates the valve member 4 (see FIG. 5) in the closing direction with respect to the opener opening (in a direction of arrow S in FIG. 5) against the resilient force of the back spring 32 while keeping the intermediate contact portion 170 in contact with the opener opening adjusting screw TOS. When the drive motor 33 is driven in the opening direction, the throttle gear 30 rotates the valve member 4 (see FIG. 5) in the opening direction with respect to the opener opening (in direction of arrow O in FIG. 5) against the resilient force of the back spring 32 so that the intermediate contact portion 170 moves away from the opener opening adjusting screw TOS. Further, between the opener opening and the fully closed position of a valve body 60, an idle speed control is performed. The opener opening adjusting screw corresponds to the "opener opening adjusting means" in the present specification.

As shown in FIG. 4, the motor housing portion 6 of the main body 3 is substantially formed as a bottomed cylinder parallel to the rotational axis L of the throttle shaft 20 and open to the right in FIG. 4. The drive motor 33 constituted, for example, by a DC drive motor is accommodated in the motor housing portion 6. A mounting flange 35 is provided on a motor housing 34 defining an outer contour of the drive motor 33 and is fixed to the main body 3 by fixing means (e.g., screws 35a) (see FIG. 6).

Further, a motor pinion 37 formed, for example, of a resin (see FIG. 6) is integrally formed with the output side end of a motor shaft 36, which protrudes to the right in FIG. 4 from the mounting flange 35 of the drive motor 33.

As shown in FIG. 4, between the main body 3 and a cover body 40 closing the open end surface thereof (right-hand open end surface in FIG. 4), a solid counter shaft 38 is provided and extends parallel to the rotational axis L of the throttle shaft 20.

A counter gear 39 formed, for example, of a resin is rotatably supported by the counter shaft 38. As shown in FIG. 6, the counter gear 39 has a large diameter gear part 43 and a small diameter gear part 44 which are of different gear diameters. The large diameter gear part 43 is in mesh with the motor pinion 37, and the small diameter gear part 44 is in mesh with the throttle gear 30.

A reduction gear mechanism 45 is constituted by the throttle gear 30, the motor pinion 37, and the counter gear 39. The reduction gear mechanism 45 is accommodated in the gear housing space 29 formed between the main body 3 and the cover body 40 (see FIG. 4).

The cover body 40, which is formed, for example, of a resin, is mounted to one side surface (right-hand side surface in FIG. 4) of the main body 3. The mounting structure for the cover body 40 will be described in detail below.

As shown in FIG. 1, a connector portion 48 is formed integrally with the cover body 40. An external connector (not shown) electrically is connected to a control device 52 (described below) and can be connected to the connector portion 48. A predetermined number of terminals 51 are arranged in the connector portion 48. The terminals 51 are electrically connected to the drive motor 33 and a throttle position sensor 50 described below (see FIG. 4).

The drive motor 33 (see FIG. 4) is drive-controlled by the control device 52, such as an engine control unit, or an ECU of an automobile (see FIGS. 2 and 3), in response to an accelerator signal related to gas pedal depressing amount, a traction control signal, a constant-speed traveling signal, and an idle speed control signal.

The drive force of the motor shaft 36 of the drive motor 33 is transmitted from the motor pinion 37 to the throttle shaft 20 through the counter gear 39 and the throttle gear 30. This causes the valve member 4, which is integrated with the throttle shaft 20, to be rotated, with the result that the bore 7 is opened or closed.

As shown in FIG. 4, the throttle gear 30 is integrally provided with a ring-like yoke 53 made of a magnetic material and positioned coaxially with the rotational axis L of the throttle shaft 20. The inner peripheral surface of the yoke 53 is integrated with a pair of magnets 54 and 55 generating magnetic fields. The magnets 54 and 55 are formed, for example, of ferrite magnets, and are parallel-magnetized so that the magnetic lines of force generated between them, that is, the magnetic fields, are parallel to each other, generating substantially parallel magnetic fields in the space within the yoke 53.

On the inner side surface of the cover body 40, the throttle position sensor 50, which is a rotation angle sensor equipped with a sensor IC (not shown) with a built-in magnetoresistive element, is positioned. The throttle position sensor 50 is positioned on the rotational axis L of the throttle shaft 20 and between the magnets 54 and 55 at a predetermined interval. The throttle position sensor 50 computes the output from the magnetoresistive element and outputs an output signal corresponding to the direction of the magnetic field to the control device 52, so that it is possible to detect the direction of the magnetic field without depending on the intensity of the magnetic field.

With the above-mentioned throttle body 2 (see FIGS. 1 through 6), when the engine is started, the drive motor 33 is drive-controlled by the control device 52. As noted above, the valve member 4 is thereby opened/closed through the reduction gear mechanism 45, with the result that the amount of intake air flowing through the bore 7 of the main body 3 is controlled.

As the throttle shaft 20 rotates, the yoke 53 and the magnets 54 and 55 rotate together with the throttle gear 30, so that the direction of the magnetic field across the throttle position sensor 50 varies in response to the rotation angle, and the output signal of the sensor 50 varies. The control device 52 thereby calculates the rotation angle of the throttle shaft 20, that is, the throttle opening of the valve member 4, in response to the output signal of the throttle position sensor 50.

The control device 52 (see FIGS. 2 and 3) controls so-called control parameters, such as fuel injection control, correction control on the opening of the valve member 4, and automatic transmission control based on the throttle opening output from the throttle position sensor 50 (see FIG. 4) and detected according to the direction of the magnetic field as magnetic physical amount of the pair of magnets 54 and 55, vehicle speed detected by a vehicle speed sensor (not shown), engine RPM according to a crank angle sensor, and detection signals from sensors such as a gas pedal sensor, an $O_2$ sensor, and an air flow meter.

Figure 8:
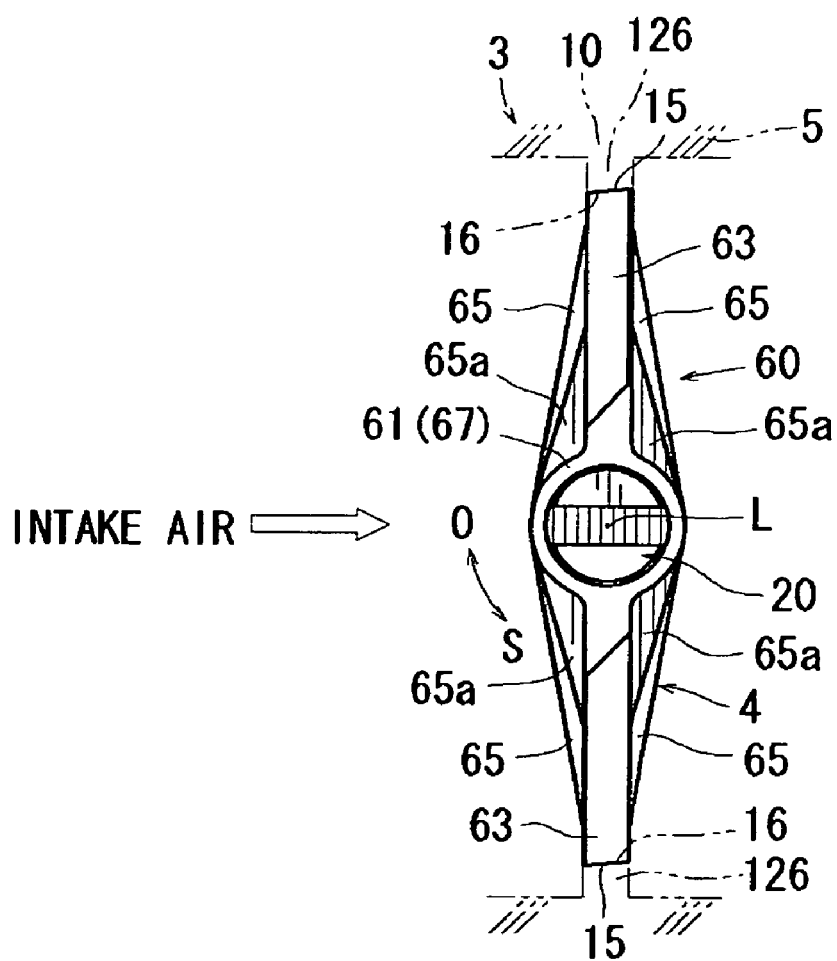
[FIG. 8] A side view as viewed in a direction of arrow line XIII in FIG. 7.
Figure 9:
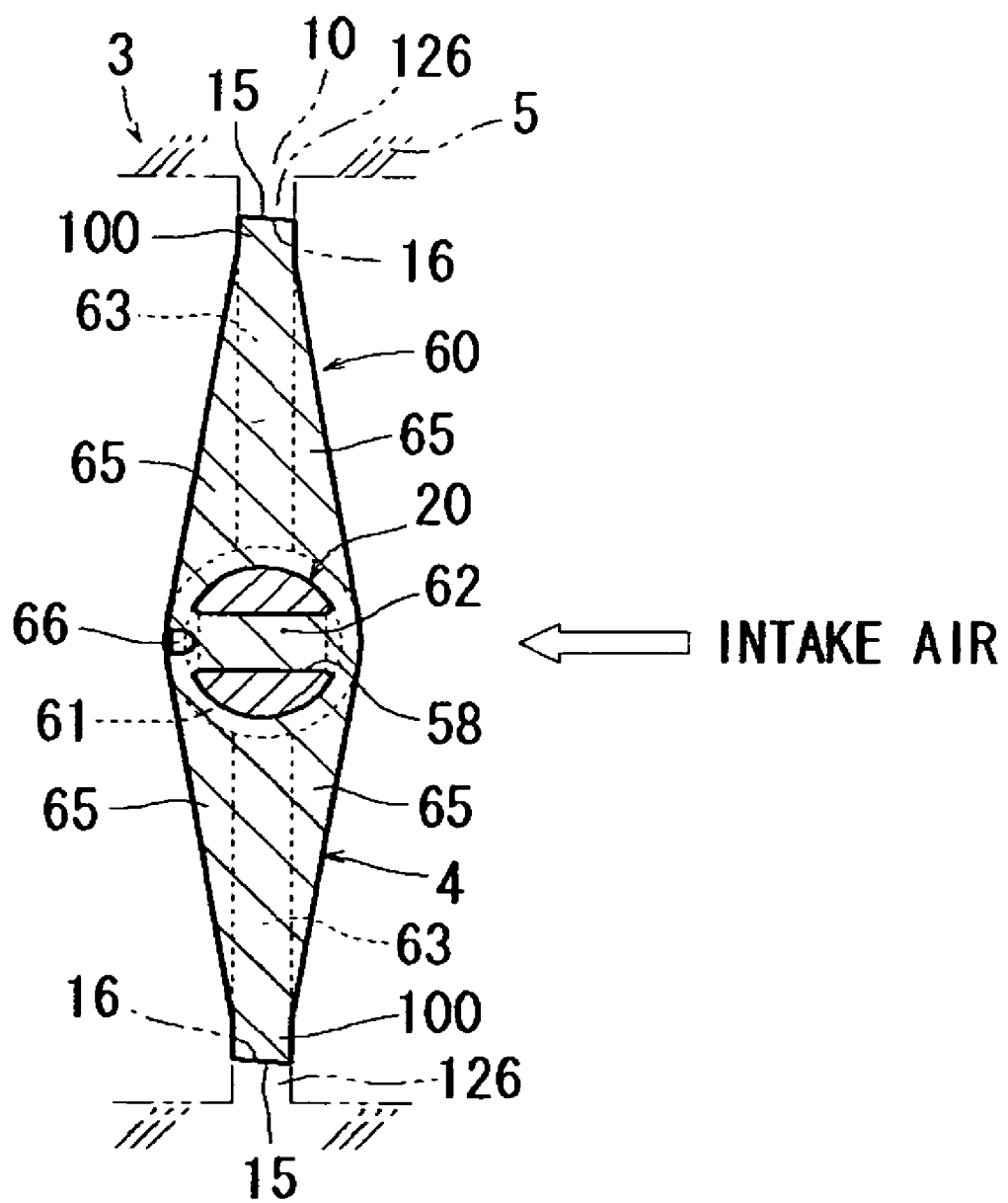
[FIG. 9] A sectional view taken along the arrow line IX-IX in FIG. 7.

As shown in FIG. 9, the resin of the valve member 4, integrally molded on the throttle shaft 20, surrounds the periphery of the throttle shaft 20. At the center of the throttle shaft 20 corresponding to the center of the valve member 4, a through-hole 58 is formed to extend radially, and the resin has been flown into the through-hole 58. The valve body 60 is constituted by the throttle shaft 20 and the valve member 4 (see FIGS. 7 and 8).

The valve member 4 corresponds to the "valve part" in the present specification. The throttle shaft 20 corresponds to the "shaft part" in the present specification. While in this embodiment the valve body 60 is formed by integrating the throttle shaft 20 and the valve member 4, it is also possible to form the shaft part and the valve part as an integral unit of a resin (e.g., integral molding), thus forming a resin valve part in the form of a single component.

Figure 7:
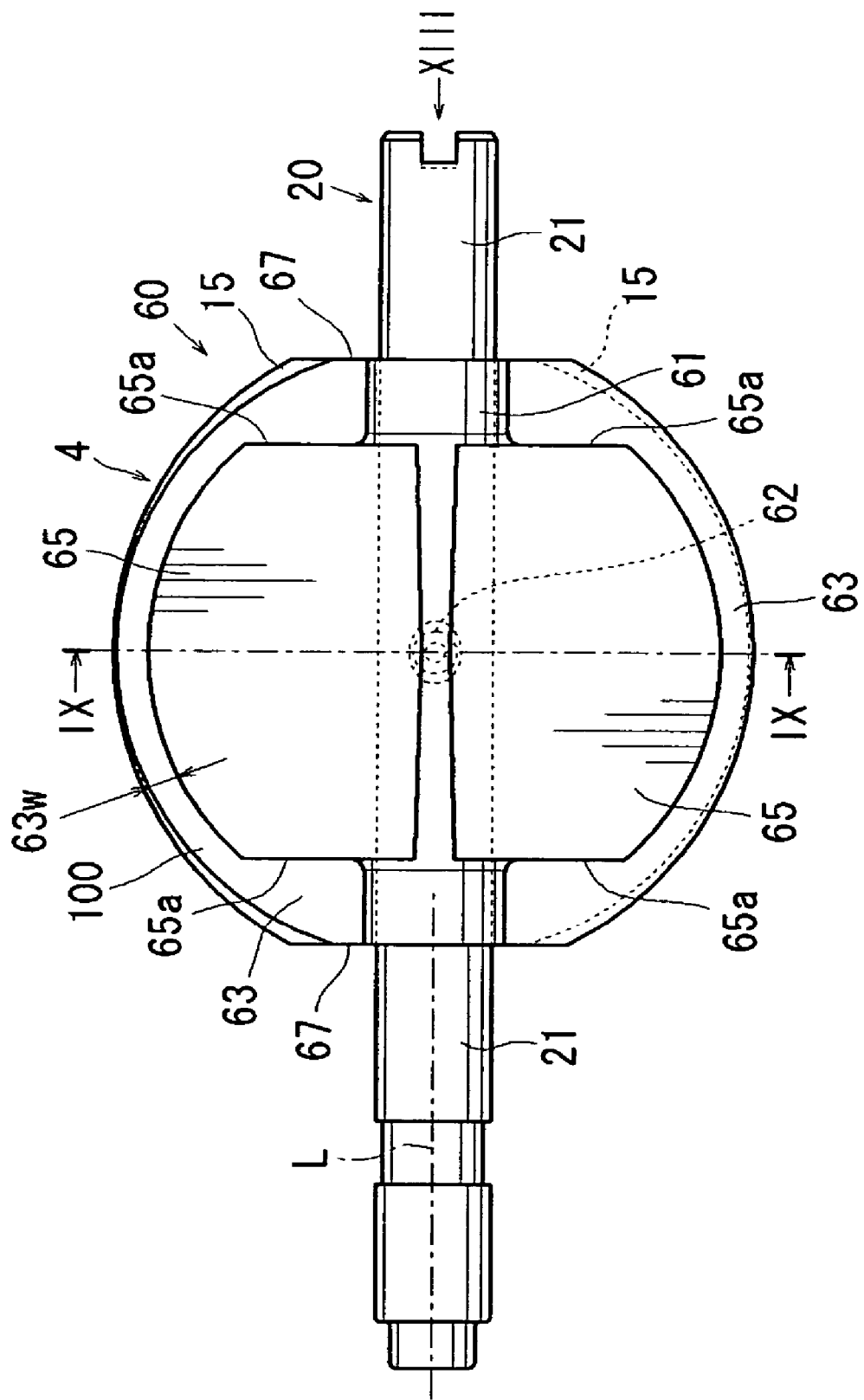
[FIG. 7] A front view of a valve body.

As shown in FIG. 7, the valve member 4 has a shaft cover portion 61, a bridging portion 62, plate-like portions 63, and rib portions 65. As shown in FIG. 9, the shaft cover portion 61 is formed in a substantially cylindrical configuration so as to surround the throttle shaft 20. The bridging portion 62 extends between opposing surfaces at the center of the shaft cover portion 61 so as to extend through the through-hole 58 of the throttle shaft 20. The plate-like portions 63 are formed of a pair of semi-circular portions and protrude in opposite directions from the shaft cover portion 61 so as to constitute a single disc (see FIGS. 7 and 8). The valve-side sealing surfaces 15 are formed at the outer peripheral end surfaces of the plate-like portions 63 (see FIGS. 8 and 9).

As shown in FIG. 8, the valve-side sealing surfaces 15 of the plate-like portions 63 are formed in point symmetry with respect to the axis L, and are formed as tapered surfaces whose outer diameter gradually increases from the closed side (see the direction of arrow S) toward the open side (see the direction of arrow O) with respect to the thickness direction. Further, the valve-side sealing surfaces 15 are formed at the time of molding the valve member 4, and are in surface-to-surface contact with the sealing surface 16 of the main body 3. As stated above, on the bore wall surface 13 of the primary tubular portion 10 of the main body 3, the body-side sealing surface 16 is formed and is in surface-to-surface contact with the valve-side sealing surfaces 15 of the valve member 4 (see FIGS. 8 and 9). In this embodiment, the sealing surface 16 of the main body 3 is formed by the inner peripheral end surface of a convex ridge portion 126 protruding in a flange-like fashion from the bore wall surface 13 of the primary tubular portion 10 of the main body 3 (see FIGS. 8 and 9).

As shown in FIGS. 8 and 9, the rib portions 65 expands from the front and back surfaces of the plate-like portions 63 while being continuous with the shaft cover portion 61. The ridges of the rib portions 65 extend tangentially from a position proximally to the outer peripheral ends of the plate-like portions 63 with respect to the outer peripheral surface of the shaft cover portion 61. The section of each rib portion 65 taken in a direction orthogonal to the axial direction of the valve member 4 is formed in a streamlined configuration whose thickness (thickness in the horizontal direction in FIG. 9) is larger on the shaft cover portion 61 side and smaller on the outer peripheral end sides of the plate-like portions 63.

As shown in FIG. 7, the outer peripheral end portions of the plate-like portions 63 of the valve member 4 are formed as arcs having a predetermined width 63w. The annular portion including the portions of the plate-like portions 63 formed with the width 63w and the end portions of the shaft cover portion 61 continuous with these portions will be referred to as outer peripheral valve portion 100.

A lateral end face 65a defining a plane orthogonal to the rotational axis L of the throttle shaft 20 is formed on each rib portion 65. Both axial end portions of the shaft cover portion 61 are thereby exposed beyond the lateral end faces 65a of the rib portions 65. Further, both lateral end faces 65a of the rib portions 65 function as a pair of positioning reference planes 65a (indicated by the same reference numeral 65a as the lateral end faces) for axial positioning of the valve body 60 with respect to a body molding die 90 (described below).

Further, in the front surface and/or the back surface of the shaft cover portion 61 of the valve member 4 (which, in this embodiment, is the downstream side (left-hand side) surface in FIG. a positioning hole 66 is formed as a bottomed hole situated coaxially with the through-hole 58 of the throttle shaft 20. The positioning hole 66 functions as positioning means when setting the valve body 60 with respect to the body molding die 90 (described below).

The right-hand and left-hand sides and the front and back sides of the valve member 4 are formed symmetrically except for the valve-side sealing surfaces 15 (see FIGS. 7 through 9).

Next, a method of manufacturing the above-mentioned throttle body 2 will be described. The method of manufacturing the throttle body 2 is a method of molding the main body 3 with the valve body 60 inserted, and includes a process for molding the valve body 60 and a process for molding the main body 3.

In the process for molding the valve body 60, the valve member 4 is molded by a resin injection molding process using a valve molding die (mold). In this process, the throttle shaft 20 is inserted into the valve molding die, and then resin is injected into a mold space, that is, so-called cavity in conformity with the configuration of the valve member 4, so that the valve 60 is molded with the valve member 4 integrated with the throttle shaft 20 (see FIGS. 7 through 9). Since the valve molding die used in this process is of a well-known construction, a description thereof will be omitted.

Next, in the process for molding the main body 3, the main body 3 is molded by a resin injection molding process using a body molding die (mold). In this process, the valve body 60 molded in the previous process, the bearing sleeves 24, etc. are inserted, and then resin is injected into a mold space, that is, so-called cavity corresponding to the configuration of the main body 3, so that the main body 3 is molded with the valve body 60 assembled (see FIG. 5). Further, the resin is filled along the valve-side sealing surfaces 15 of the valve member 4, so that the body-side sealing surface 16 in conformity with the valve-side sealing surfaces 15 is formed in the main body 3 (see FIGS. 8 and 9). The body molding die used in this process will be described below.

The sealing material 27, the back spring 32, the drive motor 33, the reduction gear mechanism 45, the cover body 40, etc. are assembled to the throttle body 2 molded by the manufacturing process described above, so that the throttle body 2 is completed (see FIGS. 1 through 4).

As the resin material of the main body 3 and the valve member 4 described above, it is possible to use a composite material using a synthetic resin as the base material (matrix). Examples of the synthetic resin base material that can be adopted include polyester type resins such as polyethylene terephthalate and polybutylene terephthalate, polyolefin type resins such as polyethylene and polypropylene, polyamide type resins such as polyamide 6, polyamide 66, and aromatic polyamide, general-purpose resins such as ABS, polycarbonate, and polyacetal, super engineering plastics such as a polyacetal resin, polyphenylene sulfide, polyether sulfone, polyetherether ketone, polyether nitrile, and polyether imide, thermosetting resins such as a phenol resin, an epoxy resin, and an unsaturated polyester resin, and synthetic resins such as a silicone resin and a teflon (registered trademark) resin.

The above-mentioned composite material includes a fibrous material and a filler material. Examples of such materials that can be adopted include fibers such as glass fiber, carbon fiber, ceramics fiber, cellulose fiber, vinylon fiber, brass fiber, and aramide fiber, calcium carbonate, zinc oxide, titanium oxide, alumina, silica, magnesium hydroxide, talc, calcium silicate, mica, glass, carbon, graphite, thermosetting resin powder, and cashew dust. In some cases, it is possible to mix flame retardant, ultraviolet inhibitor, antioxidant, lubricant, etc. with the composite material In the case of the throttle body 2, the moving amount in the thrust direction (horizontal direction in FIG. 4) of the valve member 4 is regulated by sliding contact of the opposing end faces of the valve member 4 of the valve body 60 and the bearing sleeves 24. The end faces 67 of the valve member 4 (see FIG. 7) opposed to the end faces 69 of the bearing sleeves 24 (see FIG. 4) will be referred to as "the slide faces of the valve member 4, the valve-side slide faces", etc. The end faces 69 of the bearing sleeve 24 (see FIG. 4) will be referred to as "slide faces of the bearing sleeves 24, the bearing-side slide faces 69", etc. The valve-side slide faces 67 and the bearing-side slide faces 69 are defined by planes orthogonal to the rotational axis L of the throttle shaft 20. Between the valve-side slide faces 67 and the bearing-side slide faces 69, predetermined gaps, so-called clearances are ensured for improving the operability regarding the opening/closing of the valve body 60. The bearing sleeves 24 may be replaced by roller bearings.

Figure 10:
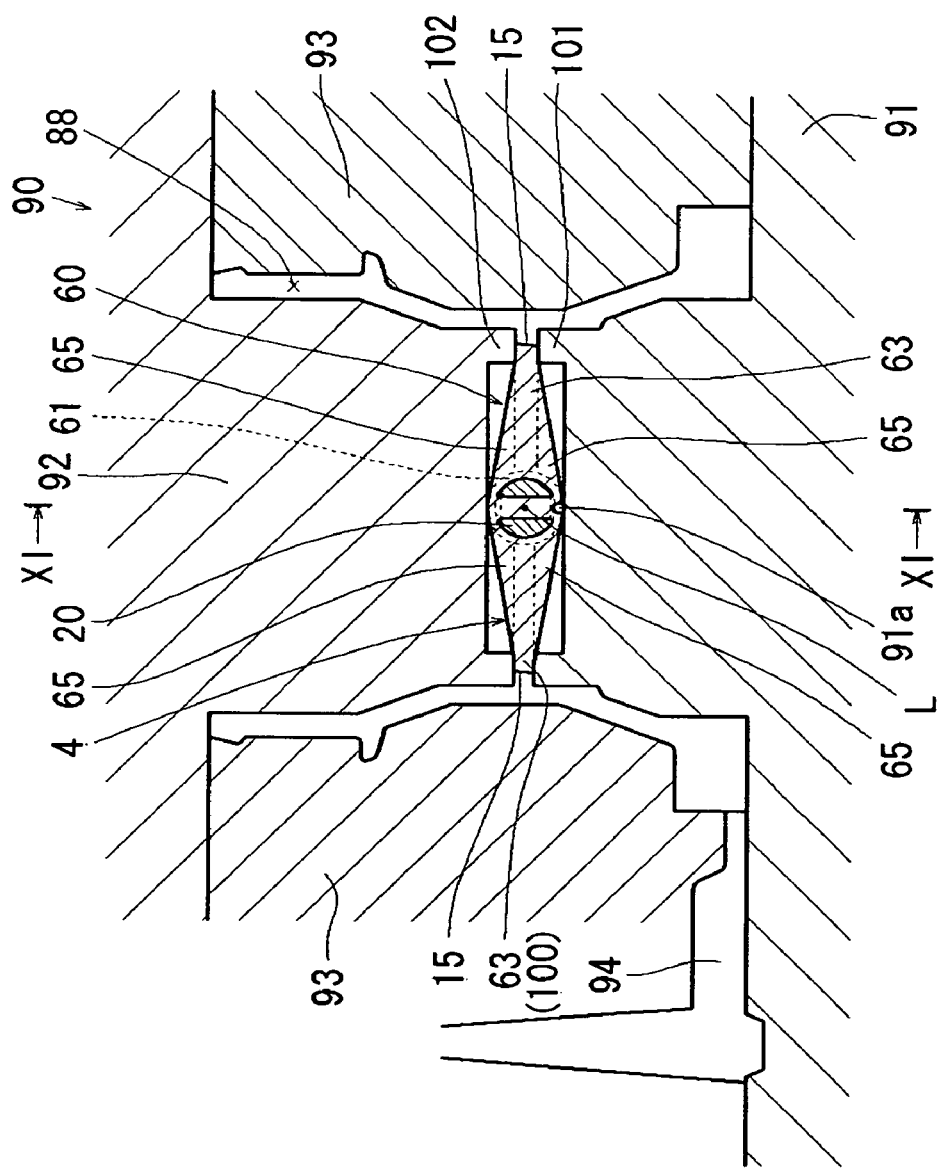
[FIG. 10] A side sectional view of a body molding die.

Next, the molding die (hereinafter referred to as "body molding die") for molding the main body 3, with the valve body 60 (see FIGS. 7 through 9) inserted together with the pair of bearing sleeves 24, will be described. FIG. 10 is a side sectional view of the body molding die, and FIG. 11 is a sectional view taken along the arrow line XI-XI of FIG. 10.

In the case of this embodiment, a body molding die 90 (see FIGS. 10 and 11) is used to mold the main body 3 (see FIG. 5), with the valve member 4 of the valve body 60 set in the fully closed state and with the inlet-side tubular connecting portion 8 of the main body 3 directed upwards and the outlet-side tubular connecting portion 12 thereof directed downwards.

Figure 11:
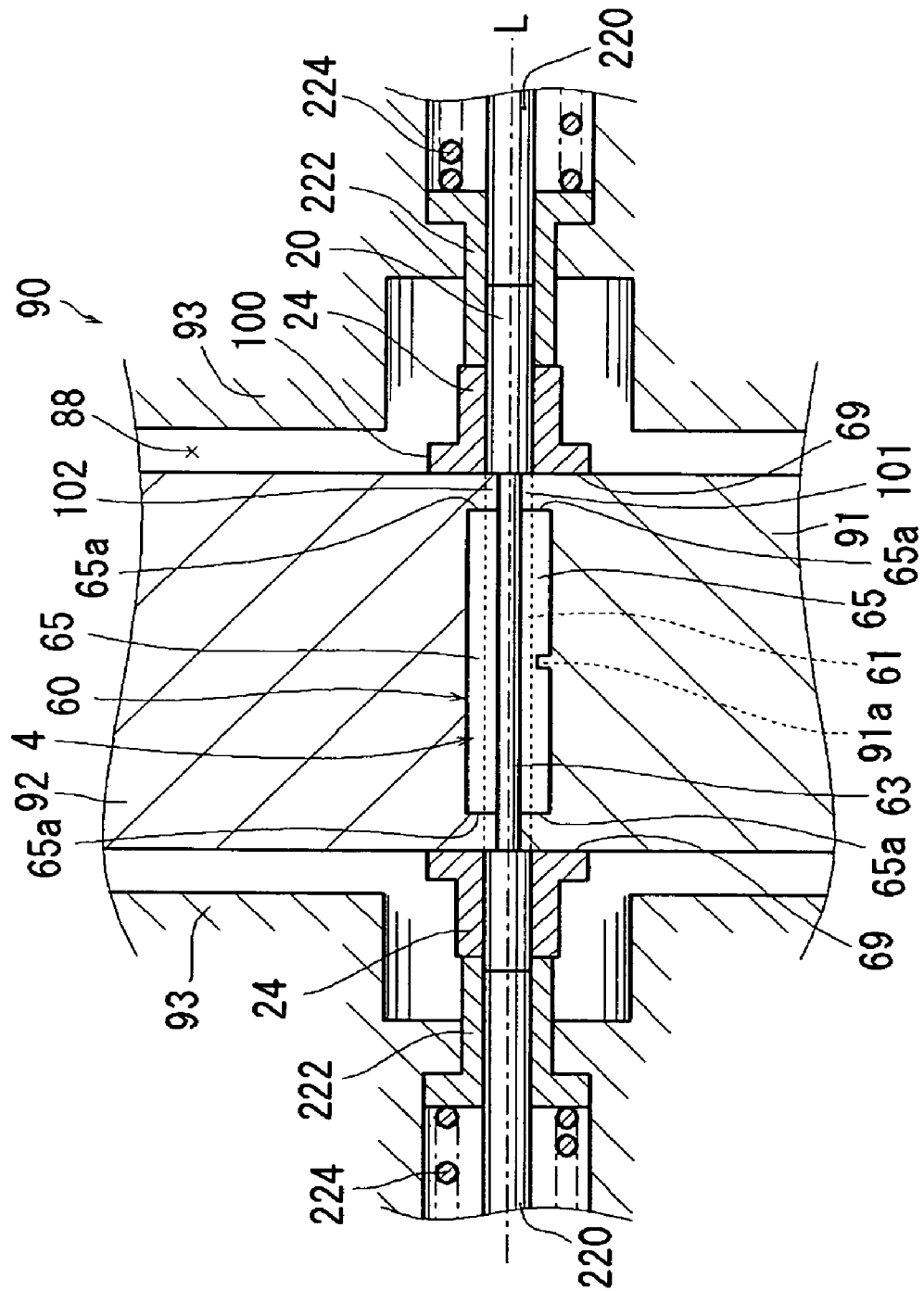
[FIG. 11] A sectional view taken along the arrow line XI-XI in FIG. 10.

As shown in FIG. 11, the body molding die 90 molds the main body 3, with the valve body 60 and the pair of right and left bearing sleeves 24 inserted. The body molding die 90 is equipped with a lower die 91 which is a stationary die defining a cavity 88 corresponding to the main body 3, an upper die 92 which is a movable die capable of moving vertically, and a plurality of (four in total including those on the front, rear, right and left sides in this embodiment) lateral dies 93 which are movable dies capable of laterally moving.

In the case of this embodiment, the outer peripheral valve portion 100 defined by the outer peripheral ends of the plate-like portions 63 of the valve member 4 (see FIG. 7) and by the end portions of the shaft cover portion 61 is held between a straight tubular portion 101 provided at the lower end surface of the lower die 91 and a straight tubular portion 102 provided at the upper end surface of the upper die 92 (see FIGS. 10 and 11). Intrusion of resin into the rib portions 65 is therefore prevented or mitigated, thus making it possible to suppress generation of resin burrs at the outer peripheral valve portion 100.

The central portion including the rib portions 65 of the valve member 4 is accommodated in the straight tubular portion 101 of the lower die 91 and the straight tubular portion 102 of the upper die 92. Further, a flange-like space portion constituting a part of the cavity 88 and facing the sealing surfaces 15 of the valve member 4 (see FIG. 10) is defined between the outer peripheral portions of the straight tubular portion 101 of the lower die 91 and the straight tubular portion 102 of the upper die 92.

As shown in FIG. 11, the inner side surfaces of the straight tubular portion 101 of the lower die 91 and the straight tubular portion 102 of the upper die 92 are respectively formed so as to be capable of coming into surface-to-surface contact with the positioning reference planes 65a of the rib portions 65 on the front and back surfaces of the valve member 4. The positioning reference planes 65a of the rib portions 65 of the valve member 4 are respectively brought into surface-to-surface contact with the inner side surfaces of the straight tubular portions 101 and 102, so that the valve member 4 of the valve body 60 is positioned with respect to the axial direction (horizontal direction in FIG. 11).

The outer side surfaces of straight tubular portion 101 of the lower die 91 and the straight tubular portion 102 of the upper die 92 are formed so as to be capable of being respectively brought into surface-to-surface contact with the end faces 69 of the bearing sleeves 24. The end faces 69 of the bearing sleeves 24 respectively come into contact with the outer side surfaces of the straight tubular portions 101 and 102, so that the bearing sleeves 24 is positioned with respect to the axial direction (horizontal direction in FIG. 11).

A positioning projection 91a protrudes from the upper surface of the lower die 91. When the valve member 4 of the valve body 60 is set on the lower die 91, the positioning hole 66 (see FIG. 9) of the valve member 4 is fitted with the positioning projection 91a, so that the valve member 4 of the valve body 60 is positioned at a predetermined set position. The positioning of the valve body 60 by the positioning projection 91a and the positioning hole 66 is primarily aimed to position the throttle shaft 20 with respect to the radial direction (horizontal direction in FIG. 10).

As shown in FIG. 11, shaft presser pins 220 are respectively axially (right and left directions in FIG. 11) movably disposed in the right-hand and left-hand lateral dies 93. On the rotational axis L of the throttle shaft 20, the shaft presser pins 220 are forced in opposite directions by the resilient force of presser pin spring members that are not shown. The opposing end surfaces of the shaft presser pins 220 can abut the end surfaces of the throttle shaft 20, with the throttle shaft 20 being resiliently retained by the shaft presser pins 220. Since the positioning of the valve body 60 is effected between the lower die 91 and the upper die 92, it is also possible to eliminate the shaft presser pins 220.

In the right-hand and left-hand lateral dies 93, cylindrical bearing presser bushes 222 are respectively disposed so as to be axially movable on the shaft presser pins 220. On the shaft presser pins 220, the bearing presser bushes 222 are forced in opposite directions by the resilient force of bush presser spring members 224 formed of coil springs or the like. The opposing end surfaces of the bearing presser bushes 222 can abut the outer end surfaces (surfaces on the side opposite to the sliding side), and the bearing sleeves 24 are resiliently brought into contact, by the bearing presser bushes 222, with the outer side surfaces of the straight tubular potion 101 of the lower die 91 and the straight tubular portion 102 of the upper die 92.

As shown in FIG. 10, a pouring gate or a resin injecting gate 94 communicating with the cavity 88 from the front side thereof is provided between the lower die 91 and the lateral die (e.g., front lateral die) 93. As a result, resin (molten resin) injected into the cavity 88 via the resin injecting gate 94 flows upwards within the cavity 88.

The case of molding the main body 3 by the body molding die 90 will be described. As shown in FIGS. 10 and 11, the valve body 60 is inserted into the body molding die 90 with the valve member 4 fully closed, and the bearing sleeves 24 are fitted onto the support shaft portions 21 of the throttle shaft 20.

More specifically, the outer peripheral end portion of the plate-like portion 63 of the valve member 4 (see FIG. 7) and the end portions of the shaft cover portion 61, that is, the outer peripheral valve portion 100 (see FIG. 7) is placed on the straight tubular portion 101 of the lower die 91, and the central portion including the rib portion 65 on the back surface side (lower surface side) of the valve member 4 is accommodated in the straight tubular potion 101. At the same time, the positioning reference planes 65a of the rib portions 65 on the back surface side (lower surface side) of the valve member 4 are brought into surface-to-surface contact with the inner side surface of the straight tubular portion 101 of the lower die 91, so that the valve body 60 is positioned with respect to the axial direction (horizontal direction in FIG. 11. Further, the positioning hole 66 (see FIG. 9) in the back surface side (lower surface side) of the valve member 4 is fitted with the positioning projection 91a protruding from the central portion of the upper surface of the lower die 91, so that the valve body 60 is positioned at a predetermined set position.

In this state, after fitting the bearing sleeves 24 onto the support shaft portions 21 of the throttle shaft 20, the dies 92, 93, and 95 of the body molding die 90 are closed except for the lower die 91 (see FIGS. 10 and 11). Then, the straight tubular portion 102 of the upper die 92 presses the outer peripheral end portion of the plate-like portion 63 on the front surface side (upper surface side) of the valve member 4 and the end portions of the shaft cover portion 61, that is, the outer peripheral valve portion 100 (see FIG. 7), against the straight tubular portion 101 of the lower die 91. At the same time, the central portion including the rib portion 65 on the front surface side (front surface side) of the valve member 4 is accommodated in the straight tubular portion 102 of the upper die 92. At the same time, the positioning reference planes 65a of the rib portions 65 on the front surface side (upper surface side) of the valve member 4 are brought into surface-to-surface contact with the inner side surface of the straight tubular portion 102 of the upper die 92, so that the valve member 4 of the valve body 60 is positioned with respect to the axial direction (horizontal direction in FIG. 11). Further, between the shaft presser pins 220 arranged in the lateral dies 93, the throttle shaft 20 is resiliently retained by the resilient force of the presser pin spring members which are not shown (see FIG. 11). Further, the bearing presser bushes 222 arranged in the lateral dies 93 press the bearing sleeves 24 against the outer side surfaces of the straight tubular portion 101 of the lower die 91 and the straight tubular portion 102 of the upper die 92 by the resilient force of the bush presser spring members 224 and retain them in this state (see FIG. 11). In this way, the bearing sleeves 24 are positioned at a predetermined position in the axial position.

Subsequently, resin (more specifically, molten resin) is injected via the resin injecting gate 94 (see FIG. 10) into the cavity 88 defined by the body molding die 90 in order to mold the main body 3. After completion of curing of the main body 3, the dies 91, 92, 93, and 95 are opened, and the molding, that is, the throttle body 2 (see FIG. 10) is extracted.

Next, the structure for mounting the cover body 40 to the main body 3 of the throttle body 2 (see FIGS. 1 through 4) will be described in detail.

As shown in FIG. 4, in this mounting structure, the outer peripheral portion of the cover body 40 is attached to one side surface (right-hand side surface in FIG. 4) of the main body 3 by resin-to-resin welding (the welded portion for attaching will be referred to as welded portion 137) (see FIG. 3).

Prior to attaching the cover body 40, an annular attaching edge portion 17 is formed on one side surface (right-hand side surface in FIG. 4) of the main body 3 in conformity with the outer peripheral edge portion of the cover body 40 and surrounds the gear housing space 29 (see FIGS. 1 and 2).

Further, prior to attaching to the main body 3, an annular attaching edge portion 47 is formed on one side surface (right-hand side surface in FIG. 4) of the cover body 40 in conformity with the attaching edge portion 17 of the cover body 40 and surrounds the gear housing space 29 (see FIGS. 1 and 2).

Figure 12:
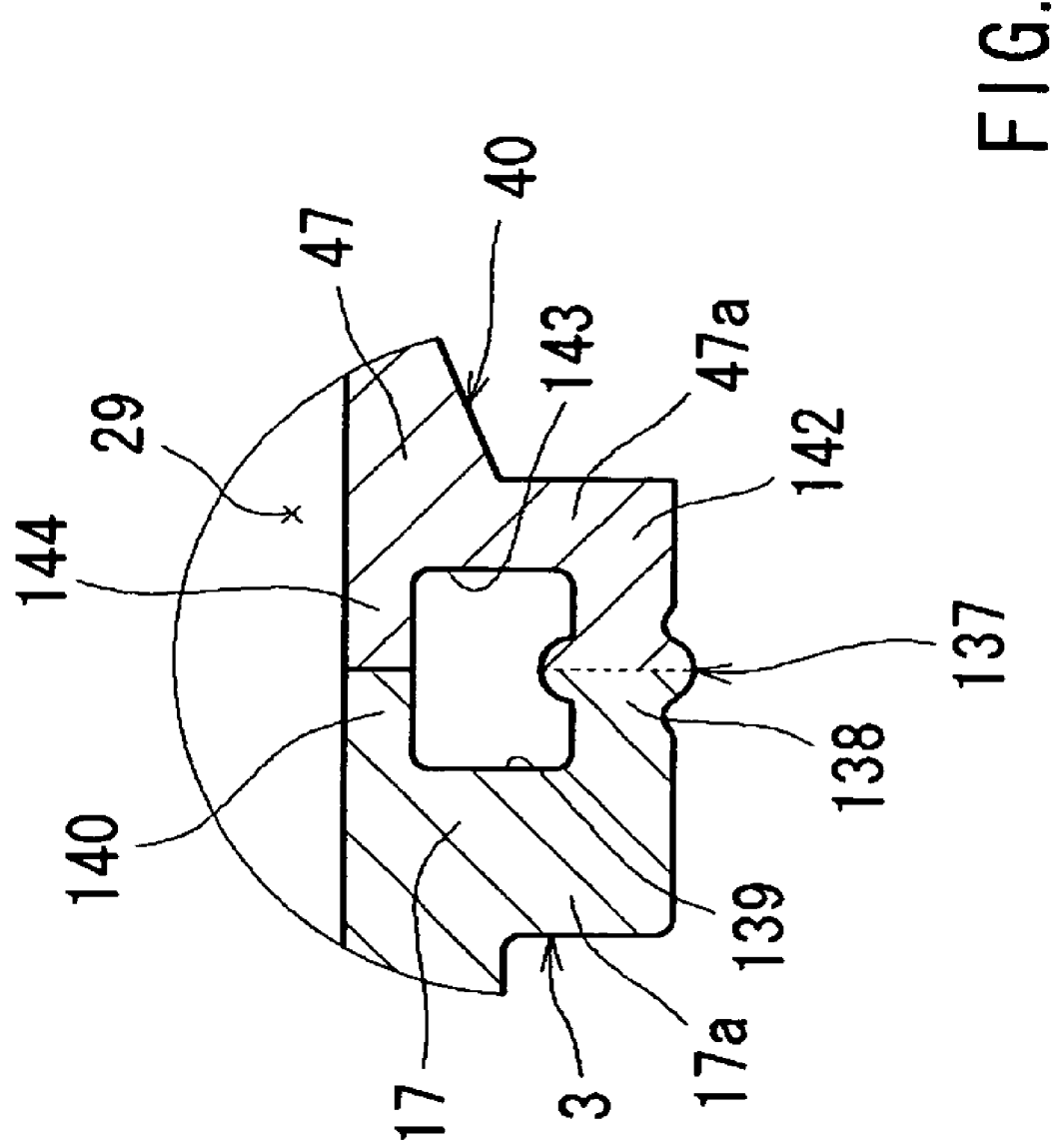
[FIG. 12] A partial sectional view of a mounting portion for a main body and a cover body.
Figure 13:
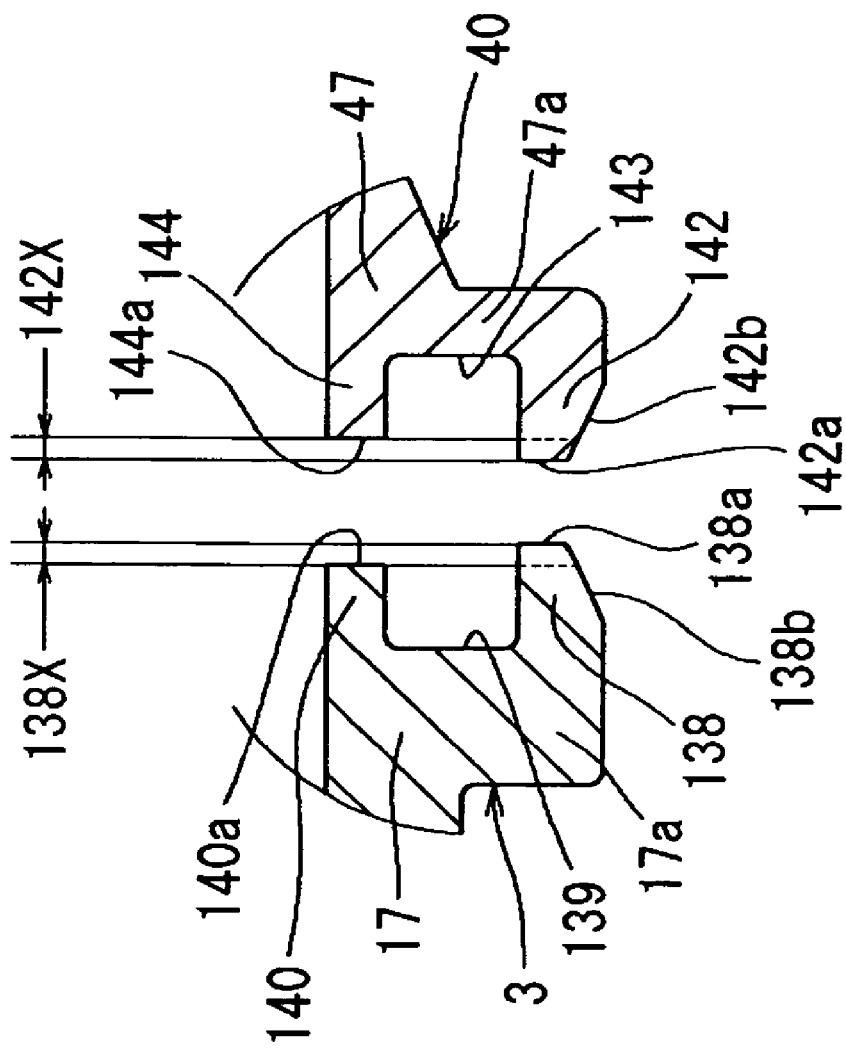
[FIG. 13] A partial sectional view of the mounting portion of FIG. 12 in the state prior to mounting.

FIG. 12 is a partial sectional view of the attaching portion between the main body and the cover body, and FIG. 13 is a sectional view of the primary portion showing the state prior to the attaching operation as in FIG. 12.

As shown in FIG. 13, an enlarged portion 17a enlarged toward the outer periphery is formed on the protruding end portion of the attaching edge portion 17 of the main body 3. On the outer periphery of the attaching edge portion 17 including the enlarged portion 17a, a joint portion 138 is formed and has a joint surface 138a opposing to the attaching edge portion 47 of the cover body 40. On the inner periphery of the attaching edge portion 17 including the enlarged portion 17a, a contact portion 140 is formed in parallel to the joint portion 138. The contact portion 140 has a contact surface 140a opposing to the attaching edge portion 47 of the cover body 40. Since the contact portion 140 is formed on the inner side of the joint portion 138 constituting the welded portion 137 (see FIG. 12), it will be referred to as "inner contact portion".

The joint portion 138 having the joint surface 138a protrudes sidewise (to right in FIG. 13) beyond the contact surface 140a of the inner contact portion 140. A protruding amount 138X of the joint portion 138 corresponds to the welding margin.

Further, the joint portion 138 has a chamfer-like inclined surface 138b on its outer peripheral side, so that its section is forwardly tapered. In a recess formed on the outer side of the inclined surface 138b of the joint portion 138, the resin residue squeezing out of the joint portion 138 when welded to the cover body 40 is accommodated.

Between the joint portion 138 and the inner contact portion 140, a separating groove 139 is formed to have a substantially U-shaped sectional configuration open on the side of the attaching edge portion 47 of the cover body 40. The separating groove 139 is formed in order to accommodate the resin residue extending to the inner side of the joint portion 138 when welded to the cover body 40. The separating groove 139 is referred to as "inner separating groove" since it is formed on the inner side of the joint portion 138 constituting the welded portion 137 (see FIG. 12).

As shown in FIG. 13, the attaching edge portion 47 of the cover body 40 is formed opposite to the attaching edge portion 17 of the main body 3. On the protruding end portion of the attaching edge portion 47 of the cover body 40, an enlarged portion 47a enlarged toward the outer periphery is formed. On the outer periphery of the attaching edge portion 47 including the enlarged portion 47a, a joint portion 142 is formed and has a joint surface 142a opposing to the joint portion 138 of the attaching edge portion 17 of the main body 3. The joint portion 142 has the joint surface 142a opposing to the joint surface 138a of the joint portion 138. On the inner periphery of the attaching edge portion 47 including the enlarged portion 47a, a contact portion 144 is formed in parallel to the joint portion 142. The contact portion 144 has a contact surface 140a opposing to the contact surface 140a of the inner contact portion 140 of the attaching edge portion 17 of the main body 3. The contact portion 144 is referred to as "inner contact portion", since it is formed on the inner side of the joint portion 142 constituting the welded portion 137 (see FIG. 12).

The joint portion 142 having the joint surface 142a protrudes sidewise (to left in FIG. 13) beyond the contact surface 144a of the inner contact portion 144 in line symmetry with respect to the joint portion 138 on the side of the main body 3. A protruding amount 142X of the joint portion 142 corresponds to the welding margin.

Like the joint portion 138 of the main body 3, the joint portion 142 has on its outer periphery a chamfer-like inclined surface 142b, so that its section is forwardly tapered. In a recess formed on the outer side of the inclined surface 142b of the joint portion 142, the resin residue squeezing out of the joint portion 138 when welded to the main body 3 is accommodated.

Between the joint portion 142 and the inner contact portion 144, a separating groove 143 is formed with a substantially U-shaped sectional configuration open on the side of the attaching edge portion 17 of the main body 3 and opposes to the inner separating groove 139. The separating groove 143 is formed for the purpose of accommodating the resin residue extending to the inner side of the joint portion 142 when welded to the main body 3. The separating groove 143 is referred to as "inner separating groove", since it is formed on the inner side of the joint portion 142 constituting the welded portion 137 (see FIG. 12).

The main body 3 and the cover body 40 are made of the same material such as a polyphenylene sulfide (PPS) resin mixed with glass fibers.

Next, the case of attaching the cover body 40 to the main body 3 by welding will be described.

As shown in FIG. 13, with the attaching edge portion 17 of the main body 3 and the attaching edge portion 47 of the cover body 40 opposing to each other, the distal end portions of the joint portions 138 and 142 of the attaching edge portions 17 and 47 are melded with heat by means of a heating plate (not shown). After the distal end portions of the joint portions 138 and 142 are suitably melted, the attaching edge portion 47 of the cover body 40 is pressed against the attaching edge portion 17 of the main body 3. The distal end portions of the joint portions 138 and 142 are therefore welded to each other (see welded portion 137 in FIG. 12). At this time, the inner contact portions 140 and 144 of the attaching edge portions 17 and 47 are in surface-to-surface contact with each other, so that no further welding of the joint portions 138 and 142 occurs (see FIG. 12). Thus, excessive welding of the joint portions 138 and 142 is prevented, so that the joint portions 138 and 142 are welded properly. After that, the welded portion 137 is cooled and cured, so that the attachment of the cover body 40 to the main body 3 is completed.

According to the throttle body 2 described above, the bore 7 of the main body 3 is opened/closed by the valve member 4 rotating together with the throttle shaft 20 of the valve body 60, so that the amount of intake air flowing through the bore 7, that is, the intake air amount, is controlled. Further, the throttle opening of the valve member 4 is detected by the throttle position sensor 50.

The resin cover body 40 is welded to the resin main body 3 (see welded portion 137 in FIGS. 4 and 12). Thus, it is possible to eliminate the conventionally required fixing element, mount seat, etc., so that the cost can be reduced. Further, as compared with the attachment using a clip, rivet, etc., it is possible to eliminate the fixing element, mount seat, etc., so that the cost can be reduced. By eliminating the mount seat, it is possible to reduce the size of the attaching portion of the cover body 40 to the main body 3. The cover body 40 corresponds to the "attaching member" in this specification. Further, the cover body 40 corresponds to the "sensor cover" covering the throttle position sensor 50, and corresponds to the "gear housing cover" covering the output-side end portion of the drive motor 33 and the reduction gear mechanism 45.

Further, the cover body 40 is welded to the entire periphery of main body 3 in a hermetically sealed state, and therefore, it is possible to eliminate a sealing material for effecting sealing between the main body 3 and the cover body 40, so that the cost can be reduced. Further, it is possible to prevent or reduce intrusion into the gear housing space 29 and condensation in the gear housing space 29, so that short-circuiting of the electrical wiring for the throttle position sensor 50, the drive motor 33, etc., can be prevented or reduced.

By spot-welding the cover body 40 to the main body 3, it is possible to improve the productivity and to reduce the cost. In this case, it is desirable to provide a sealing material between the main body 3 and the cover body 40 for effecting sealing therebetween.

By welding the cover body 40 to the main body 3 through so-called heating-plate welding using a heating plate, it is advantageously possible to weld without imparting any oscillation unlike the welding technique using oscillation, so-called oscillation welding.

Further, it is possible to accommodate within the inner separating grooves 139 and 143 the resin residue generated in the welded portion 137 between the main body 3 and the cover body 40 (see FIG. 12). It is therefore possible to prevent or reduce intrusion of the resin residue between the inner contact portion 140 of the main body 3 and the inner contact portion 144 of the cover body 40, so that it possible to properly attach the cover body 40 to the main body 3.

Further, the inner contact portion 140 of the main body 3 and the inner contact portion 144 of the cover body 40 are in contact with each other, so that it is possible to prevent or reduce excessive welding of the joint portions 138 and 142, intrusion of the resin residue into the gear housing space 29, etc. By preventing excessive welding of the joint portions 138 and 142, it is possible to properly weld the joint portions 138 and 142 to each other.

It is possible to eliminate at least one of the joint portions 138 and 142. Further, it is possible to eliminate at least one of the inner contact portions 140 and 144. Further, it is possible to eliminate at least one of the inner separating grooves 139 and 143.

Further, the inclined surfaces 138*b* and 142*b* are formed on the outer periphery of the joint portions 138 and 142 (see FIG. 13). It is therefore possible to accommodate the resin residue extending within the recesses formed on the outer side of the inclined surfaces 138*b* and 142*b* of the joint portions 138 and 142 when the main body 3 and the cover body 40 are welded to each other. Thus, it is possible to suppress outward extension of the resin residue generated in the welded portion 137 between the main body 3 and the cover body 40, so the appearance of the throttle body 2 can be improved. It is possible to eliminate at least one of the inclined surfaces 138*b* and 142*b* of the joint portions 138 and 142.

As shown in FIG. 4, the resin plug 150 is attached to the opening end surface of the bearing boss portion 22 on the left-hand side of the main body 3 through resin-to-resin welding as in the case of the above-mentioned attaching structure for the cover body 40 with respect to the main body 3 (the welded portion for attaching will be referred to as welded portion 145). The plug 150 corresponds to the "attaching member" in this specification.

Next, an opener opening adjusting method for adjusting the opener opening of the valve body 60 of the throttle body 2 of Embodiment 1 mentioned above will be described. The opener opening adjusting method may include an opener opening adjusting method 1 and an opener opening adjusting method 2 described below. The term "opener opening" means the opening when the valve body 60 has been opened by a predetermined amount from its fully closed position. It is the maximum opening for the idling speed control.

[Opener Opening Adjusting Method 1]

Figure 14:
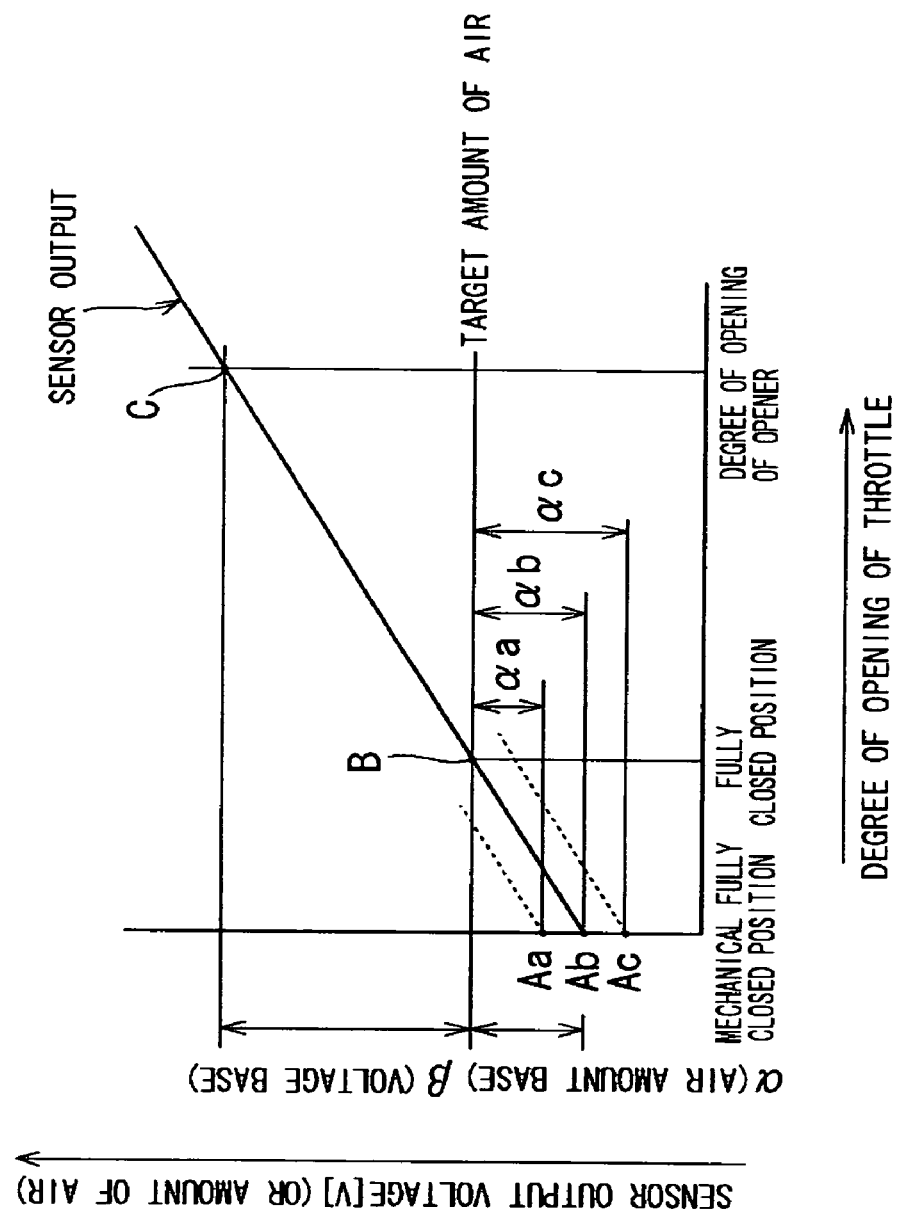
[FIG. 14] A graph showing the relationship between the throttle opening of a valve body and the output voltage of a throttle position sensor.

The opener opening adjusting method 1 will be described. FIG. 14 is a graph showing the relationship between the throttle opening of the valve body and the output voltage of the throttle position sensor.

(1) The intake air amount at a mechanical fully closed position (see point Ab in FIG. 14) is measured. In the present specification, the "mechanical fully closed position" refers to a position where the valve member 4 is in contact with the bore wall surface 13 of the main body 3 and where the rotation of the valve body 60 in the closing direction is mechanically restricted through the contact. The mechanical fully closed position is a position where there arise problems such as wear between the contact portions of the valve member 4 and the bore wall surface 13, and malfunctioning of the valve body 60, through operation and vibration of the drive motor 33. Such problems are avoided by setting the "fully closed position" of the throttle body 2 during use to a position opened by a predetermined amount from the mechanical fully closed position.

(2) Next, using the measurement value of the intake air amount at the mechanical fully closed position (see point Ab in FIG. 14) as a reference, a sensor output voltage a [V] of the throttle position sensor 50 (see FIG. 4) at the fully closed position (see point B in FIG. 14) is determined through program adjustment of the control device 52 (see FIG. 2). The sensor output voltage corresponds to the "sensor output value" in this specification.

The sensor output voltage a [V] is programmed beforehand in the control device 52 to correspond to the intake air amount at the mechanical fully closed position. The reason comes from that the measurement value of the intake air amount at the mechanical fully closed position varies as indicated by points Aa and Ac in FIG. 14, and the fully closed position varies accordingly if the value of the sensor output voltage a [V] is fixed. Thus, in order to diminish the variation in the fully closed position (see point B in FIG. 14), the value of the sensor output voltage a [V] is changed to correspond to the measurement value of the intake air amount at the mechanical fully closed position (see point Ab in FIG. 14). For example, as shown in FIG. 14, if the measurement value of the intake air amount at the mechanical fully closed position is that indicated by point Aa, the sensor output voltage is set to aa. If the measurement value is that indicated by point Ab, the sensor output voltage is set to ab. If the measurement value is that indicated point Ac, the sensor output voltage is set to ac. By thus changing the value of the sensor output voltage a [V] in accordance with the measurement value of the intake air amount at the mechanical fully closed position, it is possible to diminish the variation at the fully closed position (see point B in FIG. 14).

(3) Next, the control device 52 stores an opener opening sensor output value (a+β) [V] (see point C in FIG. 14) obtained by adding a sensor output voltage β [V] corresponding to the opener opening to the sensor output voltage a(aa, ab, ac) [V]. The opener opening of the valve body 60 (see point C in FIG. 14) is adjusted by the opener opening adjusting screw TOS (see FIG. 6) such that the actual sensor output voltage a [V] of the throttle position sensor 50 becomes equal to the opener opening sensor output value (a+β) [V] (see point C in FIG. 14) stored by the control device 52.

According to the opener opening adjusting method 1 described above, it is possible to adjust the opener opening by the opener opening adjusting screw TOS for adjusting the opener opening of the valve body 60 without adjusting the fully closed position of the valve body 60. After the adjustment of the opener opening, an opener learning control by the control device 52 is executed as a countermeasure for preventing the valve body from assuming the mechanical fully closed position. That is, in vehicle control, the opener opening (see point C in FIG. 14) is learned by the control device 52, and an opening obtained by subtracting the sensor output voltage β [V] corresponding to the learned opener opening from the learned opener opening is recognized as the mechanical fully closed position. Through the opener learning control by the control device 52, it is possible to prevent the valve body 60 from moving to the mechanical full closed position.

[Opener Opening Adjusting Method 2]

The opener opening adjusting method 2 will be described.

(1) The valve body 60 in the closed state is gradually opened by the opener opening adjusting screw TOS (see FIG. 6) or an external device which is not shown in order to adjust the fully closed position (see point B in FIG. 14). Then, the throttle opening of the valve body 60 at the fully closed position is measured and stored by the control device 52, and the sensor output voltage a [V] of the throttle position sensor 50 at the fully closed position is established as a reference value.

(2) Next, the control device 52 stores the opener opening sensor output value (a+β) [V] (see point C in FIG. 14) obtained by adding the sensor output voltage β [V] corresponding to the opener opening to the reference value of the sensor output voltage a [V]. The opener opening (see point C in FIG. 14) of the valve body 60 is adjusted by the opener opening adjusting screw TOS (see FIG. 6) such that the actual sensor output voltage a [V] of the throttle position sensor 50 becomes equal to the opener opening sensor output value (a+β) [V] (see point C in FIG. 14) stored by the control device 52.

Similar to the opener opening adjusting method 1, according to the opener opening adjusting method 2, it is possible to adjust the opener opening by the opener opening adjusting screw TOS for adjusting the opener opening of the valve body 60 without adjusting the fully closed position of the valve body 60.

Further, as compared with the opener opening adjusting method 1, the number of times that the opening of the valve body 60 is adjusted by the opener opening adjusting screw TOS is larger, and therefore, it is possible to perform the opener opening adjustment with high accuracy.

Similar to the opener opening adjusting method 1, after the opener opening adjustment, the opener learning control by the control device 52 is executed as a countermeasure for preventing the valve body from assuming the mechanical fully closed position.

Figure 15:
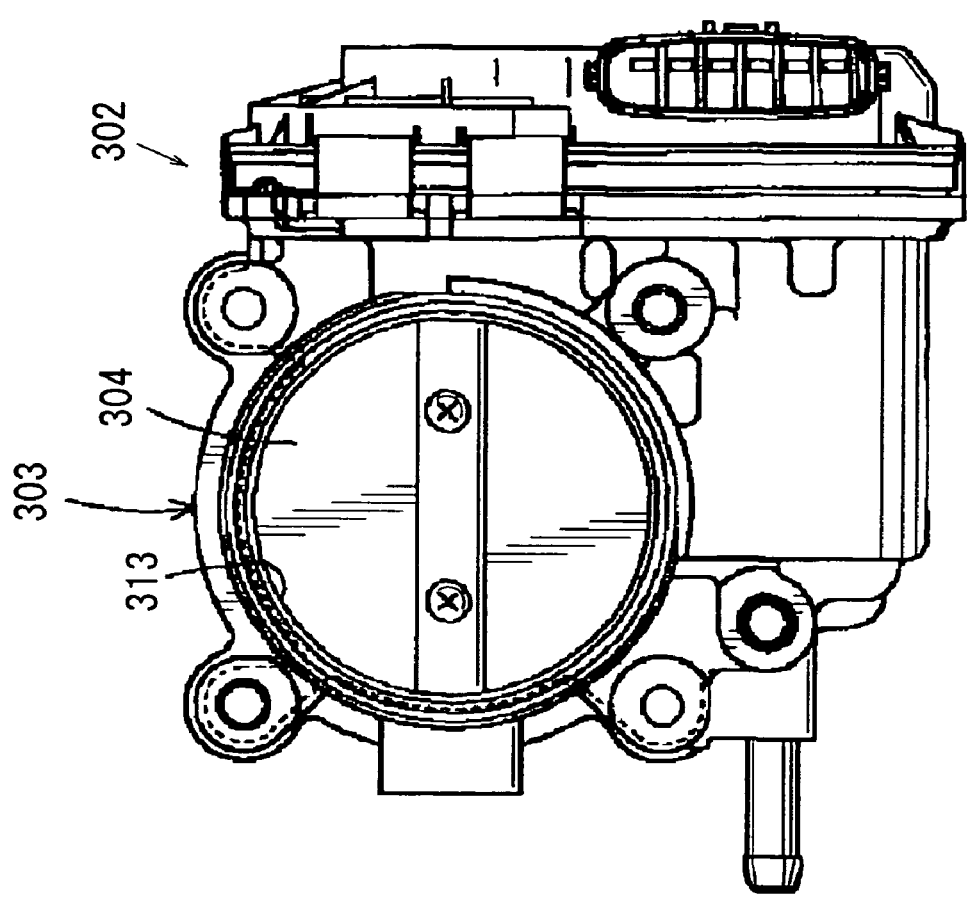
[FIG. 15] A front view of a conventional throttle body.

Here, a conventional opener opening adjusting method will be described. FIG. 15 is a front view of a throttle body, and FIG. 16 is a side view of a cover body attaching side of a main body.

Figure 16:
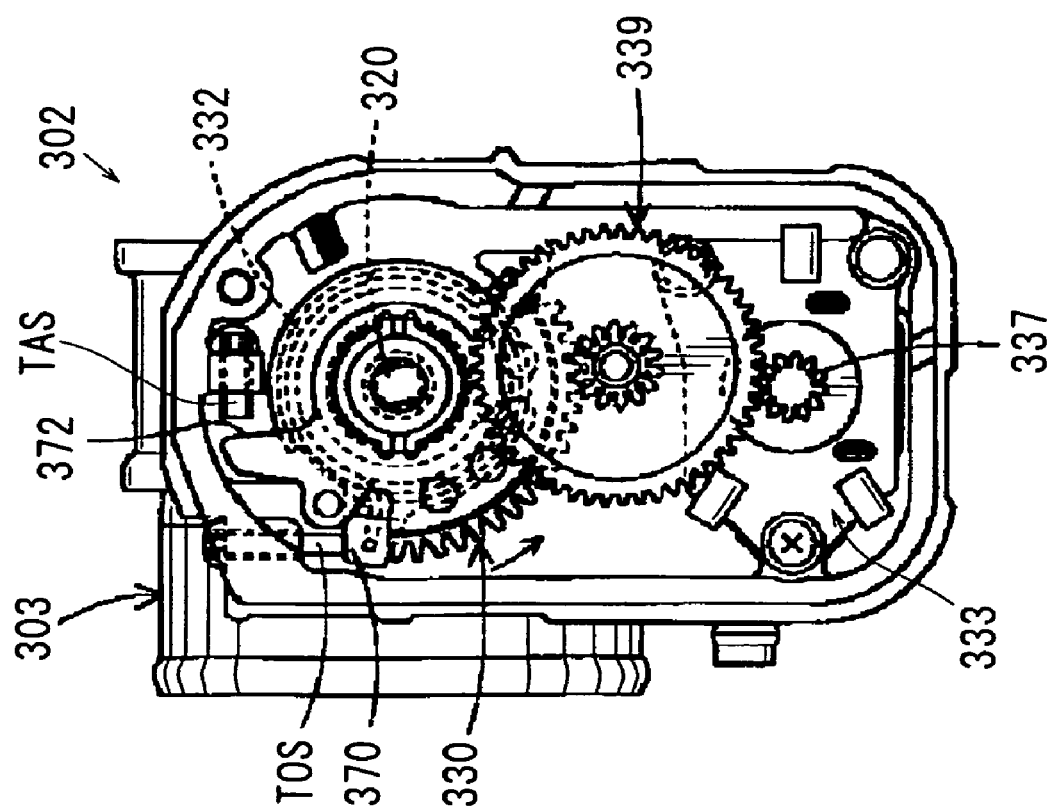
[FIG. 16] A side view of the cover body mounting side of a conventional main body.

As shown in FIG. 16, a back spring 332 extending between a main body 303 and a throttle gear 330 has an intermediate contact portion 370 capable of being brought into contact with the opener opening adjusting screw TOS provided in the main body 303. Thus, when a drive motor 333 is not being energized (non-energization state), the intermediate contact portion 370 is elastically held in contact with the opener opening adjusting screw TOS by the resilient force of the back spring 332, whereby the throttle gear 330 is maintained at the opener opening of a valve member 304 (see FIG. 15). When the drive motor 333 is driven in the closing direction, the throttle gear 330 rotates the valve member 304 in the closing direction with respect to the opener opening against the resilient force of the back spring 332, with the intermediate contact portion 370 in contact with the opener opening adjusting screw TOS. When the drive motor 333 is driven in the opening direction, the throttle gear 330 rotates the valve member 304 in the opening direction with respect to the opener opening against the resilient force of the back spring 332, with the intermediate contact portion 370 being separated from the opener opening adjusting screw TOS.

Further, the throttle gear 330 is provided with a contact portion 372 for fully closed position, which can contact with a fully closed position adjusting screw TAS provided on the side of the main body 303(see FIG. 16). Through contact of the contact portion for fully closed position 372 of the throttle gear 330 with the fully closed position adjusting screw TAS, the throttle gear 330 is restricted at the fully closed position. It is therefore possible to prevent rotation of the valve member 304 to the mechanical fully closed position where it is in contact with the bore wall surface 313 of the main body 303.

In the above opener opening adjusting method for the throttle body 302, the valve member 304 is gradually opened from the mechanical fully closed position (see point Ab in FIG. 14) by the fully closed position adjusting screw TAS in order to adjust the fully closed position (see point B in FIG. 14). After that, using the fully closed position as a reference, the opener opening (see point c in FIG. 14) obtained by adding the sensor output voltage β [V] corresponding to the opener opening is adjusted by the opener opening adjusting screw TOS. Thus, according to the conventional opener opening adjusting method, it is necessary to provide, in addition to the opener opening adjusting screw TOS, the fully closed position adjusting screw TAS (see FIG. 16), which leads to increase in the number of components, resulting in increase of the cost.

In contrast, as stated above, according to the opener opening adjusting methods 1 and 2 of this embodiment, it is possible to adjust the opener opening by the opener opening adjusting screw TOS for adjusting the opener opening of the valve body 60 without adjusting the fully closed position of the valve body 60. Thus, it is possible to abolish the fully closed position adjusting screw TAS to reduce the number of components, and to reduce the cost for components, adjustment, and adjusting equipment. Further, through opener learning control by the control device 52, it is possible to prevent the valve body 60 from assuming the mechanical fully closed position without need of a fully closed position adjusting screw TAS.

Figure 17:
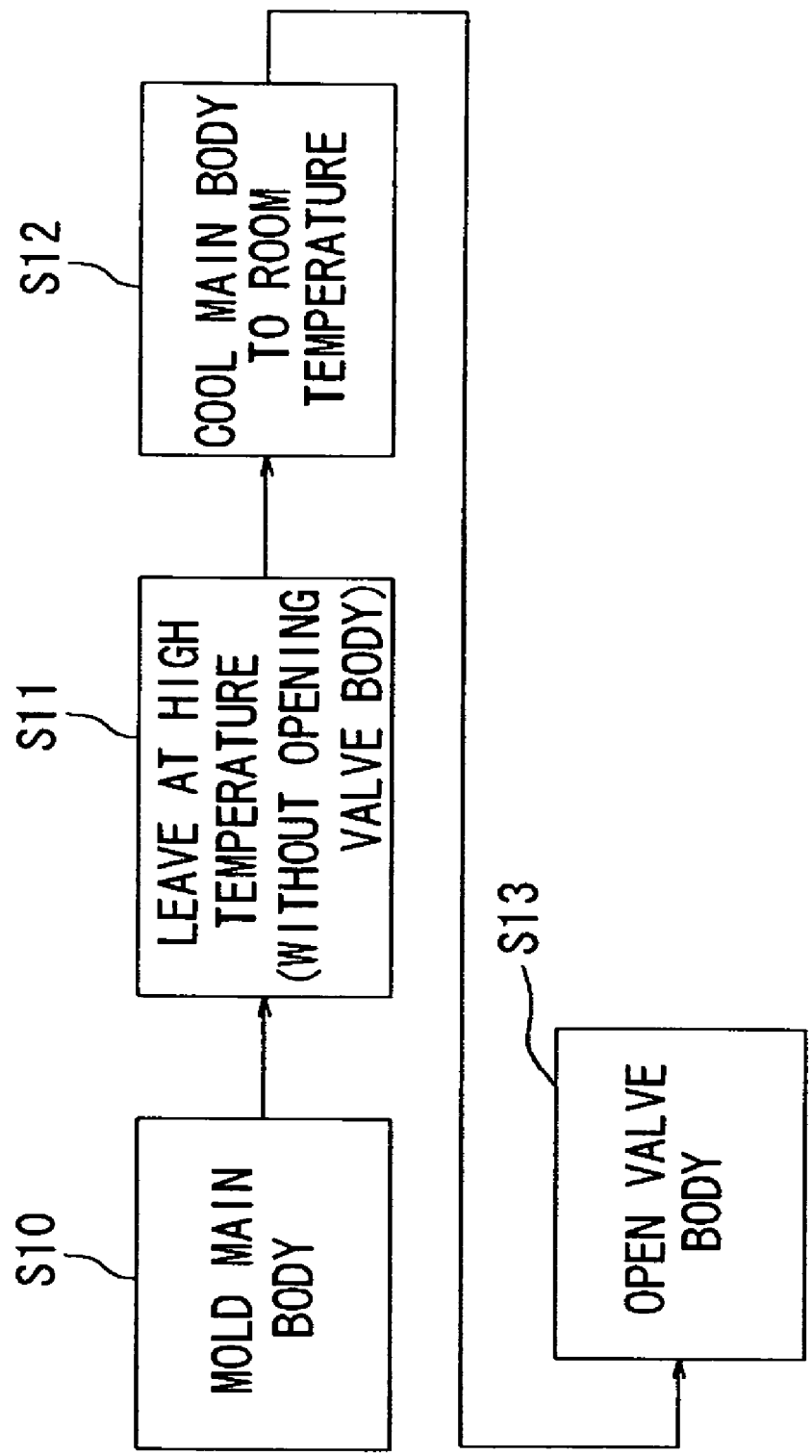
[FIG. 17] An explanatory diagram showing processes after the molding process of the main body.

Next, a process after molding the main body 3 in the method of manufacturing the throttle body 2 of Embodiment 1 will be described. FIG. 17 is an explanatory view showing the process after molding the main body.

As shown in FIG. 17, in step S10, the main body 3 is molded by the body molding die 90 (see FIGS. 10 and 11), with the valve body 60 (see FIGS. 7 and 8) inserted.

Next, in step S11, the main body 3 of the throttle body 2 extracted from the body molding die 90 is left in a high temperature atmosphere not lower than the recrystallization temperature of the resin material of the main body 3 for one hour or more without opening the valve body 60, so that annealing is effected. It is therefore possible to remove the residual stress at the time of molding the main body 3, with the radial heat shrinkage of the bore 7 of the main body 3 being suppressed. Thus, the sealing surface 16 of the main body 3 conforms to the sealing surfaces 15 of the valve member 4, so that it is possible to improve the hermeticity, that is, the sealing property when the valve member 4 is in the fully closed state.

Subsequently, in step S12, the main body 3 is cooled down to a room temperature.

Then, in step S13, the valve body 60 is opened.

In the manner as described above, the process after the molding of the main body 3 is completed.

According to the above-mentioned method of manufacturing the throttle body 2, after molding the main body 3, annealing is effected with the valve body 60 fully closed, so that it is possible to remove the residual stress at the time of molding the main body 3, with the radial heat shrinkage of the bore 7 of the main body 3 suppressed.

Figure 19:
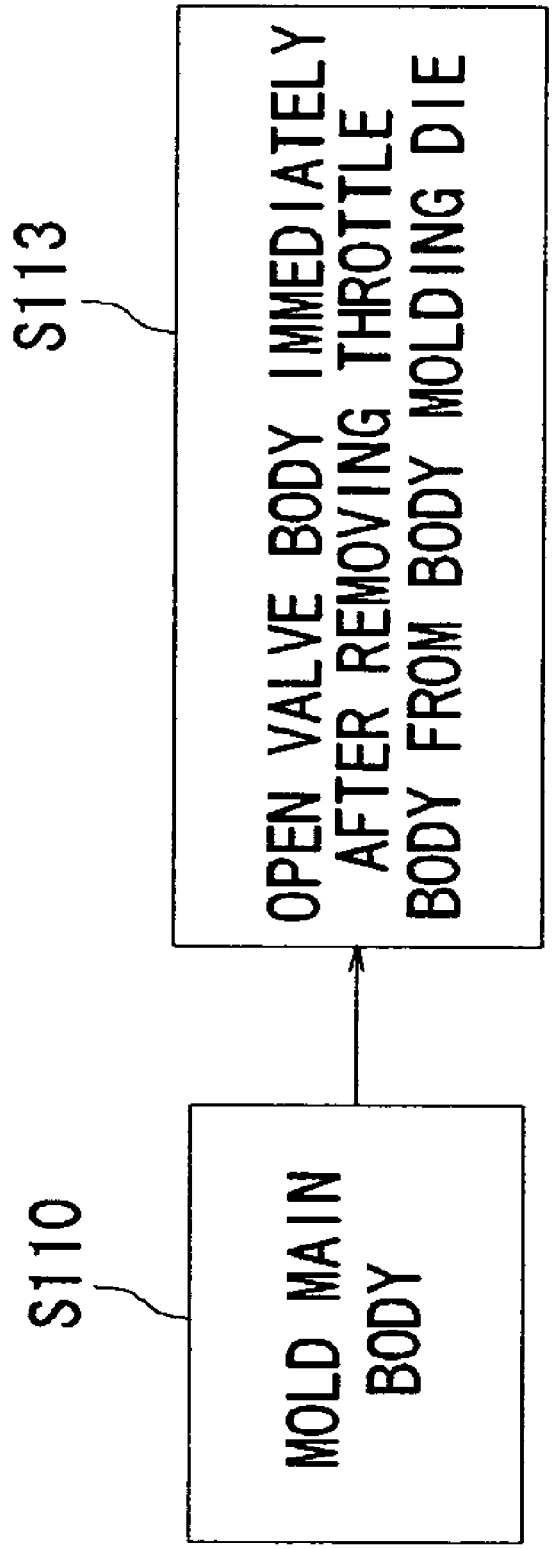
[FIG. 19] An explanatory diagram showing processes after the molding process of a conventional main body.

As shown in FIG. 19, conventionally, after molding the main body 3 in step S110, the throttle body is extracted from the body molding die in step S113, and, immediately after that, the valve body 60 is opened, so that due to the residual stress at the time of molding the main body 3, the bore wall portion of the main body 3 is liable to suffer deformation, and there has been a possibility that the sealing property with the valve body 60 fully closed is deteriorated. In contrast, as stated above, according to this embodiment, annealing is effected with the valve body 60 fully closed after molding the main body 3, so that it is possible to remove the residual stress at the time of molding the main body 3 with the radial heat shrinkage of the bore 7 of the main body 3 being suppressed, so it is possible to improve the sealing property with the valve body 60 fully closed.

Figure 18:
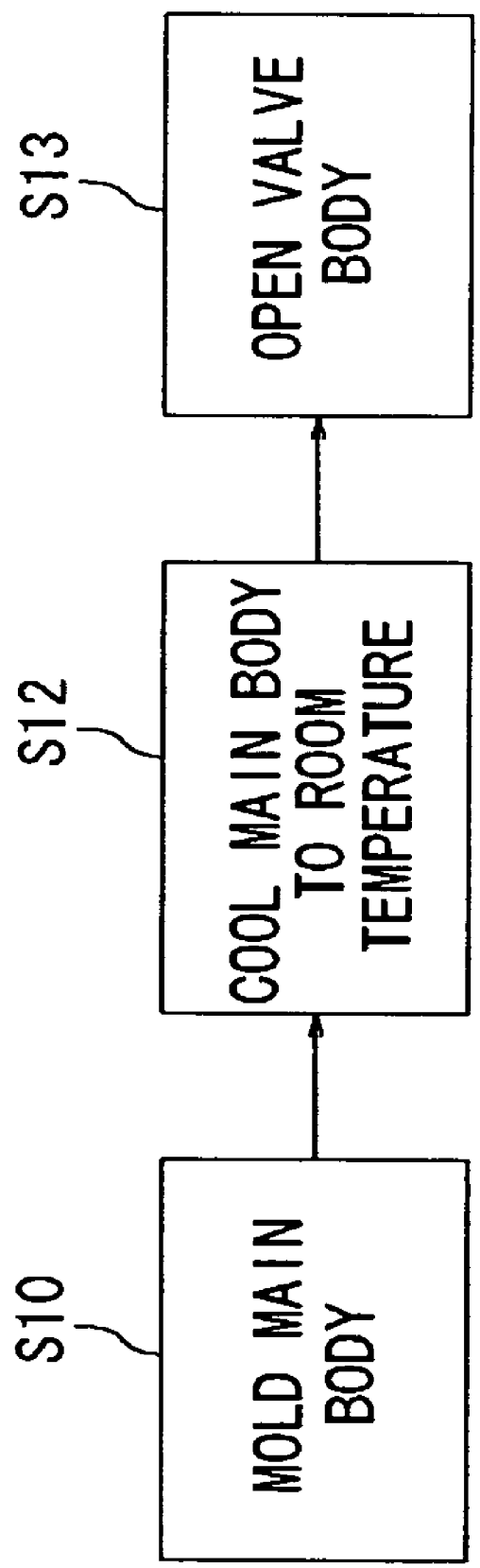
[FIG. 18] An explanatory diagram showing processes after the molding process of the main body according to a modification.

As shown in FIG. 18, in the case that the residual stress at the time of molding the main body 3 can be mitigated by simply cooling the main body 3 down to a room temperature in step S12, it is possible to eliminate the annealing step (see step S11 in FIG. 17) in which the main body 3 is left at a high temperature.

The throttle body 2 of this embodiment can also by manufactured by the following manufacturing method, which will be briefly described. First, in the step of molding the main body 3, the main body 3 is molded by using a body molding die (mold). At that time, a body sub assembly having the bearing sleeves 24 integrated with the main body 3 is molded, with the bearing sleeves 24 inserted beforehand. Next, in the step of molding the valve body 60, the valve member 4 is molded by using a valve molding die (mold). At that time, the body sub assembly molded in the previous step and the throttle shaft 20 are inserted into the valve molding die beforehand, so that the valve member 4 assembled with the body sub assembly and integrated with the throttle shaft 20 can be molded. Further, the resin is filled along the body side sealing surface 16 of the main body 3, so that the valve-side sealing surfaces 15 is formed on the valve member 4 in conformity with the body side sealing surface 16. Similar to the case of the main body 3, a post-molding process (see FIGS. 17 and 18) is performed for the molded valve member 4.

Embodiment 2

Figure 20:
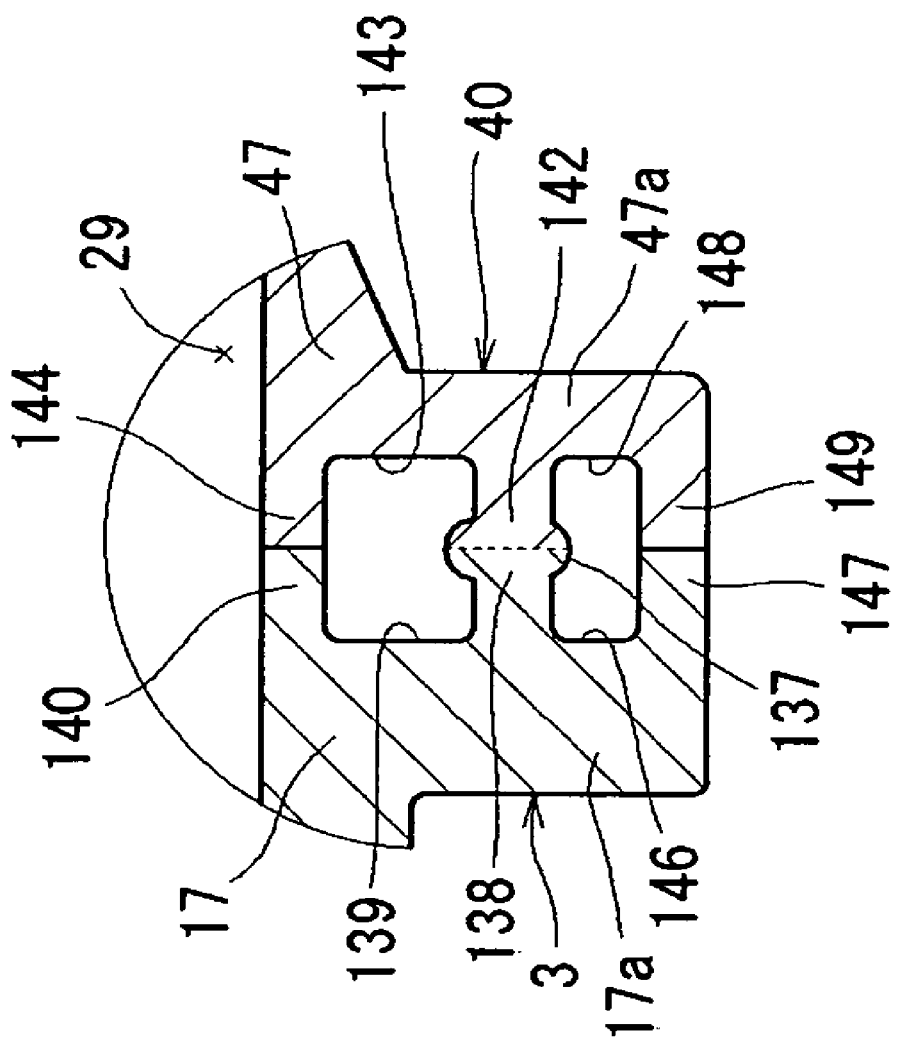
[FIG. 20] A partial sectional view of a mounting portion for a main body and a cover body according to Embodiment 2.

Embodiment 2 will be described. This embodiment is a modification of a part of Embodiment 1, i.e., the attaching structure of the cover body 40 to the main body 3, so that the description will be made to the modified portions, and a redundant description will not be made. FIG. 20 is a partial sectional view showing the attaching portion between the main body and the cover body, and FIG. 21 is a sectional view of the primary portion of FIG. 20 in the state prior to the attaching operation.

Figure 21:
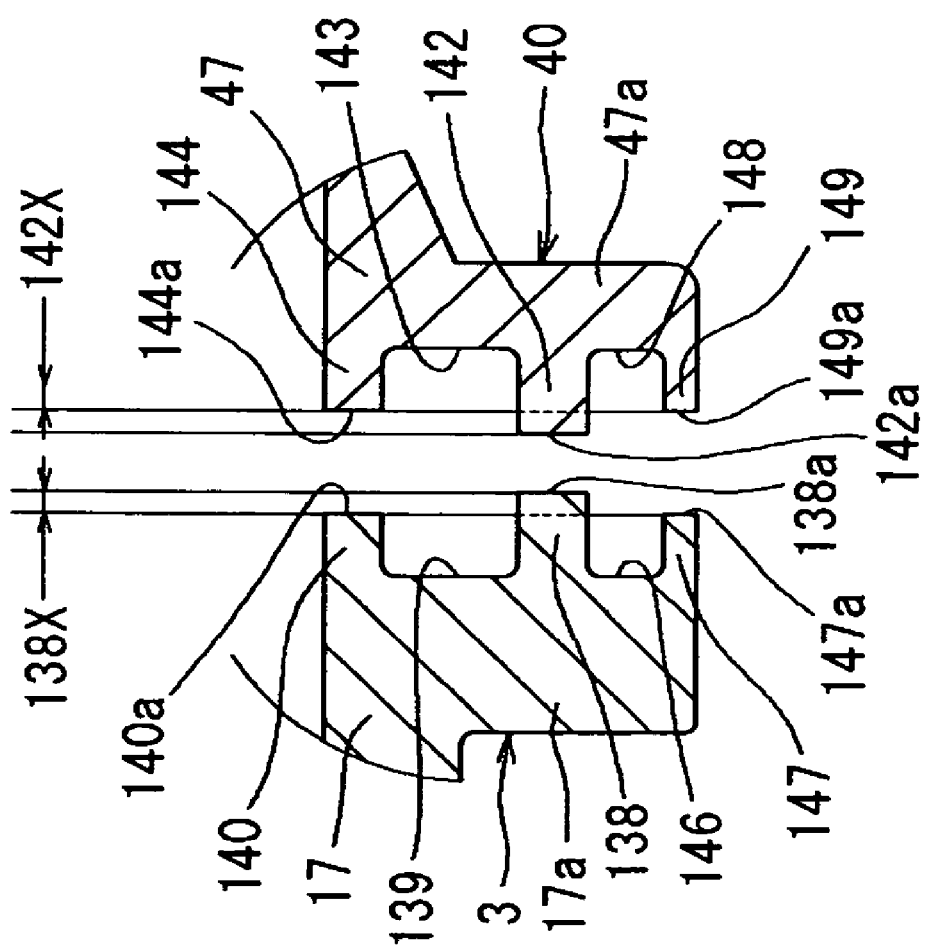
[FIG. 21] A partial sectional view of the mounting portion of FIG. 20 in the state prior to mounting.

As shown in FIG. 21, in this embodiment, on the outer periphery of the attaching edge portion 17 of the main body 3 of Embodiment 1, a contact portion 147 is formed in parallel to the joint portion 138. The contact portion 147 has a contact surface 147a opposing to the attaching edge portion 47 of the cover body 40. Like the inner contact portion 140, the contact portion 147 protrudes sidewise (to the right of FIG. 21) by an amount smaller by the welding margin (protruding amount) 138X of the joint portion 138. Since the contact portion 147 is formed on the outer side of the joint portion 138 constituting the welded portion 137 (see FIG. 12), it is referred to as the "outer contact portion".

Between the joint portion 138 and the outer contact portion 147, a separating groove 146 of a substantially U-shaped sectional configuration is formed and is open on the side of the attaching edge portion 47 of the cover body 40. The separating groove 146 is formed for the purpose of accommodating the resin residue squeezing out of the joint portion 138 when welding the cover body 40. Thus, in this embodiment, the inclined surface 138b (see FIG. 13) of the joint portion 138 of Embodiment 1 is eliminated. Since the separating groove 146 it is formed on the outer side of the joint portion 138 constituting the welded portion 137 (see FIG. 12), it is referred to as the "outer separating groove".

As shown in FIG. 21, a contact portion 149 is formed on the outer periphery of the attaching edge portion 47 of the cover body 40 of Embodiment 1 in parallel to the joint portion 142. The contact portion 149 has a contact surface 149a opposing to the contact surface 147a of the outer contact portion 147 of the attaching edge portion 17 of the main body 3. Like the inner contact portion 144, the contact portion 149 protrudes sidewise (to the left in FIG. 21) by a protruding amount smaller by the welding margin (protruding amount) 142X of the joint portion 142. Since the contact portion 149 is formed on the outer side of the joint portion 142 constituting the welded portion 142 (see FIG. 12), it is referred to as the "outer contact portion".

A separating groove 148 of a substantially U-shaped sectional configuration is formed between the joint portion 142 and the outer contact portion 149 and is open on the side of the attaching edge portion 17 of the main body 3 and opposes to the outer separating groove 146. The separating groove 148 is formed for the purpose of accommodating the resin residue squeezing out of the joint portion 142 at the time of welding to the main body 3. Thus, in this embodiment, the inclined surface 142b (see FIG. 13) of the joint portion 142 of Embodiment 1 is eliminated. Since the separating groove 148 is formed on the outer side of the joint portion 142 constituting the welded portion 137 (see FIG. 12), it is referred to as the "outer separating groove".

Similar to Embodiment 1, in Embodiment 2 described above, the cover body 40 is attached to the main body 3 by welding (see the welded portion 137 of FIG. 20). Thus, in this embodiment also, it is possible to obtain the effects substantially the same as those of Embodiment 1.

Further, the resin residue generated in the welded portion 137 between the main body 3 and the cover body 40 can be accommodated in the outer separating grooves 146 and 148. Further, the outer contact portion 147 of the main body 3 and the outer contact portion 149 of the cover body 40 are in contact with each other, so that it is possible to prevent or mitigate excessive welding and extension of the resin residue to the exterior of the cover body 40. Further, since the welded portion 137 is hidden by the outer contact portions 147 and 149, it is possible to improve the appearance of the throttle body 2.

At least one of the outer contact portions 147 and 149 may be eliminated. Further, at least one of the outer separating grooves 146 and 148 may be eliminated.

Embodiment 3

Figure 22:
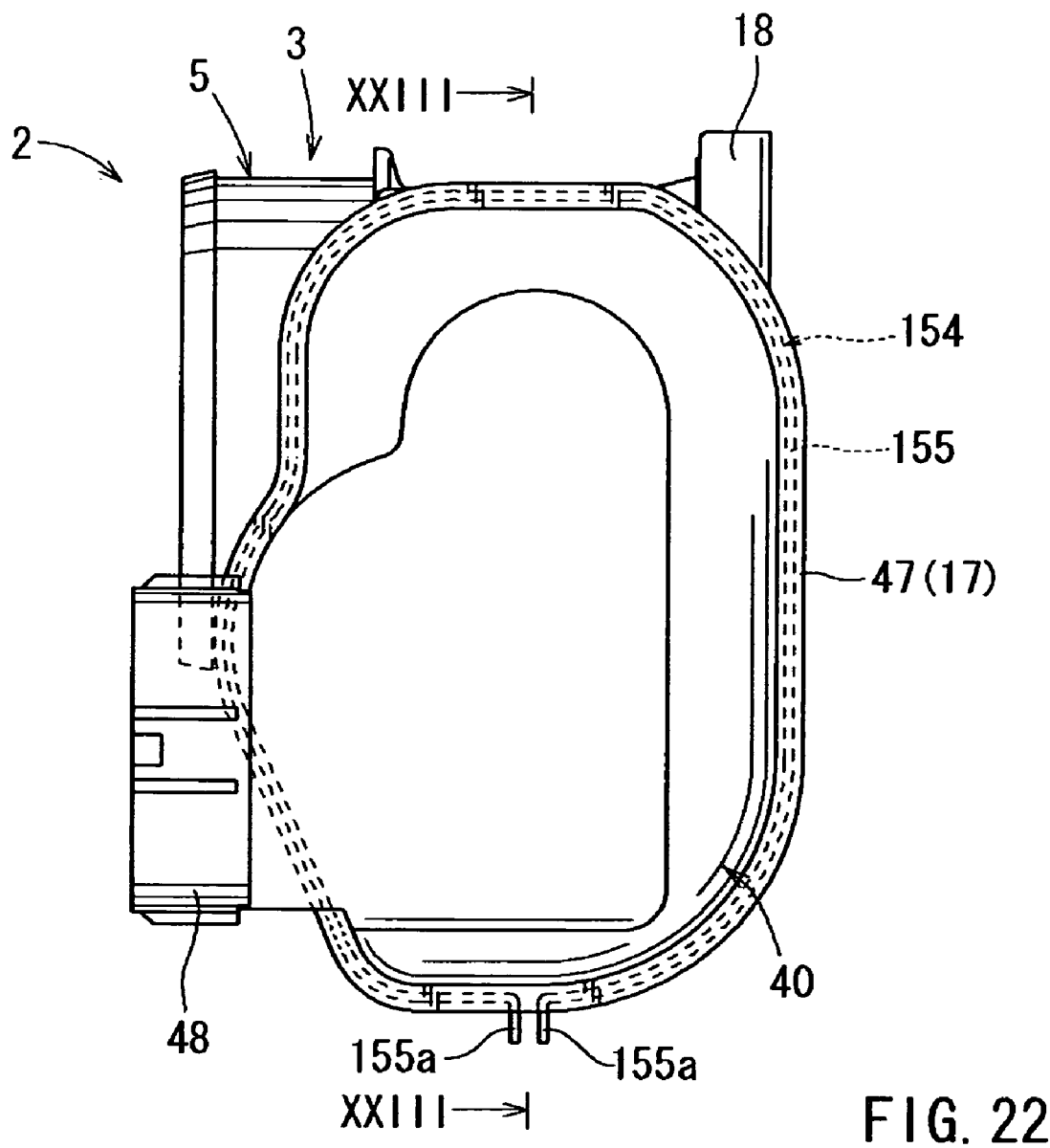
[FIG. 22] A right-hand side view of a throttle body according to Embodiment 3.

Embodiment 3 will be described. This embodiment is a modification of a part of Embodiment 1, i.e., the structure for attaching the cover body 40 to the main body 3, and therefore, the description will made to the modified portions, and a redundant description will not be made. FIG. 22 is a right-hand side view of the throttle body, FIG. 23 is a sectional view taken along the arrow line XXIII-XXIII in FIG. 22, FIG. 24 is a partial sectional view showing the mounting portion between the main body and the cover body, and FIG. 25 is a sectional view of the primary portion of FIG. 24 in the state prior to the attaching operation.

Figure 23:
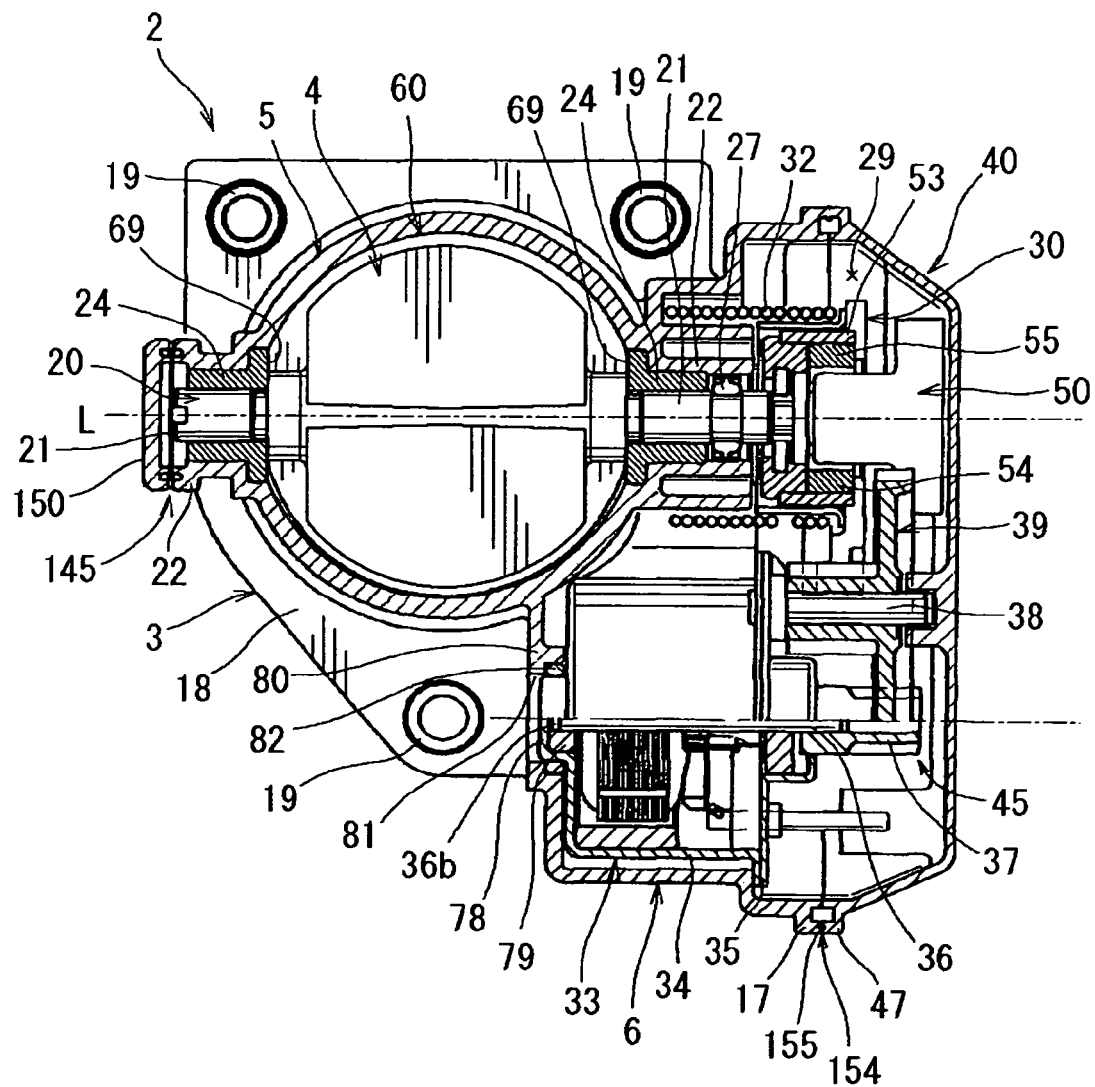
[FIG. 23] A sectional view taken along the arrow line XXIII-XXIII in FIG. 22.
Figure 24:
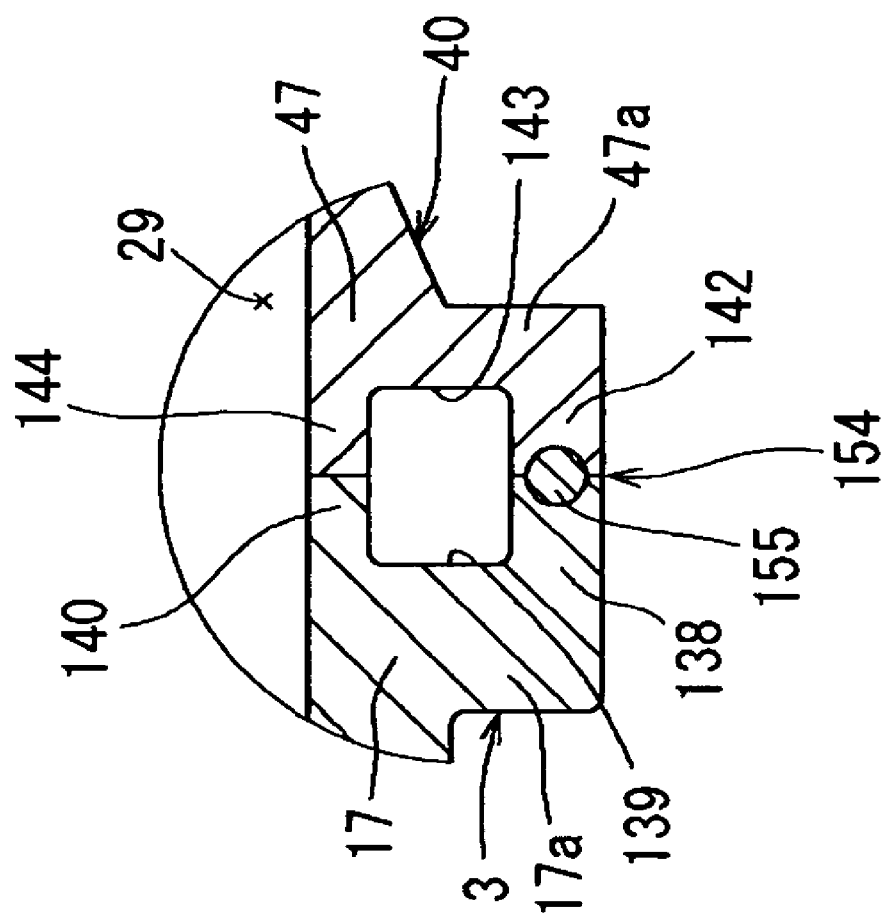
[FIG. 24] A partial sectional view of a mounting portion for a main body and a cover body.

As shown in FIGS. 22 and 23, in this embodiment, the welded portion 137 (see FIGS. 3 and 4) obtained by heating-plate welding in Embodiment 1 is changed to a welded portion (indicated by the reference numeral 154) obtained by welding using a resistance wire, so-called resistance wire welding.

Figure 25:
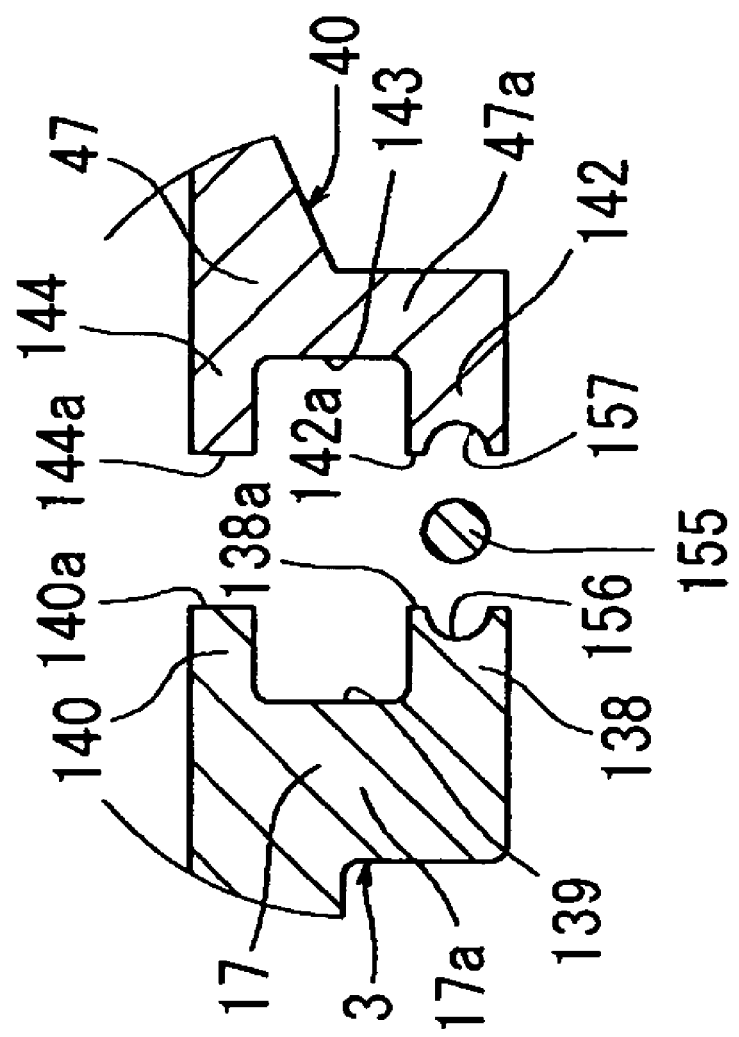
[FIG. 25] A partial sectional view of the mounting portion of FIG. 24 in the state prior to mounting.

As shown in FIG. 25, a fitting groove 156 of a semi-circular sectional configuration is formed over the entire periphery of the joint surface 138a of the joint portion 138 of the attaching edge portion 17 of the main body 3. Further, a fitting groove 157 of a semi-circular sectional configuration in conformity with the fitting groove 156 is formed over the entire periphery of the joint surface 142a of the joint portion 142 of the attaching edge portion 47 of the cover body 40. By joining the joint portions 138 and 142 with each other, the fitting grooves 156 and 157 can accommodate a resistance wire 155 of a circular sectional configuration.

Further, for the installation of the throttle body 2, in the positions of the joint portions 138 and 142 situated on the ground side (the lower side of FIG. 22), opening grooves (not shown) are formed for drawing opposite end portions 155a of the resistance wire 155.

When attaching the cover body 40 to the main body 3 by welding, the opposing end surfaces of the attaching edge portion 17 of the main body 3 and the attaching edge portion 47 of the cover body 40 are brought to abut each other. At that time, the resistance wire 155 is fitted and accommodated between the fitting groove 156 of the joint portion 138 of the attaching edge portion 17 of the main body 3 and the fitting groove 157 of the joint portion 142 of the attaching edge portion 47 of the cover body 40. The opposite end portions 155a of the resistance wire 155 is drawn out of the opening grooves (not shown) situated on the ground side of the joint portions 138 and 142 (see FIG. 22), and are connected to a power source (not shown). In this state, an electric current is applied to the resistance wire 155, so that the distal end portions of the joint portion 138 of the main body 3 and the joint portion 142 of the cover body 40 are melted by heat. As a result, the distal end portions of the joint portions 138 and 142 are welded to each other (see the welded portion 154 of FIG. 24). After that, the welded portion 154 formed by the joint portion 138 of the main body 3 and the joint portion 142 of the cover body 40 is cooled to be cured.

It is advisable to cut off the opposite end portions 155a of the resistance wire 155 (see FIG. 22) after the welding process. Further, the opening grooves (not shown), formed in the joint portion 138 of the main body 3 and the joint portion 142 of the cover body 40 for the purpose of drawing out the opposite end portions 155a of the resistance wire 155, can be utilized as a water drainage hole communicating the gear housing space 29 to the exterior. If the opening grooves are not utilized as a water drainage hole, the opening may be sealed with a potting resin or the like.

Also in Embodiment 3 described above, it is possible to obtain substantially the same effects as those of Embodiment 1.

Embodiment 4

Figure 26:
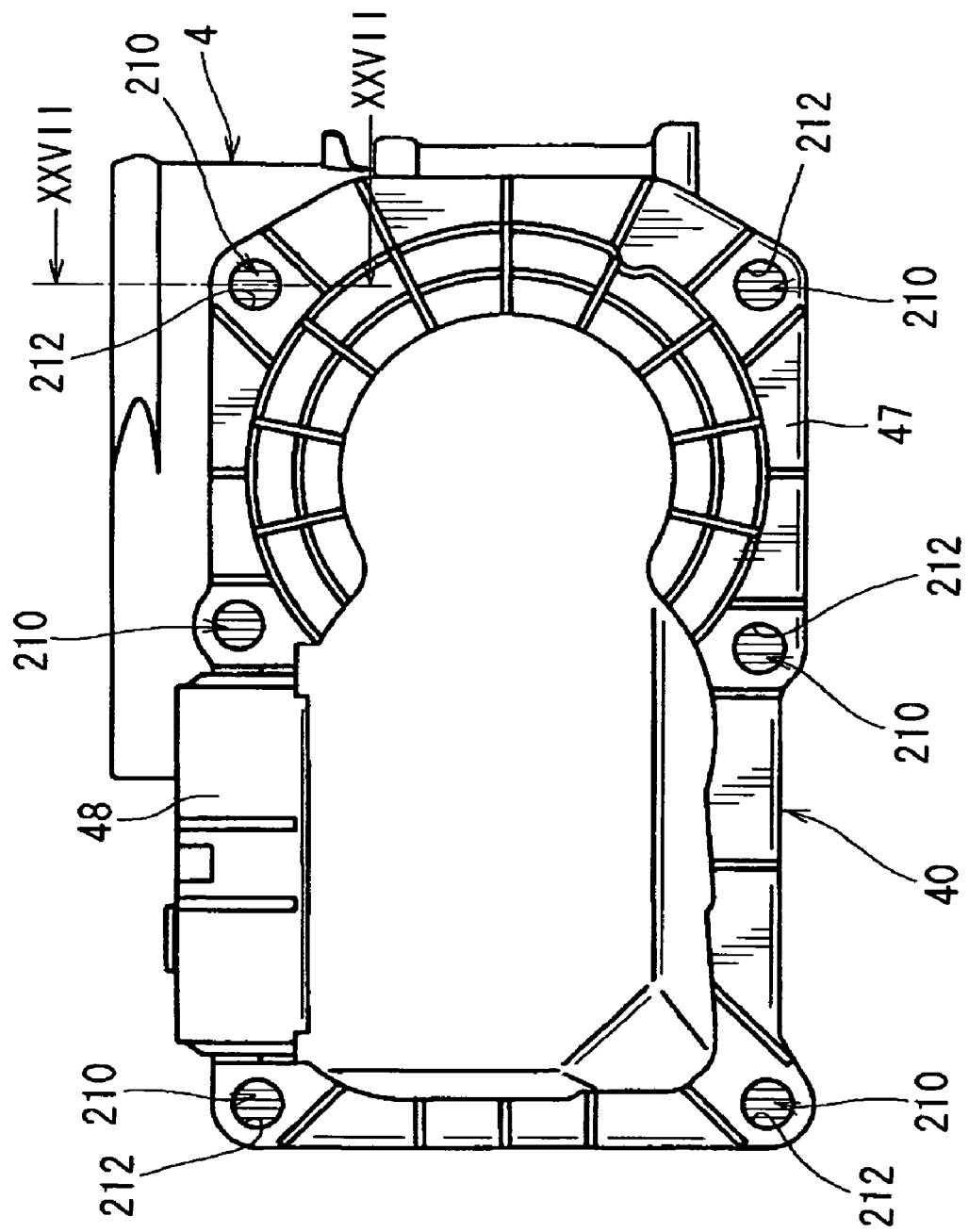
[FIG. 26] A right-hand side view of a throttle body according to Embodiment 4.

Embodiment 4 will be described. This embodiment is a modification of a part of Embodiment 1, i.e., the structure for attaching the cover body 40 to the main body 3, so that the description will be made to the modified portions, and a redundant description will not be made. FIG. 26 is a right-hand side view of the throttle body, and FIG. 27 is a sectional view taken along the arrow line XXIII-XXIII in FIG. 26.

Figure 27:
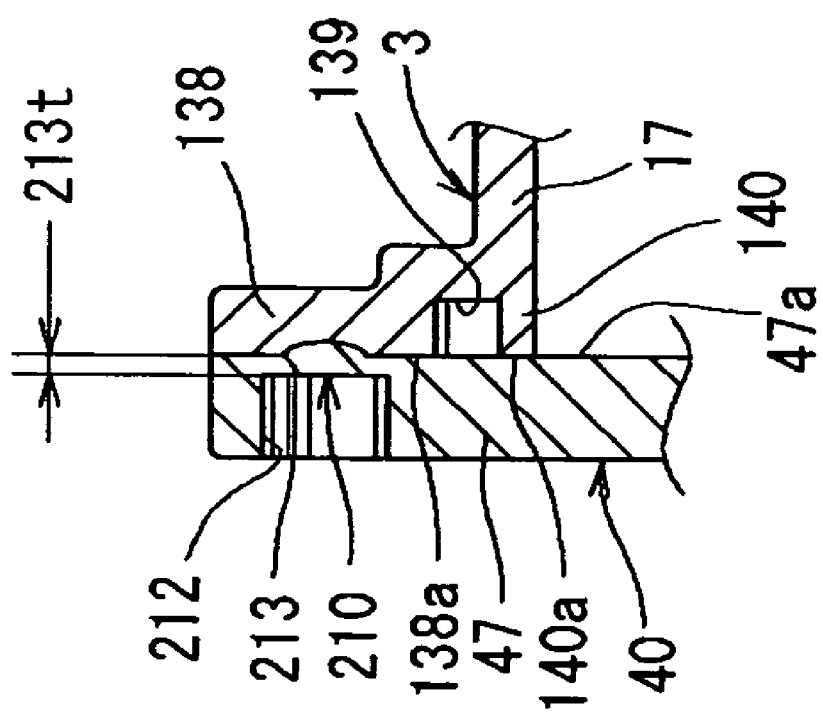
[FIG. 27] A sectional view taken along the arrow line XXVII-XXVII in FIG. 26.

As shown in FIGS. 26 and 27, in this embodiment, the welded portion 137 (see FIGS. 3 and 4) obtained by heating-plate welding in Embodiment 1 is changed to a welded portion (indicated by the reference numeral 210) obtained by welding using a laser (or laser light), so-called spot welding by laser welding.

That is, recessed portions 212 in the form, for example, of bottomed cylinders, are formed in an appropriate number of positions of the attaching edge portion 47 of the cover body 40, for example, in six positions arranged at predetermined intervals in the circumferential direction as shown in FIG. 26. Further, as shown in FIG. 27, a contact surface (indicated by the reference symbol 47b) is formed on the attaching edge portion 47 of the cover body 40. The contact surface 47b is formed as a single flat surface facing the joint surface 138a of the joint portion 138 of the attaching edge portion 17 of the main body 3, the contact surface 140a of the contact portion 140, and the separating groove 139. Thus, the joint portion 142, the separating groove 139, and the contact portion 144 (see FIG. 12) of Embodiment 1 are eliminated.

When attaching the cover body 40 to the main body 3 by welding, the opposing end surfaces of the attaching edge portion 17 of the main body 3 and the attaching edge portion 47 of the cover body 40 are brought to abut each other. In this state, laser light is applied from the outer side (the left-hand side of FIG. 27) to thin-walled bottom portions 213 in the recessed portions 212, so that the bottom portions 213 and the portions of the joint portion 138 of the attaching edge portion 17 of the main body 3 corresponding to the bottom portions 213 are melted by heat. In this state, the joint portion 138 of the attaching edge portion 17 and the attaching edge portion 47 are welded to each other (see the welded portion 210 of FIG. 27). After that, the welded portions 212 are cooled and cured.

In this embodiment, the cover body 40 is made of a transparent polyphenylene sulfide (PPS) resin. The bottom portions 213 of the recessed portions 212 of the cover body 40 are formed to have a thickness 213t allowing the laser welding. For example, the thickness 213t of the bottom portions 213 of the recessed portions 212 of the cover body 40, made of a PPS resin, is approximately 1 mm. The main body 3 is made of a non-transparent polyphenylene sulfide (PPS) resin.

In this embodiment, the cover body 40 made of a transparent resin is attached to the main body 3 made of a non-transparent resin by laser welding (see the welded portions 210 of FIGS. 26 and 27), so that it is possible to obtain substantially the same effects as those of Embodiment 1.

Further, the cover body 40 is attached to the main body 3 by the spot laser welding process, so that it is possible to improve the productivity and to reduce the cost. In this case, it is desirable to provide a sealing material for effecting sealing between the main body 3 and the cover body 40.

It is possible to form the main body 3 of a transparent resin, and to form the cover body 40 of a non-transparent resin.

Figure 28:
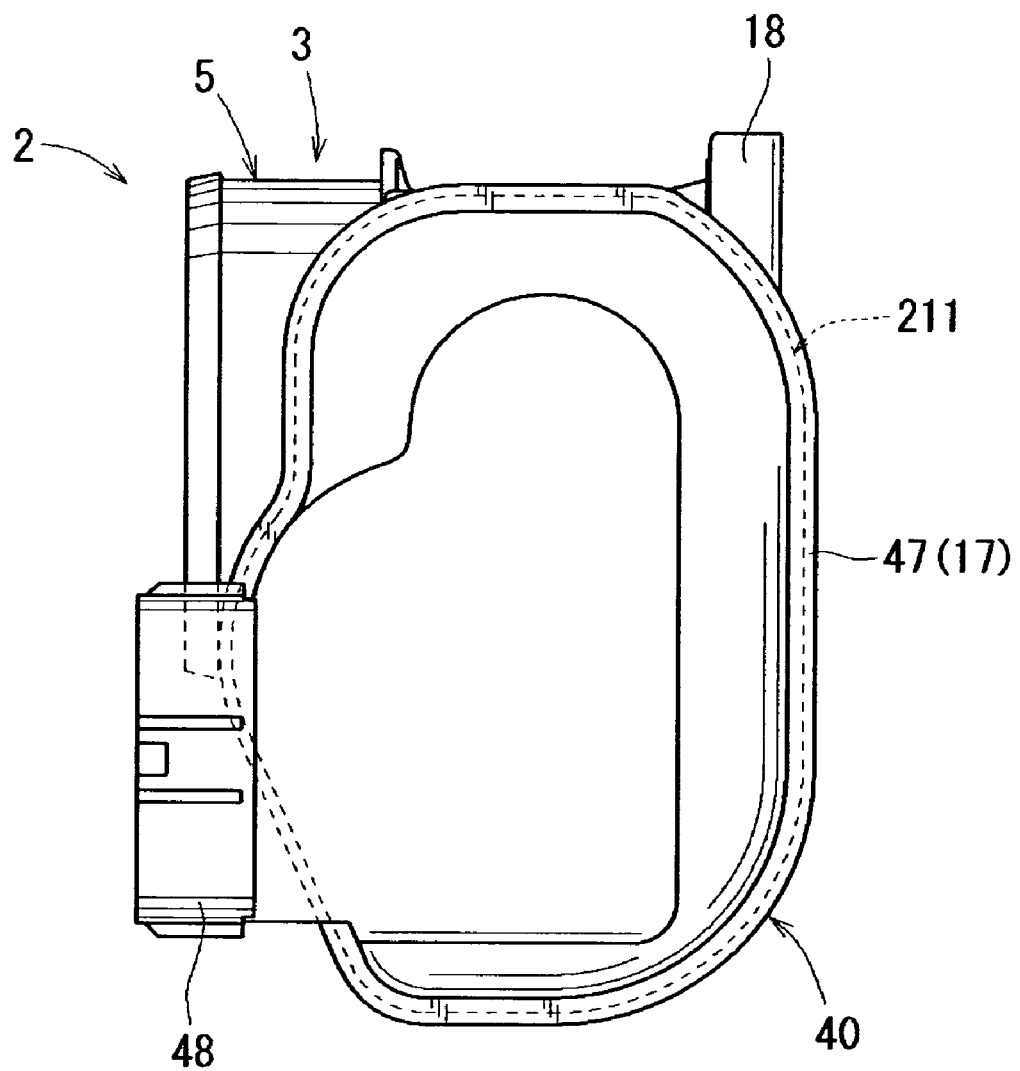
[FIG. 28] A right-hand sectional view of a throttle body according to a modification.

As shown in FIG. 28, the cover body 40 can be laser-welded to the entire periphery of the main body 3 (as indicated by the reference numeral 211 of FIG. 28). In this case, it is possible to eliminate a sealing material for effecting sealing between the main body 3 and the cover body 40, so that the cost can be reduced.

Embodiment 5

Figure 29:
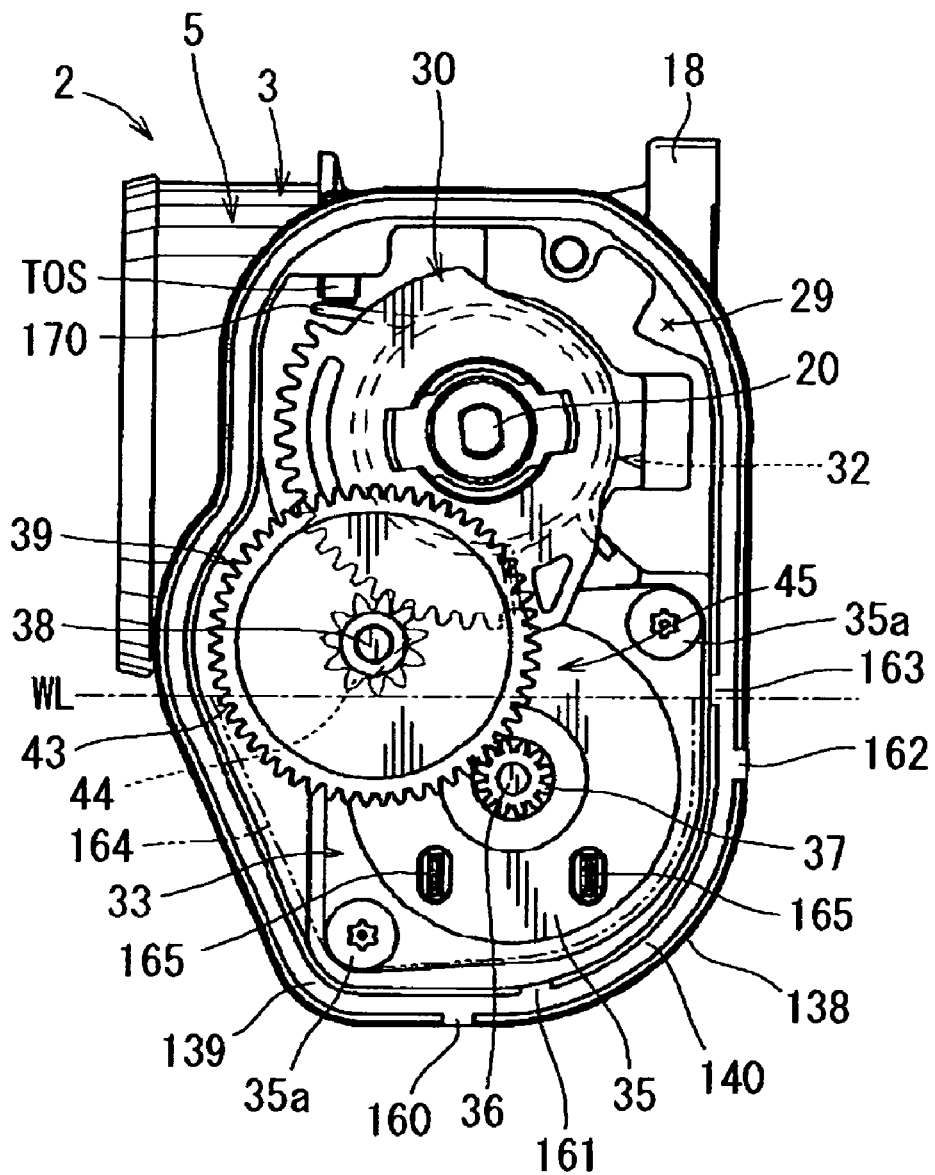
[FIG. 29] A side view of the cover body mounting side of a main body according to Embodiment 5.

Embodiment 5 will be described. This embodiment is a partial modification of Embodiment 1, and therefore, the following description will be made to the modified portions, and a redundant description thereof will not be made. FIG. 29 is a side view of the cover body mounting side of the main body, FIG. 30 is a side view of the cover body mounting side, and FIG. 31 is a partial sectional view of the attaching portion between the main body and the cover body.

As shown in FIG. 29, in this embodiment, a water drainage hole 160 is formed in the region of the joint portion 138 of the attaching edge portion 17 of the main body 3 situated on the ground side (the lower side of FIG. 29) when the throttle body 2 of Embodiment 1 is installed. Similarly, a water drainage hole 161 is formed in the region of the attaching edge portion 17 of the inner contact portion 140 of the main body 3 situated on the ground side (the lower side of FIG. 29). The water drainage holes 160 and 161 are offset from each other in the longitudinal direction (horizontally in FIG. 29). In the case of this embodiment, the water drainage hole 161 of the inner contact portion 140 is offset backwards (to the right of FIG. 29) with respect to the water drainage hole 16 of the joint portion 138. The water drainage holes 160 and 161 and the inner separating groove 139 form a water drainage passage of a labyrinth-like structure through which the gear housing space 29 communicates with the exterior.

Further, an air vent hole 162 is formed in the region of the joint portion 138 of the attaching edge portion 17 of the main body 3 situated on a lateral side (the back side in the case of this invention) when the throttle body 2 is installed. Similarly, an air vent hole 163 is formed in the region of the inner contact portion 140 of the attaching edge portion 17 of the main body 3 situated on the lateral side (the back side in this embodiment). The air vent holes 162 and 163 are vertically offset from each other. In the case of this embodiment, the air vent hole 163 of the inner contact portion 140 is offset downwards with respect to the air vent hole 162 of the joint portion 138. The air vent holes 162 and 163 and the inner separating groove 139 form an air passage of a labyrinth-like structure through which the gear housing space 29 communicates with the exterior.

Figure 30:
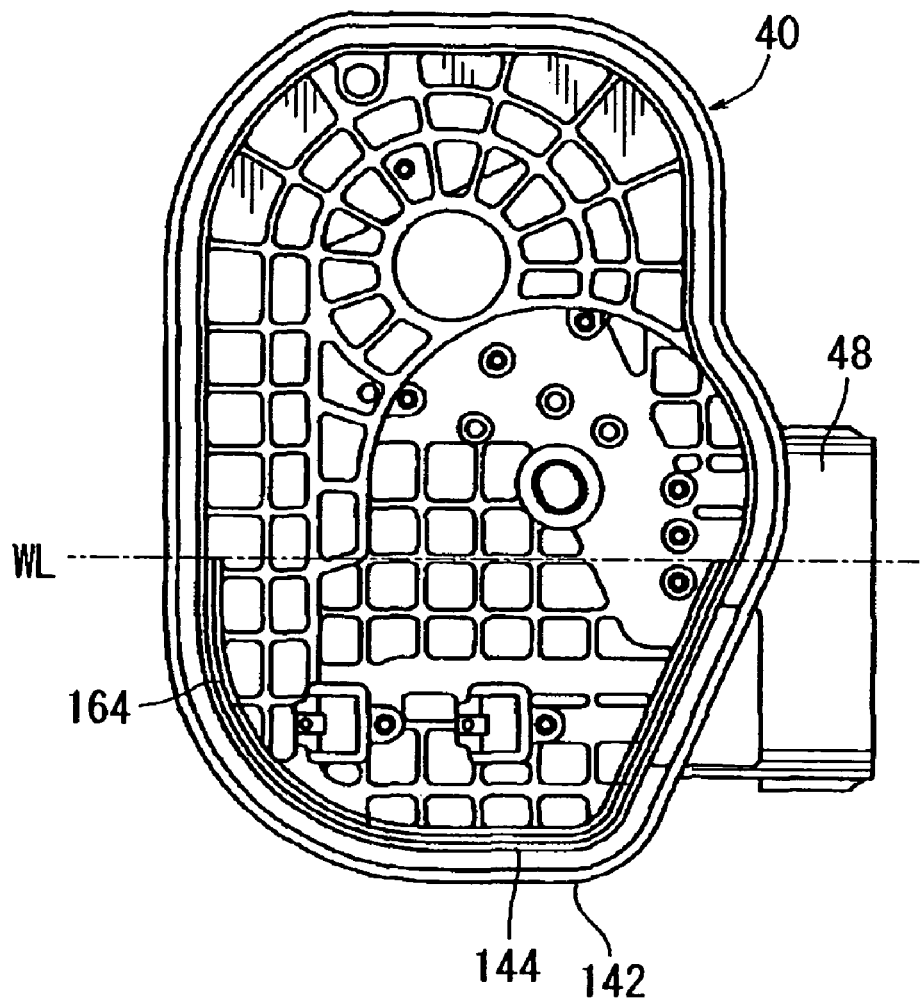
[FIG. 30] A side view of the mounting side of a cover body.
Figure 31:
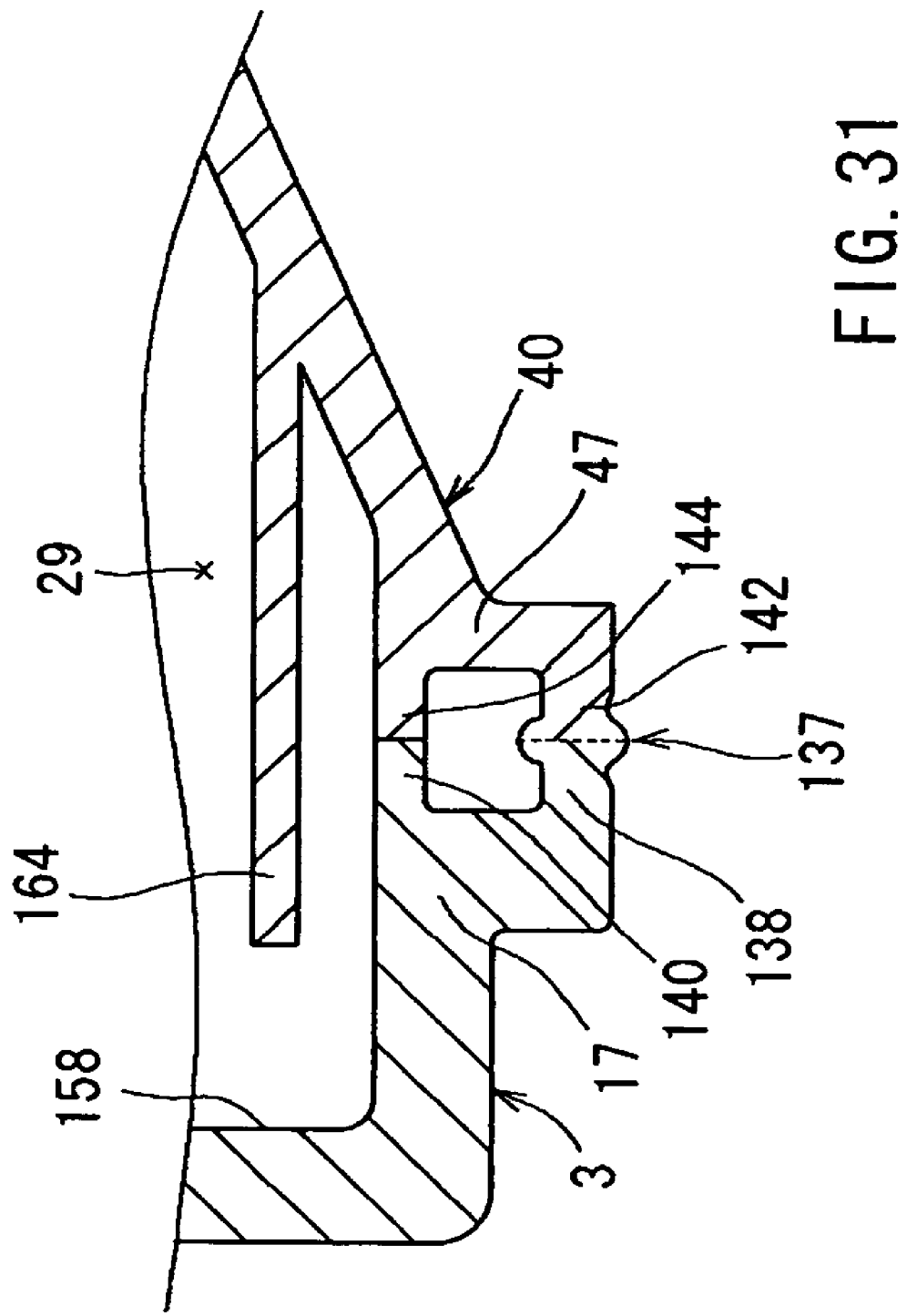
[FIG. 31] A partial sectional view of a mounting portion for the main body and the cover body.

As shown in FIG. 30, on the inner side surface of the cover body 40, a blocking wall portion 164 is formed along the inner peripheral side of the inner contact portion 144 of the attaching edge 47 situated on the ground side (the lower side of FIG. 30) when the throttle body 2 is mounted. The blocking wall portion 164 is spaced by a predetermined distance from the inner contact portion 144 in parallel thereto and is formed to have a substantially U-shaped configuration.

As shown in FIG. 31, the blocking wall portion 164 protrudes sidewise (to the left of FIG. 31) by a protruding amount larger than that of the inner contact portion 144 of the attaching edge portion 47 of the cover body 40. Thus, when the cover body 40 is attached to the main body 3, the blocking wall portion 164 enters the inner space of the main body 3, and its distal end portion opposes to and spaced by a predetermined distance from inner surface (indicated by the reference numeral 158) of the main body 3.

The blocking wall portion 164 prevents intrusion of water into the gear housing space 29 through the gap between the inner contact portion 140 of the attaching edge portion 17 of the main body 3 and the inner contact portion 140 of the attaching edge portion 47 of the cover body 40, so that it is possible to prevent short-circuiting of terminals 165 of the drive motor 33 (see FIG. 29) due to water reaching the terminals 165. The water intrusion preventing function of the blocking wall portion 164 is effective to a water level WL (see FIGS. 29 and 30). The portion where the blocking wall portion 164 is formed is not restricted to the cover body 40, and it may also be formed on the main body 3.

Embodiment 6

Figure 32:
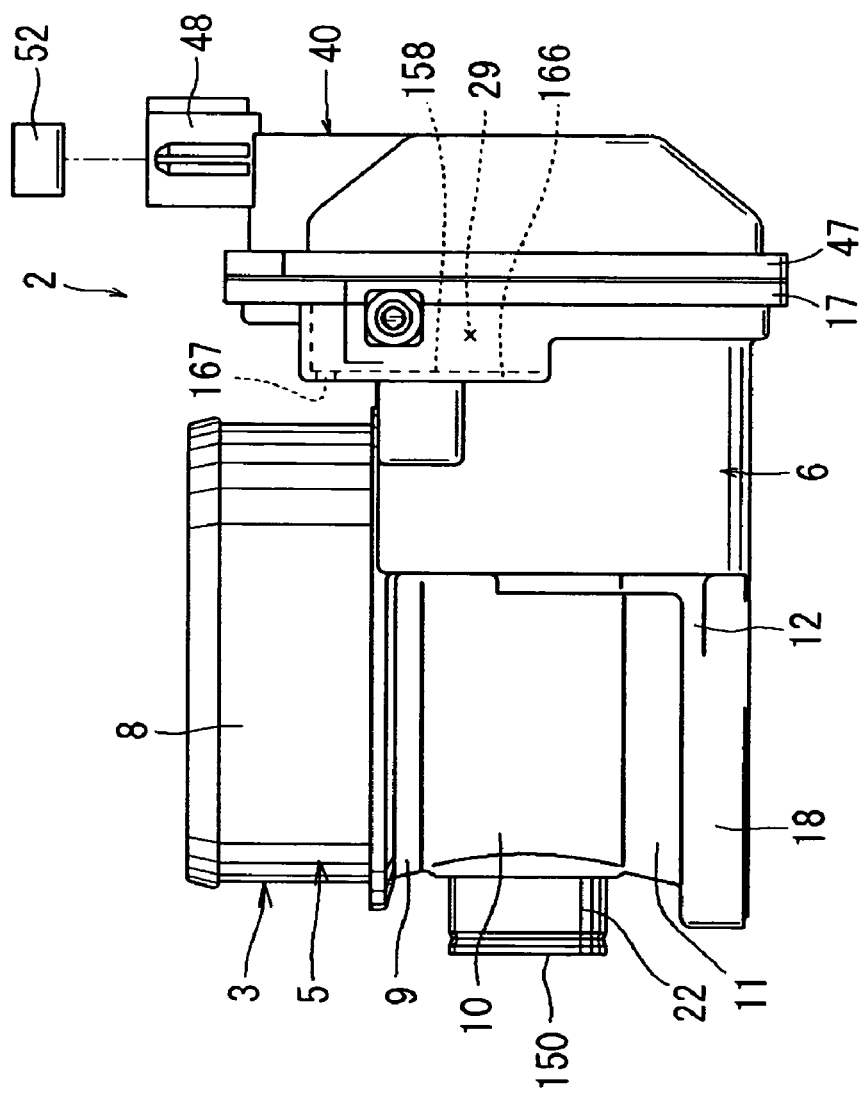
[FIG. 32] A bottom view of a throttle body according to Embodiment 6.

Embodiment 6 will be described. This embodiment is a partial modification of Embodiment 1, so that the following description will be made to the modified portions, and a redundant description thereof will not be made. FIG. 32 is a plan view of the throttle body, FIG. 33 is a side view of the cover body attaching side of the man body.

Figure 33:
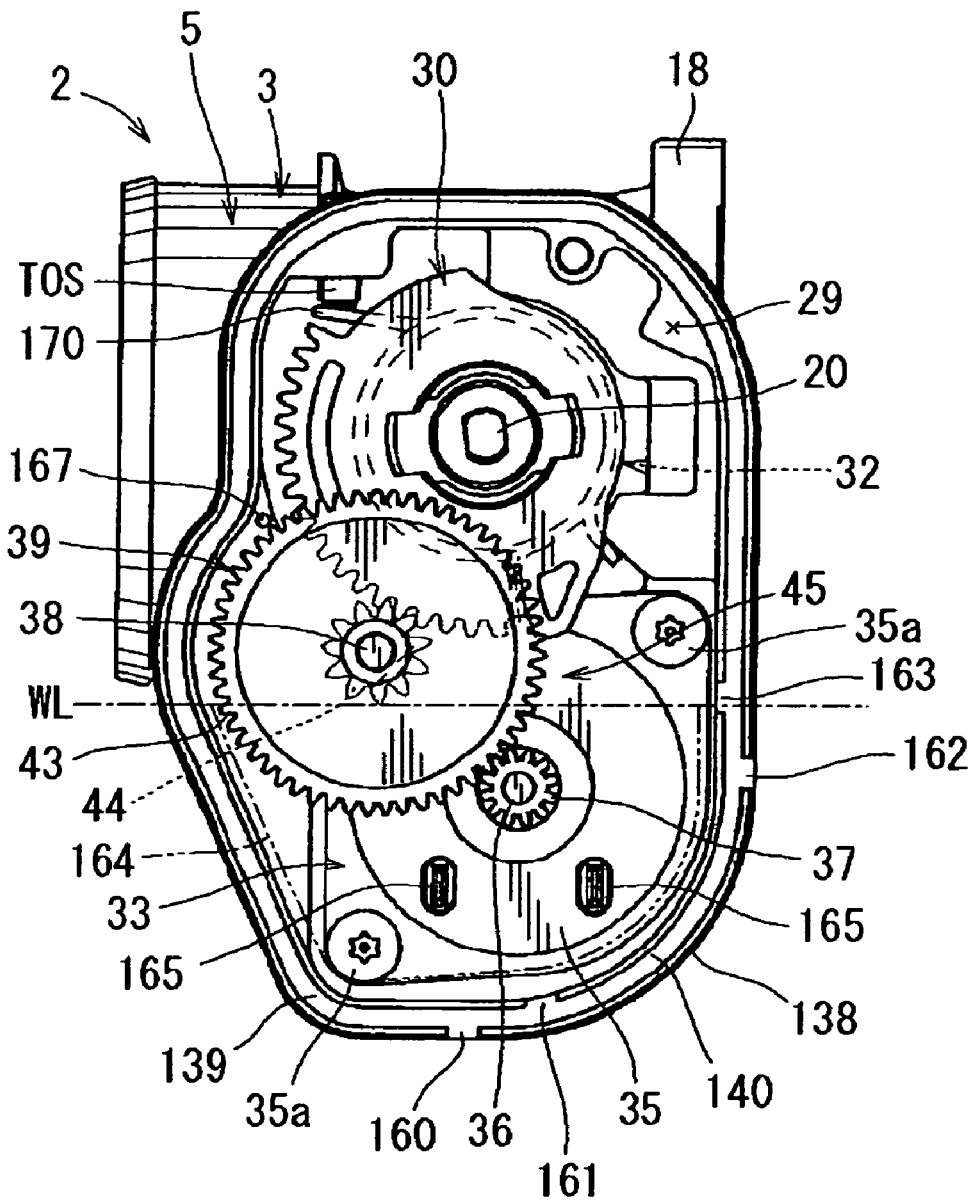
[FIG. 33] A side view of the cover body mounting side of a main body.

As shown in FIGS. 32 and 33, in this embodiment, a respiration hole 167 through which the gear housing space 29 communicates with the exterior is formed in a lateral wall 166 defining the inner surface 158 of the gear housing space 29 of the main body 3. When the throttle body 2 mounted, the respiration hole 167 is arranged above the water level WL where the water intrusion preventing function is exerted by the blocking wall portion 164.

By providing the main body 3 with the respiration hole 167 in this way, it is possible to prevent or mitigate condensation in the gear housing space 29. The portion where the respiration hole 167 is provided is not restricted to the main body 3, it may also be provided in the cover body 40.

Embodiment 7

Figure 34:
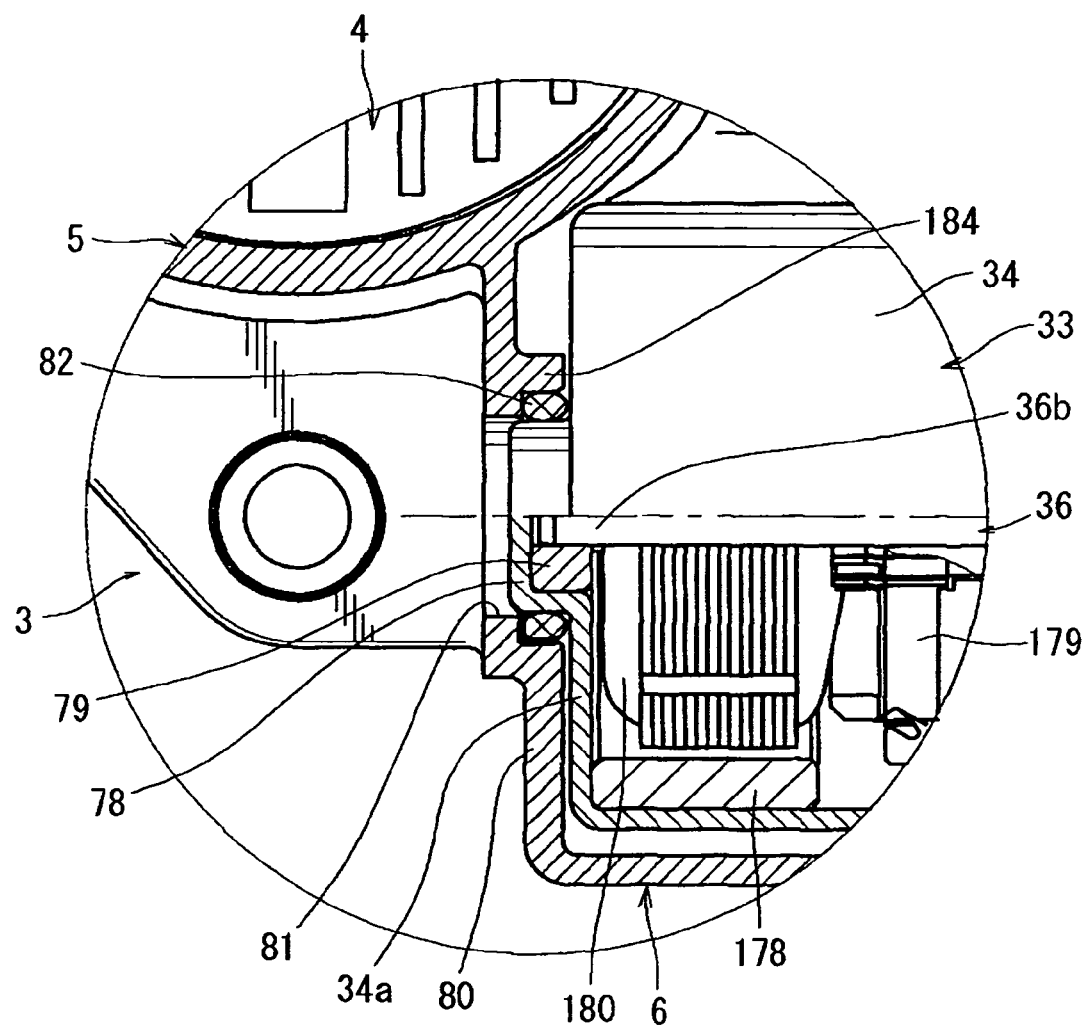
[FIG. 34] A sectional view of a throttle body according to Embodiment 7, showing the portion around the housing end portion of the motor housing of a drive motor.
Figure 35:
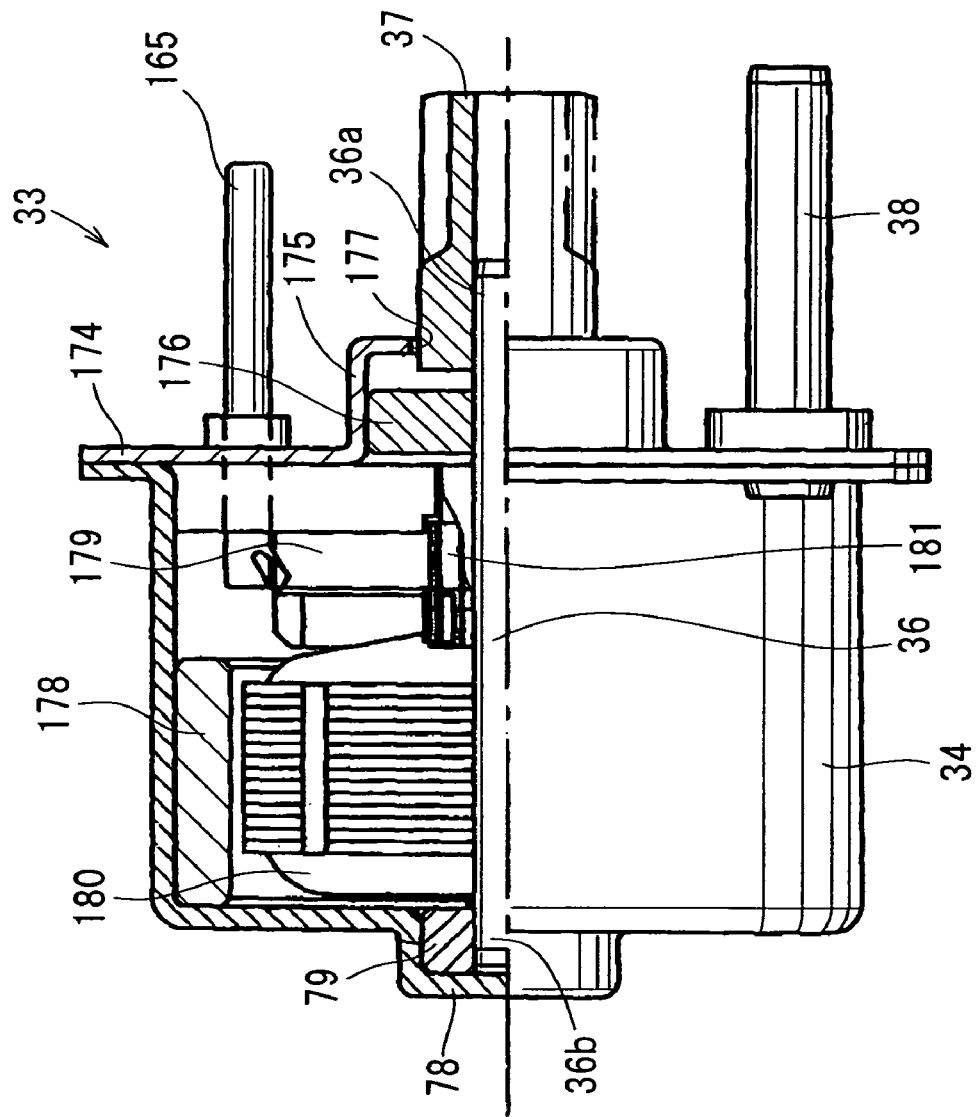
[FIG. 35] A partially cutaway side view of the drive motor.

Embodiment 7 will be described. This embodiment is a partial modification of Embodiment 1, and therefore, the following description will be made to the modified portions, and a redundant description will not be made. In this embodiment, the housing end of the motor housing of the drive motor and the motor housing portion of the main body corresponding to the housing end portion are modified. FIG. 34 is a sectional view of around the housing end of the motor housing of the drive motor, and FIG. 35 is a partially cutaway side view of the drive motor.

First, the construction of the motor housing 34 of the drive motor 33 will be described. As shown in FIG. 35, a housing end 78 expanding in the form of a bottomed cylinder is formed at the bottom wall portion (indicated by the reference symbol 34a) on the side opposite to the output side of the motor housing 34 of the drive motor 33. A bearing 79 is disposed in a sealed state within the housing end 78. The end portion (indicated by the reference symbol 36b) on the side opposite to the output side of the motor shaft 36 is rotatably supported by the bearing 79. The housing end 78 corresponds to the end portion on the side opposite to the output side of the motor housing 34.

A closure plate 174 is joined to the motor housing 34 for closing the open end surface (the right-hand end surface in FIG. 35) of the motor housing 34. Within a bearing housing portion 175 formed on the closure plate 174, a bearing 176 is disposed coaxially with the bearing 79. The output-side end portion (indicated by the reference symbol 36a) of the motor shaft 36 is rotatably supported by the bearing 176. An opening 177 is formed at the center of the bearing housing portion 175 of the closure plate 174.

The output-side end portion 36a of the motor shaft 36 protrudes forward (to the right in FIG. 35) through the bearing 176 and the opening 177 of the bearing housing portion 175 of the closure plate 174. A motor pinion 37 is mounted to the output-side end portion 36a of the motor shaft 36 by press-fitting or the like. The proximal end portion (the left-hand end portion in FIG. 35) of the motor pinion 37 is loosely fitted into the opening 177 of the bearing housing portion 175 of the closure plate 174. A magnet 178, a brush 179, etc. are arranged inside the motor housing 34. A rotor 180 is provided on the motor shaft 36. The closure plate 174 is provided with the terminal 165 and a commutator 181.

Next, the construction of the motor housing portion 6 of the main body 3 will be described. As shown in FIG. 34, an opening 81 corresponding to the housing end 78 of the motor housing 34 of the drive motor 33 is formed in the bottom wall portion 80 of the motor housing portion 6 of the main body 3. The opening 81 corresponds to the "opening through which the end portion of the drive motor on the side opposite to the output side of the motor housing is exposed".

Further, an annular support portion 184 is formed in a step-like form on the inner side of the opening 81 of the bottom wall portion 80 of the motor housing portion 6. At the support portion 184, the housing end 78 of the motor housing 34 is supported resiliently in a sealed state via a support ring 82 constituted by an O-ring so as to face the opening 81. In addition, the bottom wall portion 34a of the motor housing 34 of the drive motor 33 faces the bottom wall portion 80 of the motor housing portion 6. The support ring 82 corresponds to the "sealing material" in this specification. As described with reference to Embodiment 1, the main body 3 and the cover body 40 are sealed over their entire peripheries by the welded portion 137 (see FIGS. 3 and 4).

According to this embodiment, the housing end 78 of the motor housing 34 of the drive motor 33 is exposed to the exterior through the opening 81 provided in the bottom wall portion 80 of the motor housing portion 6 of the main body 3, so that it is possible to improve the heat radiation property of the drive motor 33. This proves effective when the housing end 78 of the motor housing 34 of the drive motor 33 is formed to have a bottomed shape.

Further, at the bottom wall portion 80 of the motor housing portion 6 of the main body 3, the housing end 78 of the motor housing 34 of the drive motor 33 is supported resiliently in a sealed state by the support ring 82. Therefore, the sealing property for the interior of the main body 3 is secured, and it is possible to prevent or mitigate transmission of vibrations from the motor housing 34 to the main body 33.

Further, the housing end 78 of the motor housing 34 of the drive motor 33 is formed to have a bottomed shape. Therefore, despite the fact that the housing end 78 of the motor housing 34 of the drive motor 33 is exposed via the opening 81 of the bottom wall portion 80 of the motor housing 6 of the main body 3, it is possible to prevent intrusion of water and dust into the motor housing 34.

Figure 36:
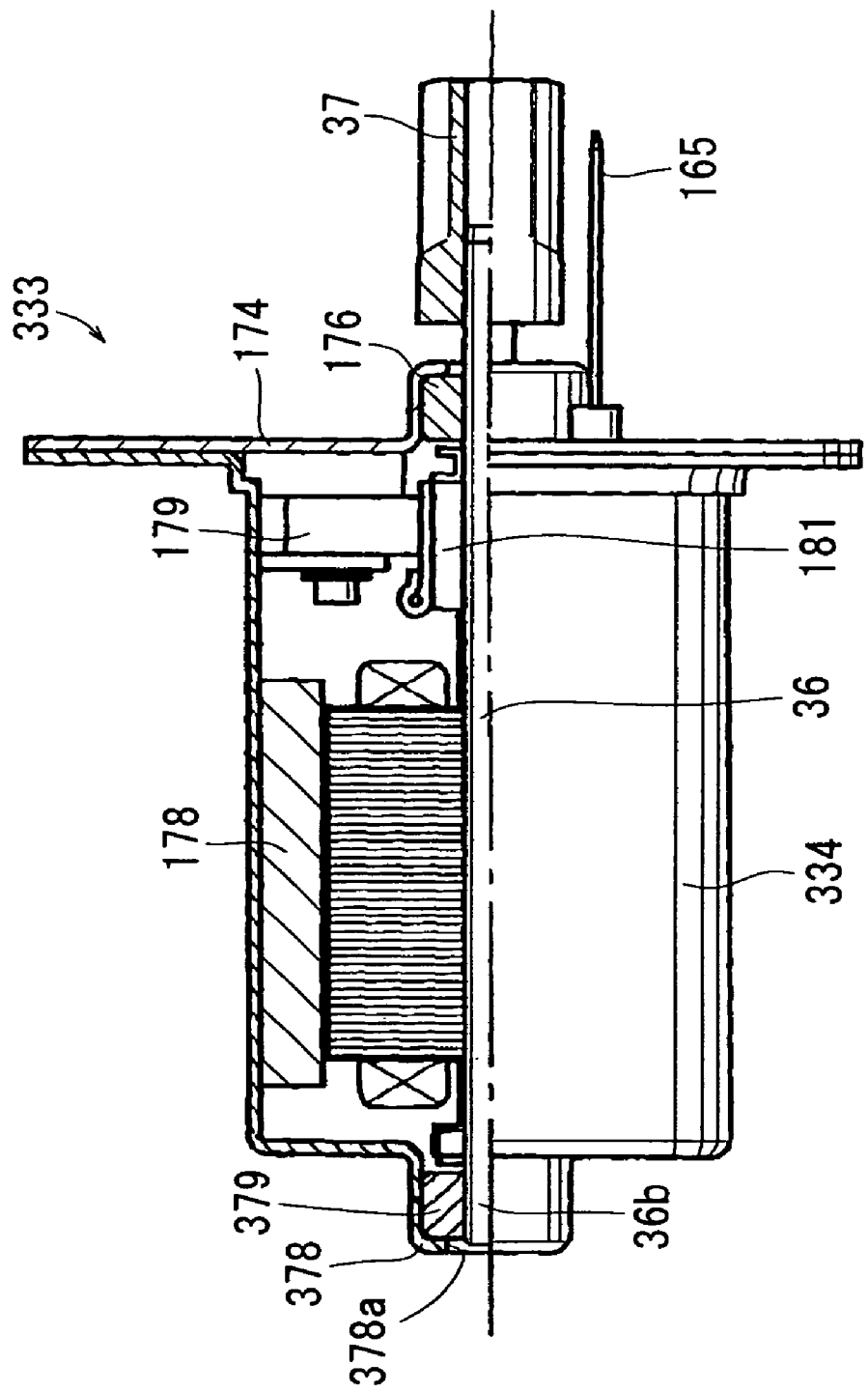
[FIG. 36] A partially cutaway side view of a conventional drive motor.

As shown in FIG. 36, with the conventional drive motor, an opening 378a is formed in a housing end 378 on the housing end side (the left-hand side of FIG. 36) of a motor housing 334. Since the other construction is the same as the Embodiment 1, the same components are labeled with the same reference numerals, and a redundant description will not be made.

Thus, with the conventional drive motor 333, in order to prevent intrusion of water and dust into the motor housing 34 through the opening 378a of the housing end 378, the bottom wall portion 80 (see FIG. 34) of the motor housing portion 6 of the main body 3 has to be formed to have a bottomed shape. That is, since it is impossible to provide the opening 81 at the bottom wall portion 80 of the motor housing portion 6 of the main body 3, there is a possibility that the radiation property of the drive motor 333 is impaired and the performance of the drive motor 333 is deteriorated.

In contrast, according to the present embodiment, the housing end 78 of the motor housing 34 is formed to have a bottomed shape to realize a sealed structure (see FIG. 34). In addition, the housing end 78 of the motor housing 34 is exposed to the exterior of the motor housing portion 6 via the opening 81 of the bottom wall portion 80 of the main body 3 (see FIG. 34). Therefore, it is possible to radiate the heat generated in the drive motor 33 by cooling with outside air, so that the heat radiation property of the drive motor 33 can be improved. Further, due to the provision of the support ring 82 between the peripheral portion of the opening 81 of the bottom wall portion 80 and the housing end 78, it is possible to secure the sealing property. Further, it is possible to resiliently support the motor housing 34 by the support ring 82. The place where the securing of sealing property and resilient support are effected by the support ring 82 is not limited to the housing end 78, and it may be any other place as long as it belongs to the motor housing 34.

Embodiment 8

Figure 37:
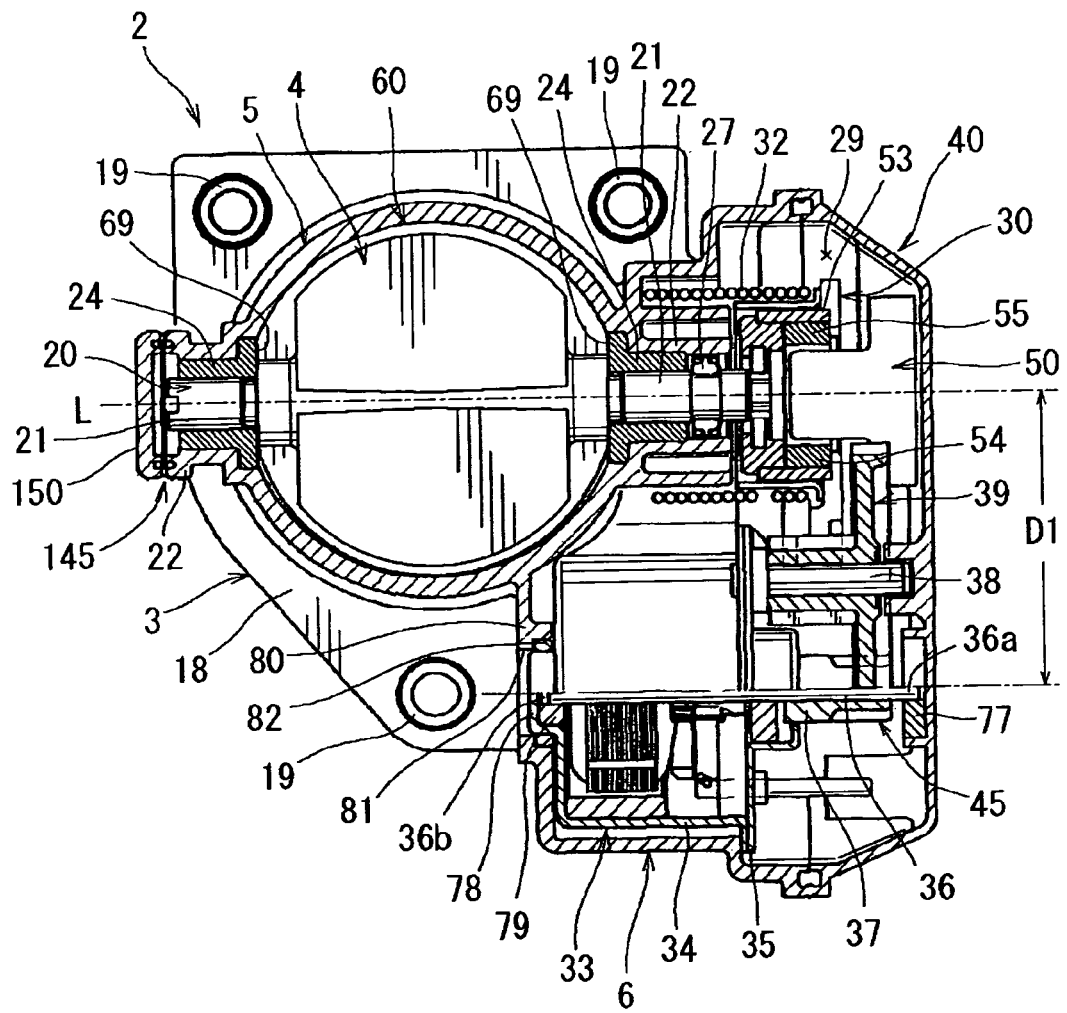
[FIG. 37] A partially cutaway side view of a conventional drive motor.

Embodiment 8 will be described. This embodiment is a partial modification of Embodiment 1, and therefore, the following description will be made to the modified portions, and a redundant description will not be made. In this embodiment, the motor shaft support structure for the drive motor is modified. FIG. 37 is a sectional view of the throttle body.

As shown in FIG. 37, in this embodiment, a motor shaft bearing 77 is disposed on the inner side surface of the cover body 40. Further, the output-side end portion 36a of the motor shaft 36 of the drive motor 33 protrudes from the motor pinion 37 to the side of the cover body 40 in order to rotatably support the motor shaft bearing 77. With this structure, the bearing 176 (see FIG. 35) for supporting the output-side end portion 36a of the motor shaft 36 at the closure plate 174 of the motor housing 34 is omitted. The other construction is the same as Embodiment 7 (see FIGS. 34 and 35), and the end portion 36b on the side opposite to the output side of the motor shaft 36 of the drive motor 33 is rotatably supported at the housing end 78 of the motor housing 34 via the intermediation of the bearing 79. The housing end 78 is supported on the bottom wall portion 80 of the motor housing portion 6 via the support ring 82 so as to face the opening 81.

In this embodiment, the output-side end portion 36a of the motor shaft 36 of the drive motor 33 is rotatably supported on the cover body 40, so that it is possible to reduce the load on the motor shaft 36 of the drive motor 33. Thus, it is possible, for example, to set the shaft diameter of the motor shaft 36 of the drive motor 33 to be small, so that the size of the drive motor 33 can be reduce and the cost can be reduced.

Further, due to the elimination of the bearing 176 (see FIG. 35) for supporting the output-side end portion 36a of the motor shaft 36 on the motor housing 34, it is possible to make the axial length of the motor housing 34 shorter by the corresponding length. Thus, it is possible to reduce the requisite space for the arrangement of the motor housing 34. In addition, it is possible to reduce the inter-axis distance D1 between the motor shaft 36 of the drive motor 33 and the throttle shaft 20, so that it is possible to reduce the size of the throttle body 2.

Further, in Embodiment 7 (see FIG. 35), the motor pinion 37 is provided on the output-side end portion 36a of the motor shaft 36, so that the output-side end portion 36a of the motor shaft 36 is supported in a cantilever manner. Therefore, the load on the motor shaft 36 is increased, so that it is necessary to enlarge the shaft diameter of the motor shaft 36 and to firmly support the motor shaft 36 at the closure plate 174 of the motor housing 34. Therefore, there is a problem in that increase in the size of the motor housing 34 is inevitable, and the requisite space for the arrangement of the drive motor 33 increases.

In contrast, according to the present embodiment, the output-side end portion 36a of the motor shaft 36 of the drive motor 33 is rotatably supported on the cover body 40, and therefore, it is possible to reduce the load on the motor shaft 36. Thus, the structure relating to the shaft diameter and supporting of the motor shaft 36 is simplified, so that it is possible to reduce the requisite space for the arrangement of the drive motor 33.

Embodiment 9

Figure 38:
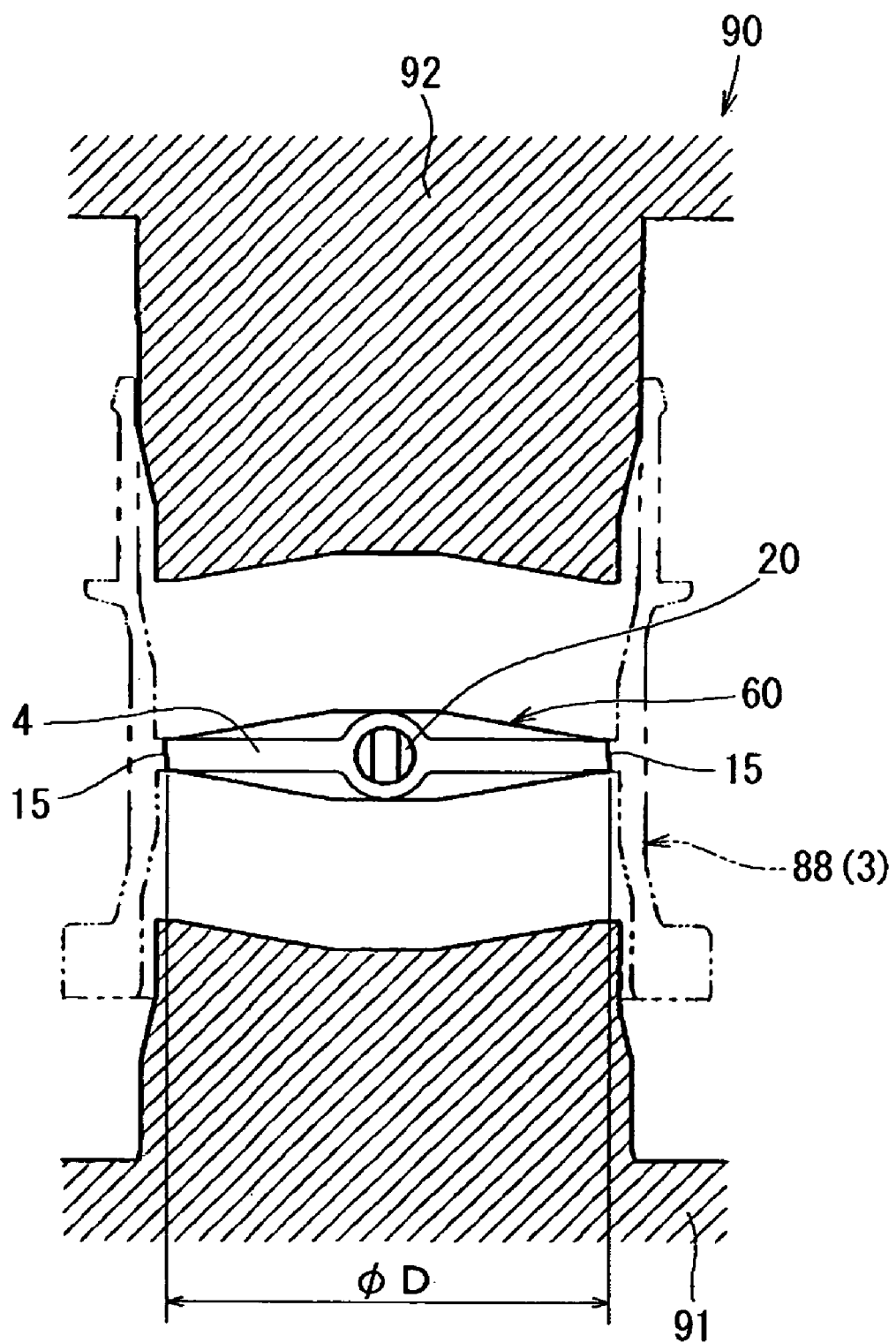
[FIG. 38] A sectional view showing the relationship between a valve body and a body molding die prior to the molding of a main body according to Embodiment 9.
Figure 39:
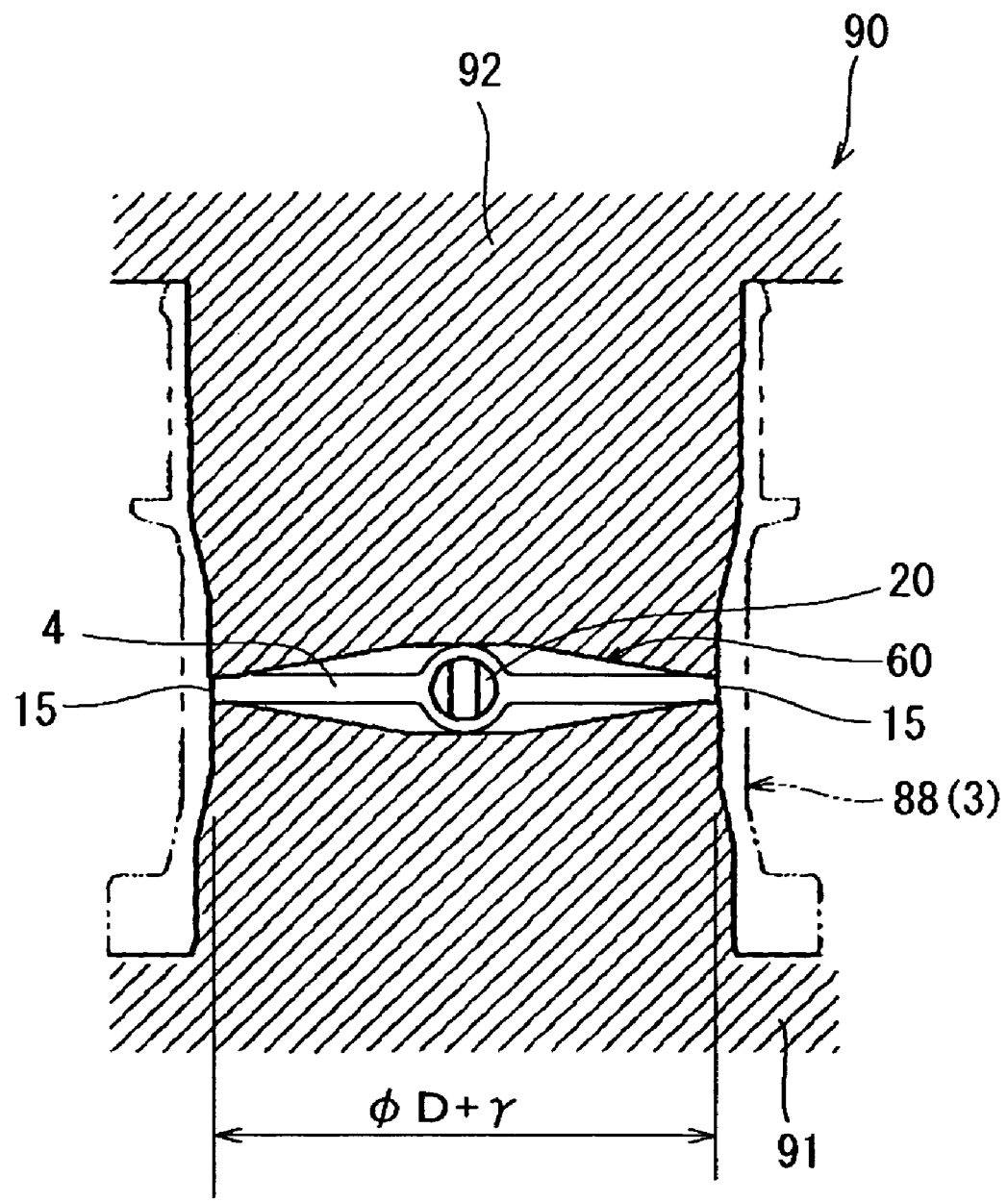
[FIG. 39] A sectional view showing the relationship between the valve body and the body molding die during the molding of the main body.
Figure 40:
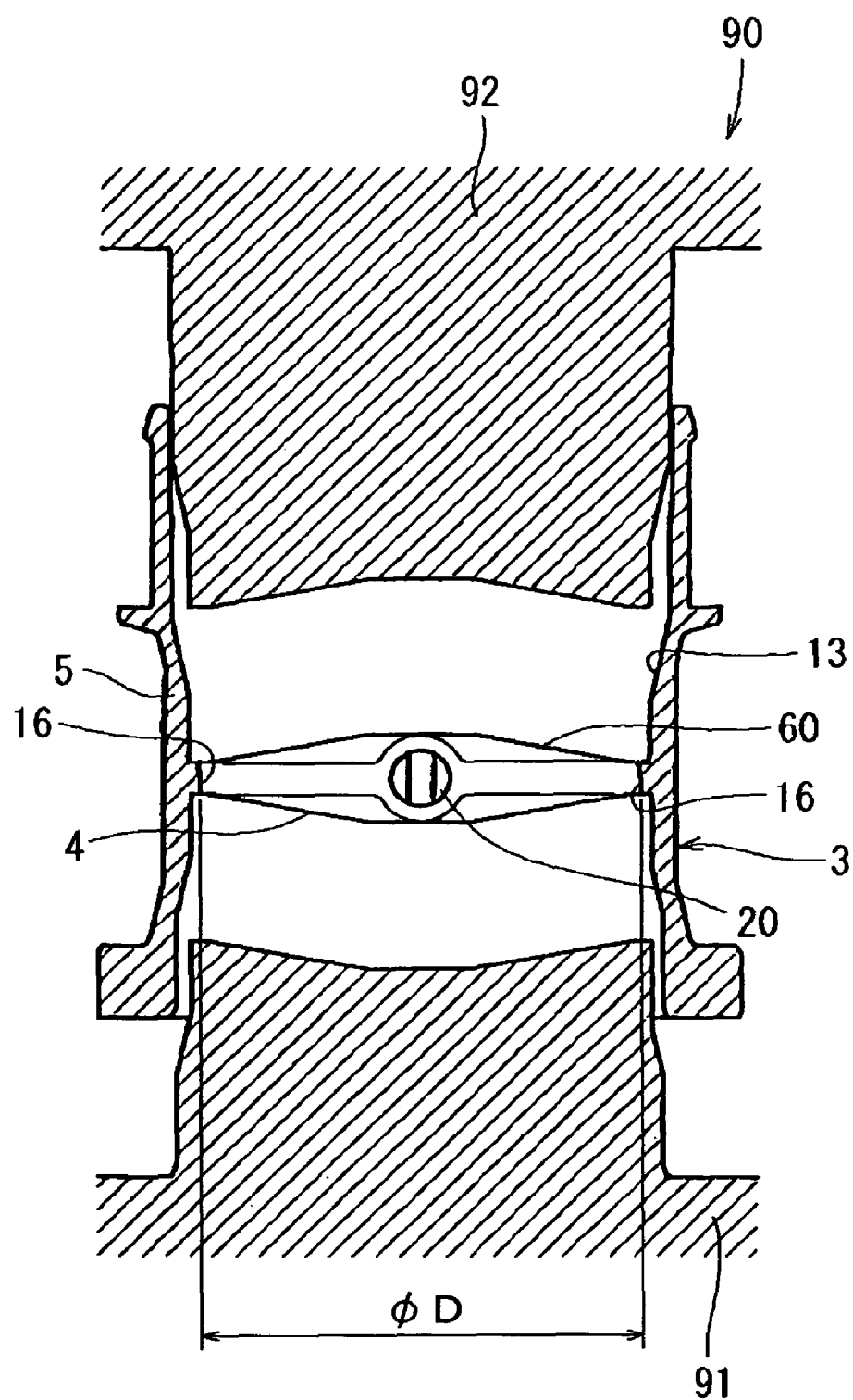
[FIG. 40] A sectional view showing the relationship between the valve body and the body molding die after the molding of the main body.

Embodiment 9 will be described. This embodiment is a partial modification of Embodiment 1, so that the following description will be made to the modified portions, and a redundant description will not be made. In this embodiment, the method of manufacturing the throttle body is modified. FIG. 38 is a sectional view showing the relationship between the valve body and the body molding die prior to molding the main body, FIG. 39 is a sectional view showing the relationship between the valve body and the body molding die during molding of the main body, and FIG. 40 is a sectional view showing the relationship between the valve body and the body molding die after molding the main body. In FIGS. 38 through 40, the lateral dies 93 of the valve molding die are eliminated.

In this embodiment, during the molding process of the main body 3, the valve member 4 of the valve body 60 is resiliently deformed through compression, so that the main body 3 is molded, with the outer diameter of the valve member 4 enlarged by a predetermined amount. As shown in FIG. 38, prior to molding the main body 3, the valve member 4 of the valve body 60 has an outer diameter ØD.

Next, as shown in FIG. 39, with the body molding die 90 closed, the valve member 4 of the valve body 60 is compressed between the lower die 91 and the upper die 92 by a predetermined pressurizing force in order to resiliently deform the valve member 4 radially outwards. As a result, the outer diameter ØD of the valve member 4 is enlarged as follows:

$$D = ØD + ?$$

Assuming that the molding shrinkage amount of the main body 3 formed, for example, of a polyphenylene sulfide (PPS) resin, is 0.4, the value of ? in this case is a value obtained as follows:

$$? = ØD \times 0.4$$

To cause the radially outward deformation of the valve member 4 of the valve body 60, the lower die 91 and the upper die 92 in this embodiment hold the valve member 4 therebetween while pressurizing the substantially entire front and back surfaces of the valve member 4. Further, in this embodiment, the sealing surface 16 of the main body 3 is formed on the bore wall surface 13 of the primary tubular portion 10 of the main body 3.

After molding the main body 3, the body molding die 90 is opened as shown in FIG. 40, so that the valve member 4 of the valve body 60 is restored to the outer diameter ØD through resilient restoration.

In this embodiment, at the time of molding the main body 3, the valve member 4 of the valve body 60 in the fully closed position is compressed in the thickness direction and is resiliently deformed so as to enlarge the outer diameter ØD thereof, and the body member 3 is molded in this state. Thereafter, the compression of the valve member 4 in the thickness direction is released, so that the valve member 4 is resiliently restored to reduce its outer diameter. Thus, if the molding shrinkage has been caused in the main body 3, it is possible to secure a predetermined gap between the valve member 4 and the bore wall surface 13 (more specifically, the body side sealing surface) after the molding process. Thus, it is possible to reduce the air leakage amount in the fully closed state while securing the requisite operability for the valve body 60.

Further, during the molding process of the main body 3, the valve member 4 of the valve body 60 undergoes an enlargement in diameter by the compression between the lower die 91 and the upper die 92, so that it is possible to satisfactorily prevent or mitigate intrusion of the resin between the valve member 4, the lower die 91, and the upper die 92. Therefore, it is possible to suppress generation of resin burrs, so that the sealing property with the valve body 60 fully closed can be improved.

Embodiment 10

Figure 41:
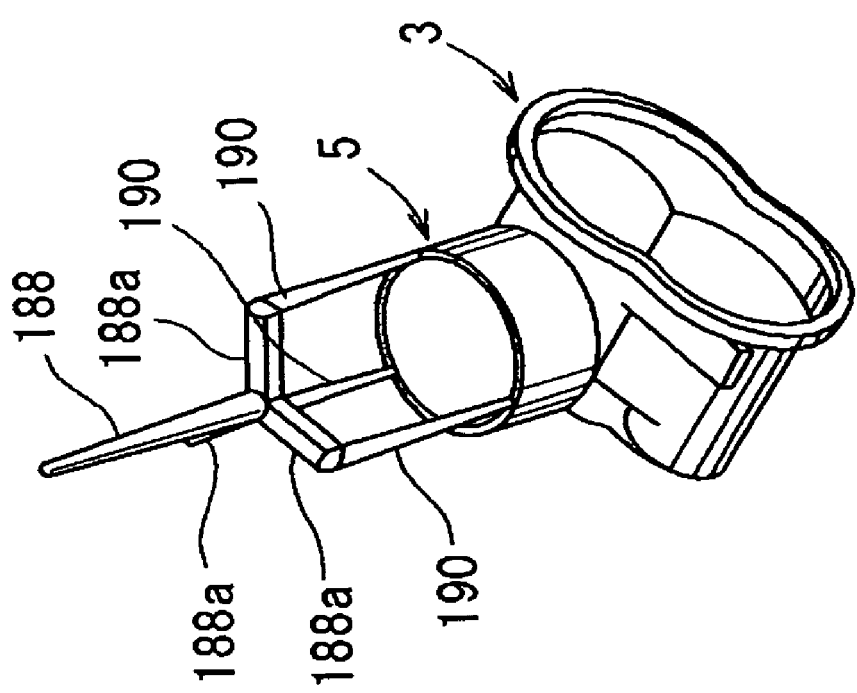
[FIG. 41] A perspective view showing the relationship between a main body according to Embodiment 10 and pin gates.

Embodiment 10 will be described. This embodiment is a partial modification of Embodiment 1, so that the following description will be made to the modification, and a redundant description will not be made. In this embodiment, the body molding die for the throttle body is modified. FIG. 41 is a perspective view showing the relationship between the main body and the pin gates, FIG. 42 is a plan view showing the relationship between the main body and the pin gates, and FIG. 43 is an explanatory view showing how glass fibers are oriented in the main body.

Figure 42:
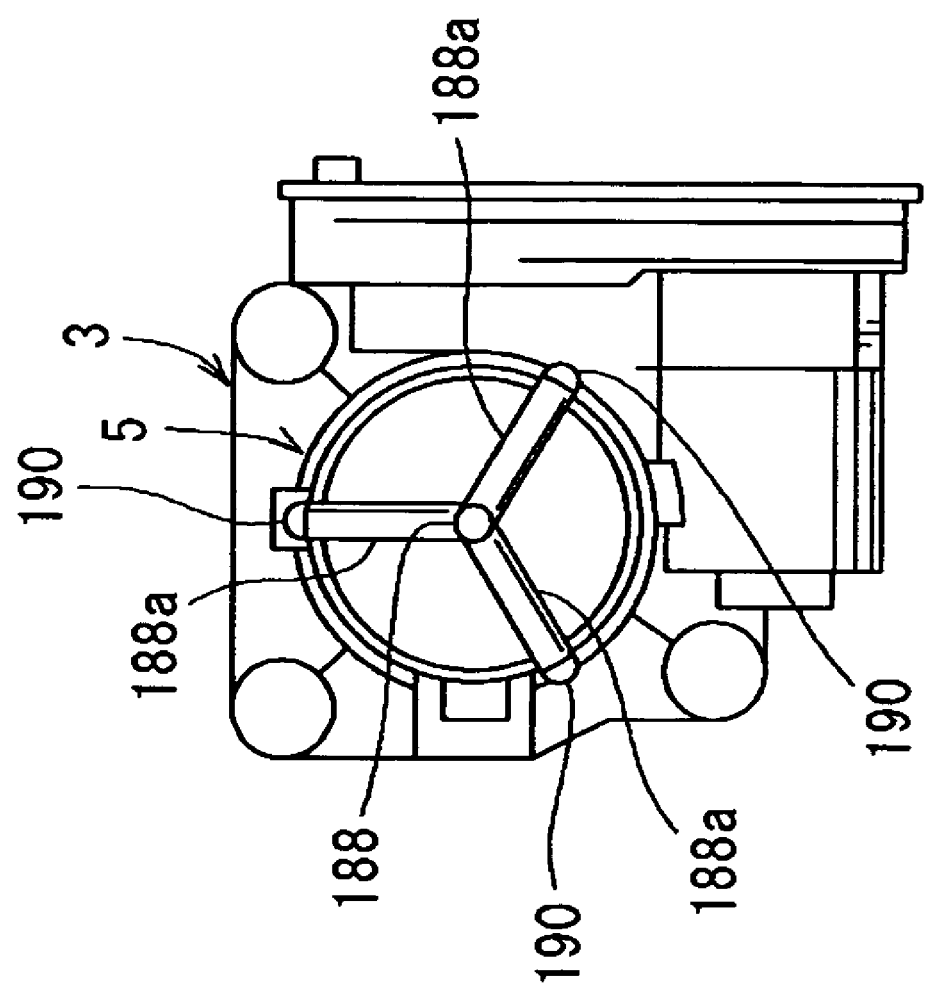
[FIG. 42] A plan view showing the relationship between the main body and the pin gates.
Figure 43:
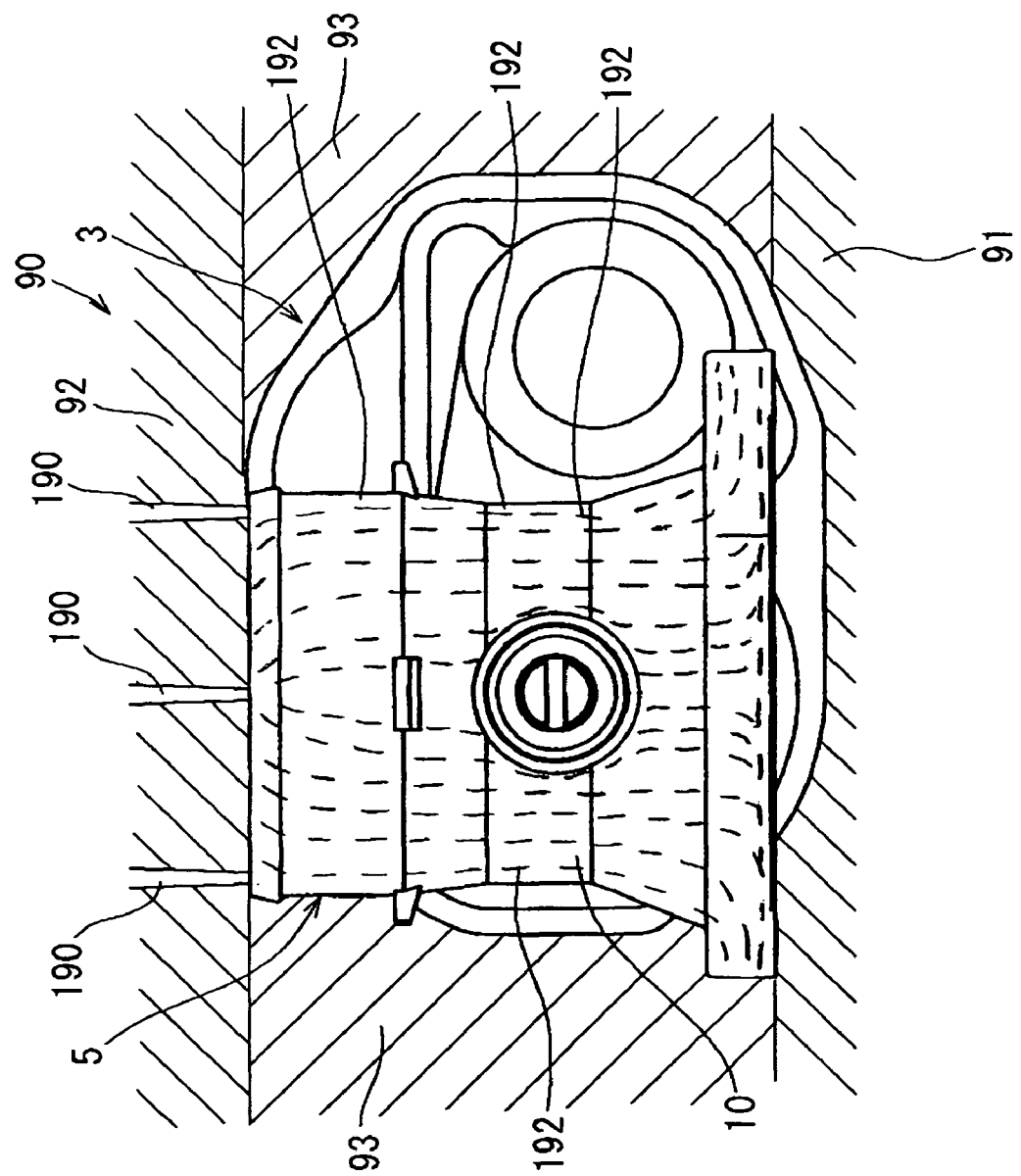
[FIG. 43] An explanatory view showing how glass fibers are oriented in the main body.

As shown in FIGS. 41 through 43, in this embodiment, the resin injecting gate 94 (see FIG. 10) of the body molding die 90 is replaced with a plurality of (three in this embodiment) pin gates 190. As shown in FIG. 43, the pin gates 190 are arranged at substantially equal intervals or intervals of angles of 120° in the circumference at the upper end of the bore wall portion 5 of the main body 3 with respect to the upper die 92 of the body molding die 90 (see FIG. 43). Further, the pin gates 190 respectively communicate with auxiliary runners 188a radially branched off from the downstream end of a runner 188 (see FIGS. 41 and 42) provided in the upper die 92.

Therefore, the resin material (molten resin) for the main body 3 is injected downwards from the upper end portion of the bore wall portion 5 of the cavity 88 (see FIGS. 10 and 11) from the runner 188 via the auxiliary runners 188a and the pin gates 190. The main body 3 is made of the resin material injected as described above. In this embodiment, a polyphenylene sulfide (PPS) resin is used as the resin material for the main body 3.

Figure 44:
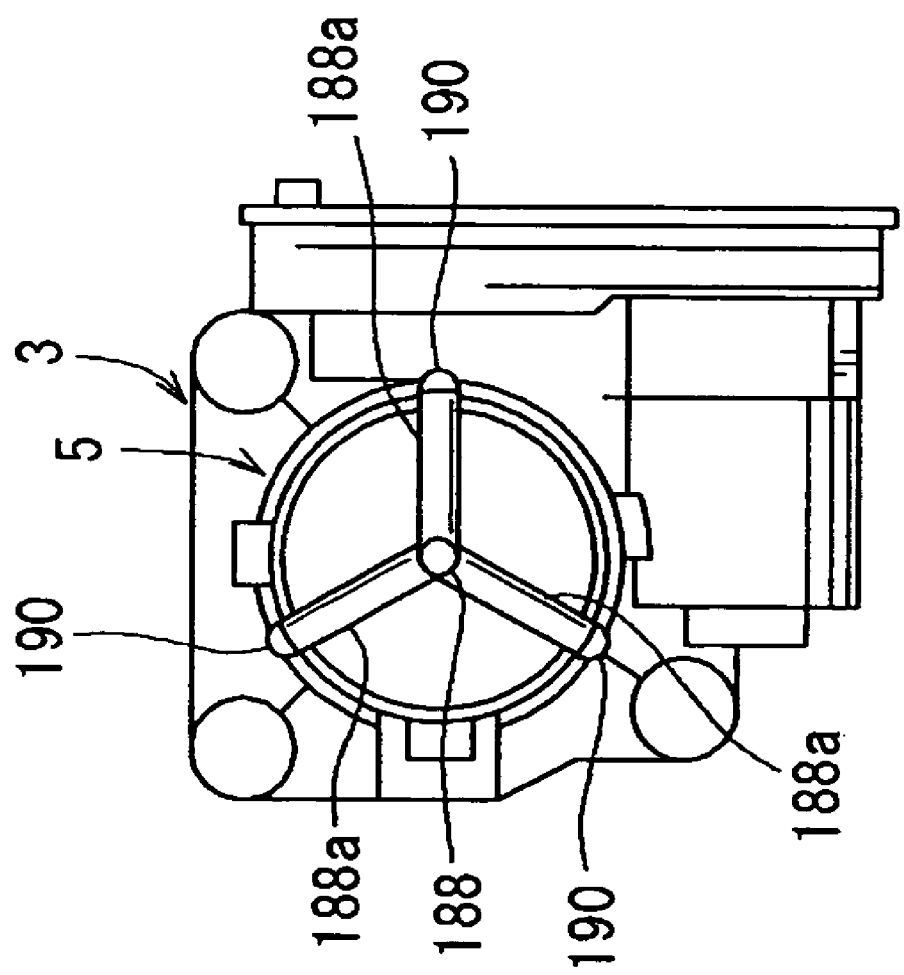
[FIG. 44] A plan view showing another example of the relationship between the main body and the pin gates.
Figure 45:
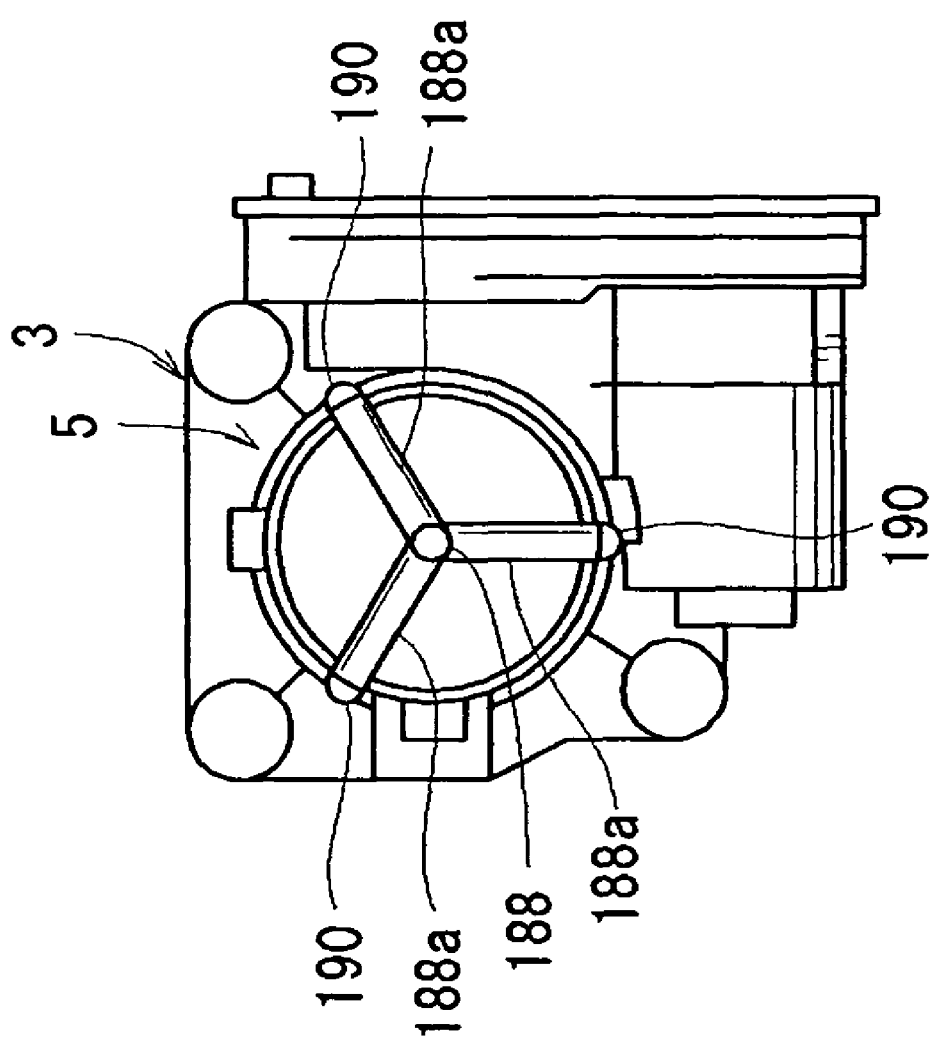
[FIG. 45] A plan view showing another example of the relationship between the main body and the pin gates.
Figure 46:
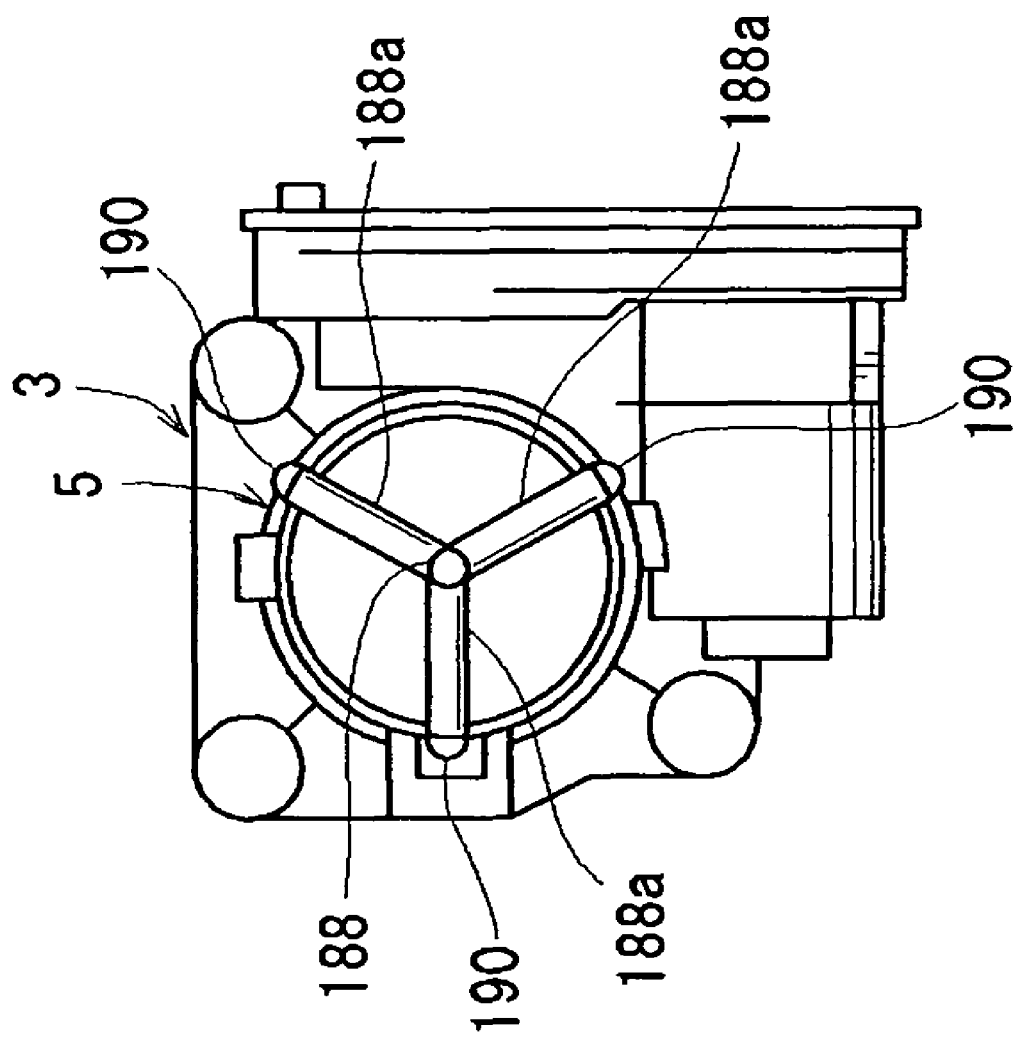
[FIG. 46] A plan view showing another example of the relationship between the main body and the pin gates.

The three pin gates 190 opposing to the upper end portion of the bore wall portion 5 can be shifted clockwise by 90 degrees from the position shown in FIG. 42 (see FIG. 44), further clockwise by 90 degrees therefrom (see FIG. 45), and further clockwise by 90 degrees threfrom (see FIG. 46). The number of pin gates 190 may be two or four or more as long as they are suited to the bore wall portion 5. The portion opposing to the pin gates 190 is not limited to the upper end portion of the bore wall portion 5, and the pin gates may be arranged so as to correspond to appropriate circumferential positions on the bore wall portion 5.

According to this embodiment, with the body molding die 90 for molding the main body 3, resin material is injected into the cavity from a plurality of pin gates 190 arranged at predetermined circumferential intervals on the bore wall portion 5 defining the bore 7 in order to mold the main body 3 (see FIG. 43). Therefore, after the molding process of the main body 3, it is possible to uniformalize the molding pressure, molding temperature, etc. for the resin at the bore wall portion 5 of the main body 3, so that it is possible to improve the circularity of the bore wall portion 5. If a fibrous material such as glass fibers, is mixed with the resin material, it is possible to uniformalize the orientation of the fibrous material, so that the molding shrinkage amount of the bore wall portion 5 is uniformalized in each portion along the circumference, and that it is possible to improve the circularity of the bore wall portion 5.

Figure 47:
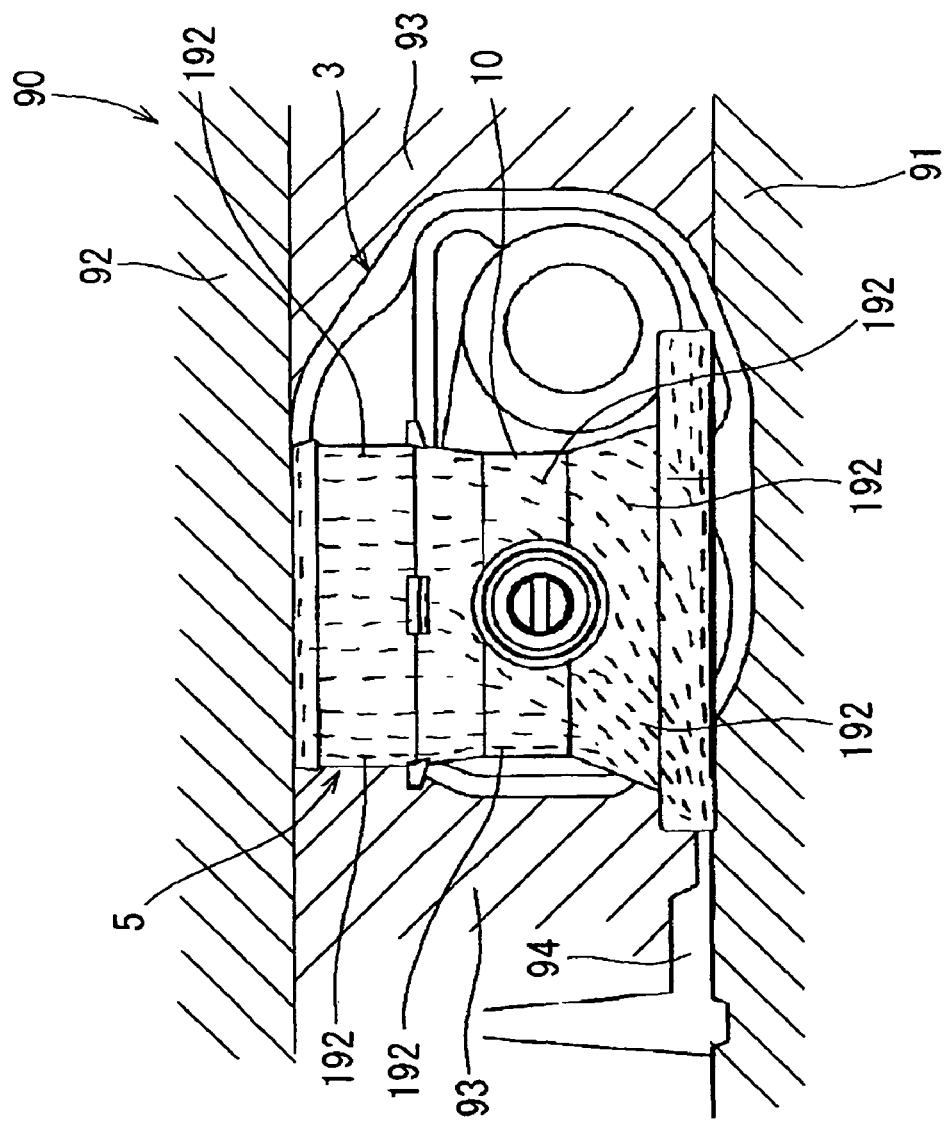
[FIG. 47] An explanatory view showing how glass fibers are oriented in the main body of Embodiment 1.

As described with reference to Embodiment 1, with the side gate system, in which the resin injecting gate 94 is provided between the lower die 91 and the lateral die 93 of the body molding die 90 (see FIG. 10), anisotropy in the orientation of the fibrous material (e.g., glass fibers) mixed with the resin may be caused in the bore wall portion 5 of the main body 3 as shown in FIG. 47. Therefore, the molding shrinkage amount or the coefficient of linear expansion of the bore wall portion 5 differs from position to position along the circumference, so that it is difficult to set the accuracy in circularity of the bore wall portion 5. In contrast, in the present embodiment, when the main body 3 is molded, the resin material is injected by the pin gate system from, for example, three circumferential positions of the bore wall portion 5, so that it is possible to uniformalize the orientation of the fibrous material (e.g., glass fibers) mixed with the resin (see FIG. 43) of the molded bore wall portion 5 of the main body 3. Accordingly, the molding shrinkage amount (coefficient of linear expansion) is uniformalized for each circumferential portion, so that the circularity (molding accuracy) of the bore wall portion 5 can be improved.

The present applicant has conducted an experiment for comparison between a conventional product and a product obtained in accordance with the present embodiment in terms of the circularity of the bore wall portion 5 of the main body 3. The result of CAE analysis conducted with a bore wall portion 5 having a diameter Ø45 mm showed that the circularity of the conventional bore wall portion was approximately 28 μm, whereas the circularity of the bore wall portion 5 of the present embodiment was approximately 7 μm, which indicates that the circularity was improved by approximately ¼.

The present invention is not restricted to the above-mentioned embodiments, and modifications are possible without departing from the gist of the present invention.

The invention claimed is:

1. A throttle body, comprising:
   a resin main body defining a bore through which intake air flows;
   a valve body having a shaft part rotatably supported by the main body and a valve part for opening and closing the bore of the main body; and
   an attaching member attached to the main body,
   wherein the attaching member is attached to the main body by welding; and
   wherein outer contact portions contacting with each other with an outer separating groove provided therebetween are disposed on an outer side of a welded portion between the main body and the attaching member.

2. A throttle body according to claim 1, wherein inner contact portions contacting with each other with an inner separating groove provided therebetween are disposed on an inner side of a welded portion between the main body and the attaching member.

3. A throttle body according to claim 1, wherein:
   the main body is provided with a motor housing portion for housing a drive motor that rotatively drives the valve body, and
   an opening is provided at a bottom wall portion of the motor housing portion for exposing an end portion on a side opposite to an output side of a motor housing of the drive motor to an exterior.

4. A throttle body according to claim 3, wherein:
   the end portion on the side opposite to the output side of the motor housing of the drive motor is sealed by a sealing material and is resiliently supported with respect to the bottom wall portion of the motor housing portion.

5. A throttle body according to claim 3, wherein:
   the end portion on the side opposite to the output side of the motor housing of the drive motor is formed into a bottomed configuration.

6. A throttle body according to claim 1, wherein:
   an output-side end portion of a motor shaft of the drive motor is rotatably supported on the attaching member.

7. An opener opening adjusting method for the throttle body according to claim 1 comprising a control device to which an output signal from a throttle position sensor is input, and an opener opening adjusting means for adjusting an opener opening of the valve body, wherein a throttle opening of the valve body is set as the opener opening,
   the opener opening adjusting method comprising:
   measuring an intake air amount when the valve body is in a mechanical fully closed position;
   determining by the control device a fully closed position sensor output value in a fully closed position using a measurement value of the intake air amount as a reference, and storing an opener opening sensor output value obtained by adding a sensor output value corresponding to the opener opening to the sensor output value; and
   adjusting that the opener opening of the valve body by the opener opening adjusting means such that the sensor output value of the throttle position sensor becomes equal to the opener opening sensor output value of the control device.

8. An opener opening adjusting method for the throttle body according to claim 1, the throttle body further comprising a control device to which an output signal from a throttle position sensor is input, an opener opening adjusting means for adjusting an opener opening of the valve body, wherein a throttle opening of the valve body is set as the opener opening, the opener opening adjusting method comprising:

measuring and storing by the control device the throttle opening at a fully closed position when the valve body is opened by a predetermined amount from a mechanical fully closed position;

using the sensor output value of the throttle position sensor at the throttle opening as a reference value and storing an opener opening sensor output value obtained by adding a sensor output value corresponding to the opener opening to the reference value; and adjusting the opener opening of the valve body by the opener opening adjusting means such that the sensor output value of the throttle position sensor becomes equal to the opener opening sensor output value of the control device.

9. A method of manufacturing the throttle body according to claim 1, comprising molding the main body having the shaft part and the valve part with the valve part inserted, wherein, after molding the main body, annealing is effected with the valve body fully closed.

10. A method of manufacturing the throttle body according to claim 1, comprising molding the main body having the shaft part and the valve part having the shaft part and the valve part with the valve body inserted, wherein the main body is molded with the valve part of the valve body in a fully closed position being compressed in a thickness direction to be resiliently deformed so as to undergo enlargement in an outer diameter.

11. A method of manufacturing the throttle body according to claim 1, comprising molding the main body having the shaft part and the valve part having the shaft part and the valve part with the valve body inserted, wherein the main body is molded in a body molding die for molding the main body by injecting a resin material into a cavity from a plurality of pin gates arranged at predetermined intervals along a circumference of a bore wall portion defining the bore.

12. A throttle body according to claim 4, wherein the end portion on the side opposite to the output side of the motor housing of the drive motor is formed into a bottomed configuration.

13. A throttle body according to claim 2, wherein an output-side end portion of a motor shaft of the drive motor is rotatably supported on the attaching member.

14. A throttle body according to claim 3, wherein an output-side end portion of a motor shaft of the drive motor is rotatably supported on the attaching member.

15. A throttle body according to claim 4, wherein an output-side end portion of a motor shaft of the drive motor is rotatably supported on the attaching member.

16. A throttle body according to claim 5, wherein an output-side end portion of a motor shaft of the drive motor is rotatably supported on the attaching member.

17. A throttle body according to claim 12, wherein an output-side end portion of a motor shaft of the drive motor is rotatably supported on the attaching member.

\* \* \* \* \*